(12) United States Patent
Takahashi et al.

(10) Patent No.: US 7,687,961 B2
(45) Date of Patent: Mar. 30, 2010

(54) STATOR, MOTOR, AND METHOD OF MANUFACTURING SUCH STATOR

(75) Inventors: Tadanobu Takahashi, Kawachi-gun (JP); Nobuyuki Imai, Utsunomiya (JP); Shin Aoki, Kawachi-gun (JP); Daijiro Takizawa, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 793 days.

(21) Appl. No.: 11/362,101

(22) Filed: Feb. 27, 2006

(65) Prior Publication Data

US 2006/0197397 A1      Sep. 7, 2006

(30) Foreign Application Priority Data

| Mar. 1, 2005 | (JP) | ............................. 2005-055670 |
| Mar. 1, 2005 | (JP) | ............................. 2005-055671 |
| Mar. 1, 2005 | (JP) | ............................. 2005-055672 |
| Mar. 2, 2005 | (JP) | ............................. 2005-057141 |
| Mar. 2, 2005 | (JP) | ............................. 2005-057142 |
| Oct. 21, 2005 | (JP) | ............................. 2005-306778 |
| Oct. 21, 2005 | (JP) | ............................. 2005-306779 |
| Oct. 21, 2005 | (JP) | ............................. 2005-306780 |

(51) Int. Cl.
*H02K 1/00* (2006.01)

(52) U.S. Cl. ....................... 310/185; 310/179; 310/201

(58) Field of Classification Search ......... 310/179–189, 310/200–208, 216, 257
See application file for complete search history.

(56) References Cited

U.S. PATENT DOCUMENTS

| 3,508,091 | A | | 4/1970 | Kavanaugh |
| 3,651,356 | A | | 3/1972 | Seilly |
| 4,319,152 | A | | 3/1982 | Van Gils et al. |
| 4,920,294 | A | | 4/1990 | Christiaens et al. |
| 6,373,164 | B1 | * | 4/2002 | Nishimura ................... 310/207 |
| 6,492,758 | B1 | * | 12/2002 | Gianni et al. ............... 310/257 |
| 6,710,501 | B1 | * | 3/2004 | Kusumoto et al. .......... 310/254 |
| 6,765,321 | B2 | * | 7/2004 | Sakamoto ................. 310/49 R |
| 6,870,294 | B2 | * | 3/2005 | Holzheu et al. ............. 310/201 |
| 6,894,417 | B2 | * | 5/2005 | Cai et al. .................... 310/198 |
| 6,901,649 | B2 | * | 6/2005 | Imori et al. .................... 29/596 |
| 6,946,768 | B2 | * | 9/2005 | Kruse ......................... 310/179 |
| 6,960,857 | B2 | * | 11/2005 | Oohashi et al. ............. 310/179 |
| 7,135,802 | B2 | * | 11/2006 | Seki et al. ................... 310/257 |
| 7,466,057 | B2 | * | 12/2008 | Imai et al. ................... 310/257 |
| 2003/0011257 | A1 | | 1/2003 | Akemakou |
| 2004/0007936 | A1 | | 1/2004 | Cros et al. |
| 2005/0189843 | A1 | | 9/2005 | Imai et al. |

FOREIGN PATENT DOCUMENTS

| BE | 464 305 A | 4/1946 |
| DE | 100 50 352 C1 | 1/2002 |
| FR | 1 481 608 A | 5/1967 |
| GB | 1 287 720 A | 9/1972 |
| JP | 14-17613 | 10/1939 |

(Continued)

OTHER PUBLICATIONS

Ronghai Qu et al.; "Split-Phase Claw-Pole Induction Machines with Soft Magnetic Composites Cores", Industry Applications Conference, 39th IAS Annual Meeting, Conference Record of the 2004 IEEE, Seattle, WA, USA Oct. 3-7, 2004, USA, IEEE, vol. 4, Oct. 3, 2004, pp. 2514-2519.

*Primary Examiner*—Thanh Lam
(74) *Attorney, Agent, or Firm*—Arent Fox LLP

(57) ABSTRACT

A stator includes mutually independent annular coils and of two phases and teeth and of three phases.

10 Claims, 53 Drawing Sheets

FOREIGN PATENT DOCUMENTS

| | | |
|---|---|---|
| JP | 47-40101 A | 12/1972 |
| JP | 61-052488 U | 4/1986 |
| JP | 07-227075 A | 8/1995 |
| JP | 2000-14059 A | 1/2000 |
| JP | 2002-165396 A | 6/2002 |
| JP | 2004-064966 A | 2/2004 |
| JP | 2004-132447 A | 4/2004 |
| JP | 2004-517594 A | 6/2004 |
| JP | 2005-020981 A | 1/2005 |
| JP | 2005-261182 A | 9/2005 |
| NL | 61 461 C | 10/1947 |
| WO | WO 2004-062065 A1 | 7/2004 |

* cited by examiner

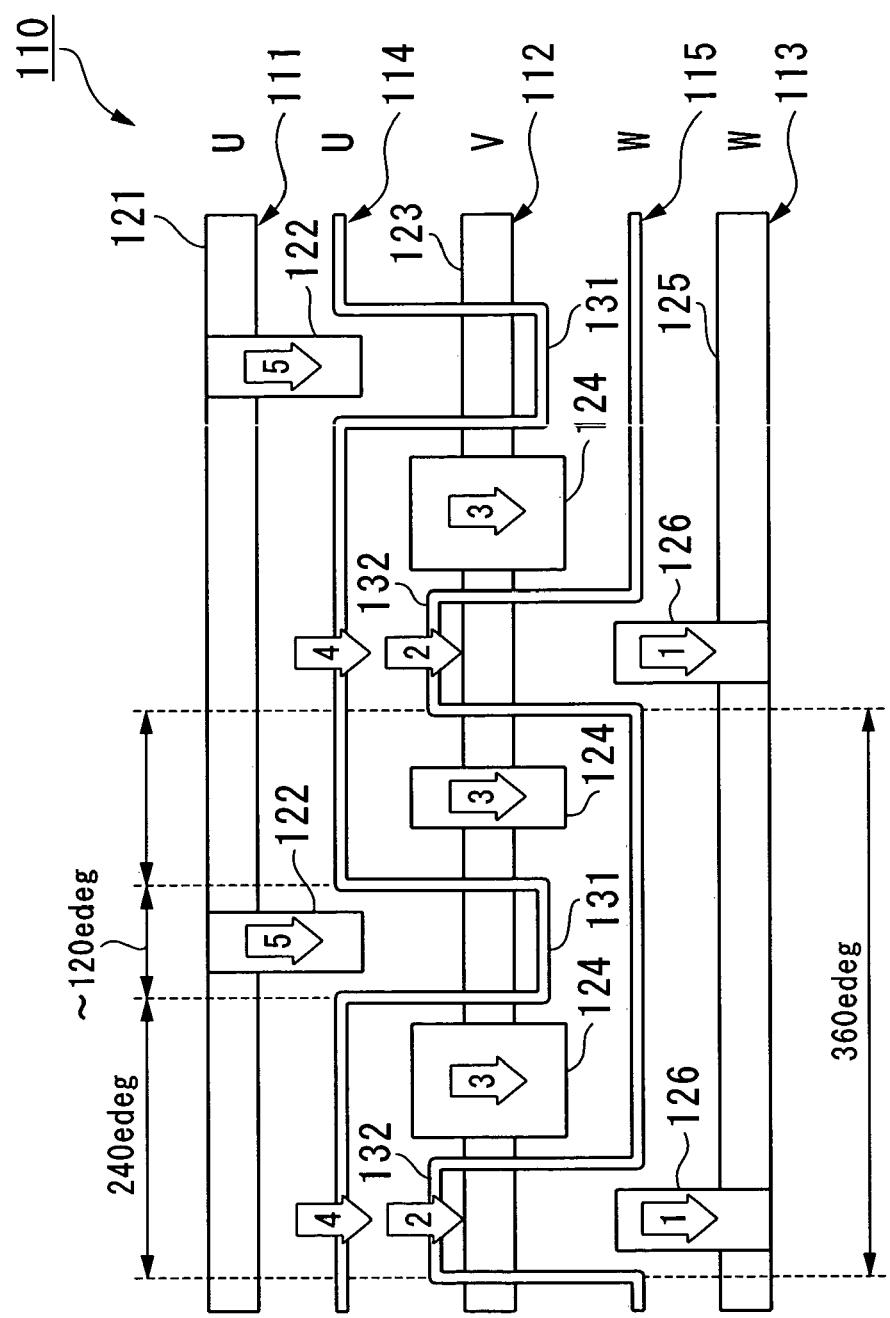
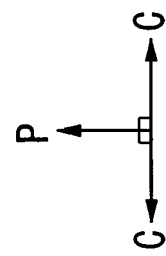
FIG.10

FIG.29
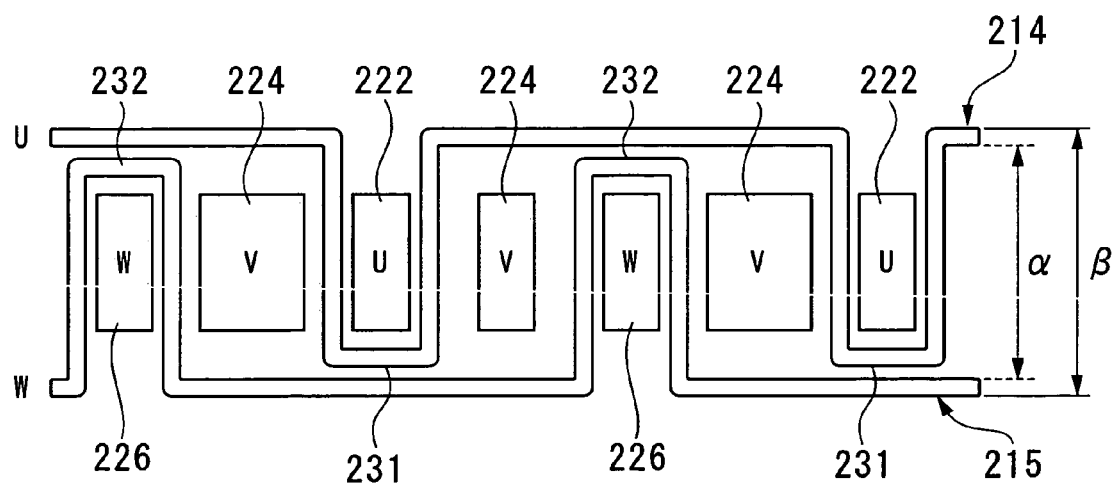
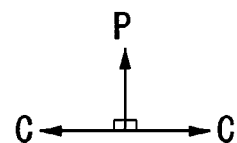

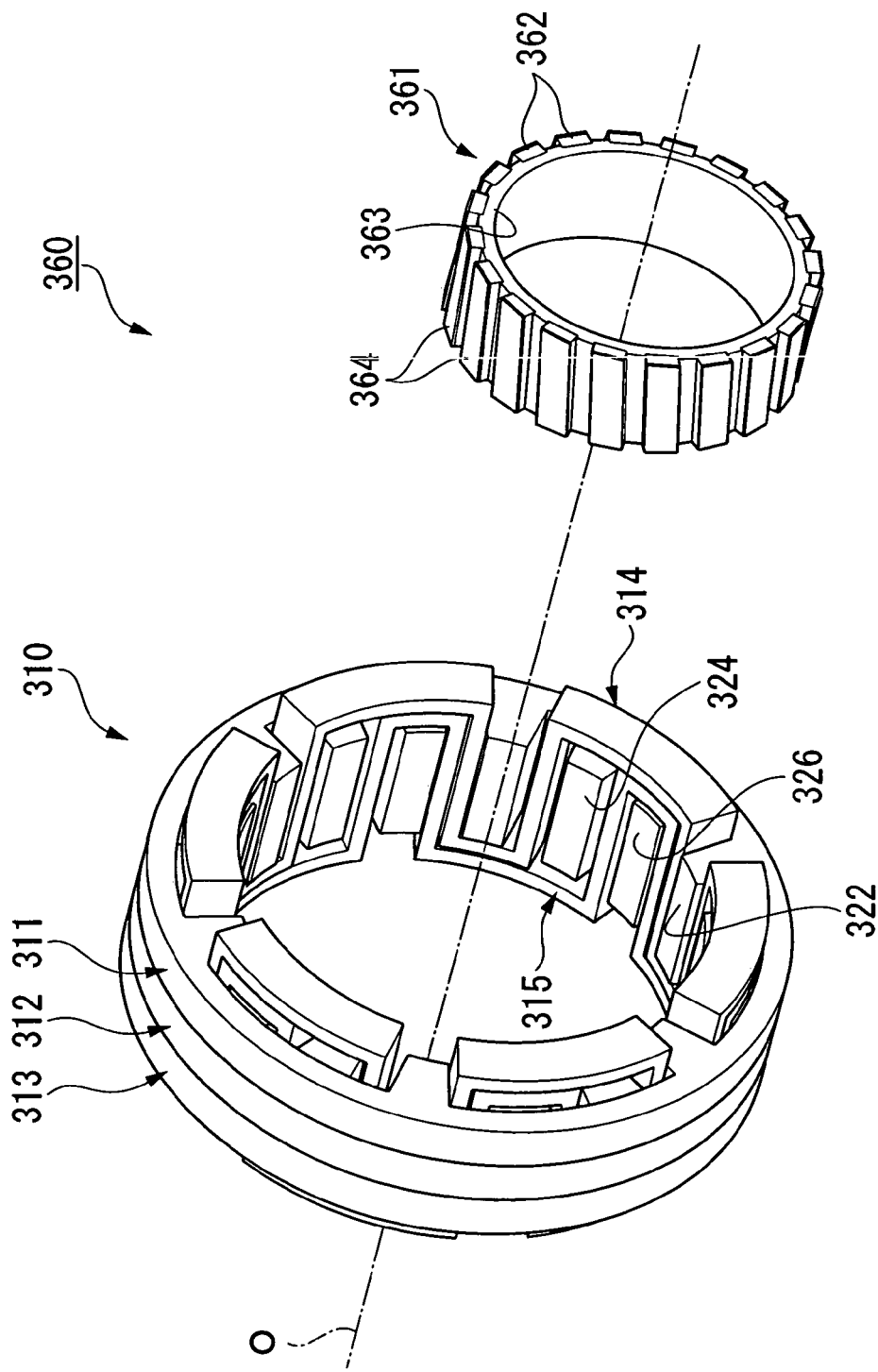

STATOR, MOTOR, AND METHOD OF MANUFACTURING SUCH STATOR

BACKGROUND OF THE INVENTION

1. Field of the Invention

The present invention relates to a stator, a motor and a method of manufacturing such a stator.

Priority is claimed on Japanese Patent Applications Nos. 2005-055670, 2005-055671, and 2005-055672 filed Mar. 1, 2005; Japanese Patent Applications Nos. 2005-057141 and 2005-057142 filed Mar. 2, 2005; and Japanese Patent Applications Nos. 2005-306778, 2005-306779, and 2005-306780 filed Oct. 21, 2005, the contents of which are incorporated herein by reference.

2. Description of Related Art

There is conventionally known a claw pole motor with a stator having a U-phase stator ring, a V-phase stator ring, and a W-phase stator ring disposed so as to be coaxially superimposed in the direction of the axis, annular coils forming a rotating magnetic field that rotates a rotor, the annual coils being disposed in annular coil mounting portions formed between the adjacent stator rings in the axial direction, and provided with claw poles extending radially from the stator rings of each phase, the claw poles of each phase arranged in the circumferential direction and opposing the magnetic poles of the stator (see, for example, Japanese Unexamined Patent Application, First Publication No. 2005-20981).

There is conventionally known a three-phase motor that drives a rotor in three phases with a stator having coils of each of the three phases U, V, and W being concentrically wound on stator cores of the three phases (see, for example, Japanese Unexamined Patent Application, First Publication No. H07-227075).

Also, there is known a three-phase motor that drives a rotor in three phases with a stator wound with coils of a U-phase, V-phase, and W-phase that traverse the circumference in a corrugated shape by weaving between adjacent teeth (see, for example, Japanese Unexamined Patent Application, First Publication No. 2002-165396).

In the claw pole motor according to the aforementioned prior art, a U-phase coil and first V-phase coil are disposed in annular coil mounting portions between the U-phase stator ring and V-phase stator ring that are adjacent in the axial direction, and a second V-phase coil and a W-phase coil are disposed in annular coil mounting portions between the V-phase stator ring and W-phase stator ring that are adjacent in the axial direction. Therefore, comparing the number of windings in each phase, the number of windings of the V-phase is double the number of windings of the U-phase and W-phase. The inductance of the V-phase therefore differs from the inductances of the U-phase and W-phase. This inductance mismatch ends up complicating control of the claw pole motor.

In the three-phase motors according to the aforementioned prior art, since a winding is required for each of the three phases, it is difficult to avoid an increase in the number of parts required for constitution of the stator, and cumbersome work is required for winding the coils of each phase.

Moreover, in a stator in which the coils are wound by corrugated winding, it is difficult to improve the winding space factor between adjacent teeth, and moreover it is difficult to lower the height of the coil end to reduce the dimensions in the axial direction of the motor and enhance the mounting property on a vehicle.

For this reason, it is desired to reduce the number of parts by simplifying the structure of the stator and simplifying the manufacturing process of the stator, and also reduce the dimensions in the axial direction of the motor by lowering the height of the coil end while improving the winding space factor in the stator to enhance the mounting property of the motor on a vehicle.

SUMMARY OF THE INVENTION

The present invention was achieved in view of the above circumstances, and has as its object to provide a stator with a simplified constitution that can prevent the occurrence of inductance mismatch between phases.

The present invention also has as its object to provide a stator and a motor that reduce the number of parts by simplifying their structure and simplify the manufacturing process, as well as reduce the dimensions in the axial direction by lowering the height of the coil end while improving the winding space factor to be able to enhance the mounting property on a vehicle.

In order to attain the object and solve the aforementioned problems, a first aspect of a stator of the present invention is provided with mutually independent annular coils of two phases, and teeth of three phases.

The stator of the constitution according to the first aspect can prevent mismatch from occurring among the inductances of each phase by being provided with independently energized annular coils of two phases, an even number. In addition, it can generate a four-phase rotating magnetic field, the fewest number of phases after three phases; and can prevent structural complication of the stator required to generate a rotating magnetic field.

It is preferable that the annular coils of two phases in the stator of the present aspect have a mutual phase difference of 90° in electrical angle.

According to the stator of the above constitution, a four-phase rotating magnetic field can be generated while preventing structural complication of the stator.

It is preferable that the stator of the present aspect be provided with: stator members of two phases equipped with the teeth of a mutually equivalent width in the circumferential direction; and a stator member of one phase equipped with the teeth of a width in the circumferential direction being twice the width in the circumferential direction.

According to the stator of the above constitution, a four-phase rotating magnetic field can be generated while preventing structural complication of the stator, and a rotor at a specified rotating torque.

It is preferable that the stator of the present aspect be provided with: stator members of two phases having the same shape and equipped with the teeth of a mutually equivalent width in the circumferential direction; and a stator member of one phase equipped with the teeth of a width in the circumferential direction being twice the width in the circumferential direction.

According to the stator of the above constitution, a four-phase rotating magnetic field can be generated while preventing structural complication of the stator.

It is preferable that the stator of the present aspect be provided with: stator members of two phases that are annular, have the same shape and equipped with the teeth of a mutually equivalent width in the circumferential direction; and a stator member of one phase that is annular and equipped with the teeth of a width in the circumferential direction being twice the width in the circumferential direction, the stator members and the annular coils being alternately arrangeable so as to be coaxially superimposed on the axis.

According to the stator of the above constitution, the stator can be easily manufactured simply by alternately arranging the stator members of three phases and the annular coils of two phases in a direction parallel to the axis so as to be successively superimposed.

It is preferable that the stator of the present aspect be provided with: stator members of two phases that are annular, have the same shape and equipped with the teeth of a mutually equivalent width in the circumferential direction; and a stator member of one phase that is annular, equipped with the teeth of a width in the circumferential direction being twice the width in the circumferential direction, and disposed so as to be held from both sides in a direction parallel to the axis by the annular coils of two phases, with the stator members and the annular coils being alternately arrangeable so as to be coaxially superimposed on the axis.

According to the stator of the above constitution, a four-phase rotating magnetic field can be generated while preventing structural complication of the stator.

In the stator of the present aspect, it is preferable that the annular coils have meandering portions.

According to the stator of the above constitution, in the case of meandering portions in which the teeth are mounted being provided in the annular coils, by configuring the meandering portions of the annular coils of two phases that project in mutually opposite directions to be alternately arranged along the circumferential direction, crossover and the like caused by positional interference between the annular coils is prevented, and an increase in the height of the coil end and dimensions of the stator in the axial direction can be prevented.

The stator of the present invention can prevent mismatch from occurring among the inductances of each phase by being provided with annular coils of two phases, an even number, and, in addition, can generate a four-phase rotating magnetic field, the fewest number of phases after three phases; and can prevent structural complication of the stator.

The stator of the present invention can drive a rotor at a specified rotating torque.

The stator of the present invention can be easily manufactured simply by alternately disposing the stator members of three phases and the annular coils of two phases in a direction parallel to the axis so as to be successively superimposed.

According to the stator of the present invention, in the case of meandering portions in which teeth are mounted being provided in the annular coils, by configuring the meandering portions of the annular coils of two phases that project in mutually opposite directions to be alternately arranged along the circumferential direction, positional interference caused by crossover and the like between the meandering portions is prevented, and an increase in the height of the coil end and dimensions of the stator in the axial direction can be prevented.

In the stator of the present aspect, it is preferable that the annular coils of two phases have meandering portions, the meandering portions projecting in mutually opposite directions, alternately arranged along the circumferential direction, and disposed so as not to mutually cross over.

According to the stator of the constitution, by arranging the meandering portions of the annular coils of two phases that project in mutually opposite directions to be alternately arranged along the circumferential direction, crossover and the like caused by positional interference between the annular coils is prevented, and an increase in the height of the coil end and dimensions of the stator in the axial direction can be prevented.

According to the stator of the present invention, positional interference caused by crossover and the like between the meandering portions is prevented, and an increase in the height of the coil end and dimensions of the stator in the axial direction can be prevented.

In the stator of the present aspect, it is preferable that the annular coils of two phases have meandering portions, the meandering portions having a coil pitch of 120° in terms of electrical angle and a mutual phase difference of 120° in terms of electrical angle, projecting in mutually opposite directions, alternately arranged along the circumferential direction, and disposed so as not to mutually cross over.

According to the stator of the above constitution, by having the annular coils of two phases be short-pitch windings of 120° in electrical angle, the distribution of the three-phase rotating magnetic field has a phase difference of 120° in electrical angle so that electrification control is easy, and the required number of teeth for one cycle (electrical angle 360°) of the annular coil becomes homogenous, and an increase in the total number of teeth provided in the stator can be restricted.

According to the stator of the present invention, electrification control is easy, and an increase in the total number of teeth provided in the stator can be restricted.

It is preferable that the stator of the present aspect be provided with: stator members of two phases equipped with the teeth of a mutually equivalent width in the circumferential direction; and a stator member of one phase equipped with the teeth of a width in the circumferential direction being twice the width in the circumferential direction, the stator members of three phases having a mutual phase difference of not more than 180° in terms of electrical angle.

According to the stator of the above constitution, the phase difference of the annular coils of two phases is 180° or less, crossover and the like caused by positional interference between the annular coils is prevented, and an increase in the height of the coil end and dimensions of the stator in the axial direction can be prevented.

In the stator of the present invention, the phase difference of the annular coils of two phases is 180° or less, crossover and the like caused by positional interference between the annular coils is prevented, and an increase in the height of the coil end and dimensions of the stator in the axial direction can be prevented.

It is preferable that the stator of the present aspect be provided with: stator members of two phases equipped with the teeth of a mutually equivalent width in the circumferential direction; and a stator member of one phase equipped with the teeth of a width in the circumferential direction being twice the width in the circumferential direction, the stator members of three phases having a mutual phase difference of 120° in terms of electrical angle.

According to the stator of the above constitution, the distribution of the three-phase rotating magnetic field produced by the annular coils of two phases has a phase difference of 120° in electrical angle so that electrification control is easy, and the required number of teeth for one cycle (electrical angle 360°) of the annular coil becomes homogenous, and an increase in the total number of teeth provided in the stator can be restricted.

In the stator of the present invention, the distribution of the three-phase rotating magnetic field produced by the annular coils of two phases has a phase difference of 120° in electrical angle so that electrification control is easy, and the required number of teeth for one cycle (electrical angle 360°) of the annular coil becomes homogenous for each phase, and an increase in the total number of teeth provided in the stator can be restricted.

It is preferable that the stator of the present aspect be provided with: stator members of two phases dividable into a plurality of stator pieces and equipped with the teeth of a mutually equivalent width in the circumferential direction; and a stator member of one phase dividable into a plurality of stator pieces and equipped with the teeth of a width in the circumferential direction being twice the width in the circumferential direction.

According to the stator of the above constitution, the annular coils of two phases and the stator members of three phases can be formed into a variety of shapes as required.

In the stator of the present invention, the annular coils of two phases and the stator members of three phases can be formed into a variety of shapes as required.

It is preferable that the stator of the present aspect be provided with: stator members of three phases respectively equipped with the teeth of three phases; and cooling tubes that circulate a cooling medium between the annular coils and the three stator members.

According to the stator of the above constitution, compared to the case of disposing cooling tubes on the outer part of the stator, for example, on the housing that houses the stator, the cooling tubes can directly and efficiently cool the annular coils and the stator body, which serve as heat sources during electrification.

In the stator of the present invention, the annular coils and the stator body, which serve as heat sources during electrification, can be directly and efficiently cooled.

It is preferable that the stator of the present aspect be provided with: stator members of three phases respectively equipped with the teeth of three phases; and cooling tubes having an annular shape conforming to the shape of the annular coils that circulate a cooling medium between the annular coils and the three stator members.

According to the stator of the above constitution, the cooling tubes having shapes that conform to the shape of the annular coils can be disposed close to the annular coils to suppress uneven temperature distribution along the lengths of the annular coils which serve as heat sources during electrification, and efficiently cool them.

In the stator of the present invention, efficient cooling can be performed while suppressing uneven temperature distribution along the lengths of the annular coils which serve as heat sources during electrification.

It is preferable that the stator of the present aspect be provided with: stator members of three phases respectively equipped with the teeth of three phases; the annular coils of two phases be disposed so as to hold the stator member of one phase from both sides, and be provided with cooling tubes that circulate a cooling medium disposed at least between each of the annular coils of two phases and the stator member of one phase.

According to the stator of the above constitution, each of the annular coils of two phases can be efficiently cooled while suppressing uneven temperature distribution along the longitudinal direction of the annular coils.

In the stator of the present invention, with regard to each of the annular coils of two phases, efficient cooling can be performed while suppressing uneven temperature distribution along the lengths of the annular coils of two phases.

In the stator of the present aspect, it is preferable that the thicknesses of the portions of the annular coils of two phases that are adjacent in the circumferential direction be less than other portions.

According to the stator of the above constitution, the desired winding wire space factor can be secured in the state of the intervals between the teeth being maintained uniform regardless of the number of phases of the annular coils mounted in the slots between the teeth that are adjacent in the circumferential direction (i.e., one or two phases). Thereby, decreases in the winding wire space factor can be prevented while preventing reductions in the maximum torque that can be output due to, for example, the intervals between the teeth opposing the rotor being nonuniform and increases in the cogging torque and torque ripple.

In the stator of the present invention, the desired winding wire space factor can be secured in the state of the interval between the teeth being maintained uniform regardless of the number of phases (i.e., one or two) of the annular coils mounted in the slots between the teeth that are adjacent in the circumferential direction.

Thereby, decreases in the winding wire space factor can be prevented while preventing reductions in the maximum torque that can be output due to for example the intervals between teeth opposing the rotor being nonuniform and increases in the cogging torque and torque ripple.

In the stator of the present aspect, it is preferable that the annular coils have meandering portions; the teeth be mounted in the meandering portions; and the teeth have chamfered first corner portions adjacent in the axial direction substantially parallel to the axis of the annular coils, and second corner portions provided with: extension portions that project in the circumferential direction; and the extension portions being set so that the projection amount in the circumferential direction changes to an increasing tendency accompanying separation from the first corner portions.

According to the stator of the above constitution, the annular coils disposed so as to weave between the teeth arranged in the circumferential direction smoothly curve along chamfered portions formed at the corners of the teeth, and so damage to the insulation coating provided on the surface of the annular coils can be suppressed. Moreover, with respect to the corners having the chamfered portions, by forming extension portions provided at the corners adjacent in the axial direction so that their projection amounts in the circumferential direction change to an increasing tendency the greater the separation from the respective corners on the one side, for example, having shapes conforming to the shapes of the outer periphery side of the curved annular coils, the magnetic path area on the surface of the teeth can be enlarged.

In the stator of the present invention, the annular coils smoothly curve along chamfered portions formed at the corners of the teeth, and so damage to the insulation coating provided on the surface of the annular coils can be suppressed. Moreover, with respect to the corners having the chamfered portions, by forming extension portions provided at the corners adjacent in the axial direction so that their projection amounts in the circumferential direction change to an increasing tendency the greater the separation from the respective corners on the one side, the magnetic path area on the surface of the teeth can be enlarged.

In the stator of the present aspect, it is preferable that the annular coils of two phases have meandering portions; the teeth be mounted in the meandering portions; the teeth have chamfered first corner portions adjacent in the axial direction substantially parallel to the axis of the annular coils, and second corner portions provided with: extension portions that project in the circumferential direction; the extension portions being set so that the projection amount in the circumferential direction changes to an increasing tendency accompanying separation from the first corner portions; and a slot being provided between each the second corner portion and each the extension portion.

According to the stator of the above constitution, short-circuiting of magnetic flux can be prevented via the extension portions.

In the stator of the present invention, short-circuiting of magnetic flux can be prevented via the extension portions.

In the stator of the present aspect, it is preferable that the annular coils have meandering portions; the teeth be mounted in the meandering portions, with at least the base end portions of the teeth in the radial direction being disposed at positions shifted in the axial direction substantially parallel to the axial direction of the annular coils; and stepped portions be formed by the teeth adjacent in the circumferential direction of the annular coils.

According to the stator of the above constitution, the teeth can be disposed in accordance with the arrangement of the annular coils of two phases having meandering portions in which the teeth of three phase are mounted, and increases in the coil end height and the dimensions in the axial direction of the stator can be prevented, and copper loss can be reduced by preventing an increase in the winding length. For example, in the state in which the annular coils of two phases are configured along the axial direction so as to be superimposed, when the positions in the axial direction of the teeth of three phases are set to equivalent positions, the width of the stator in the axial direction becomes at least the value of the size of the annular coils of two phases disposed at both end portions in the axial direction of the teeth (that is, the size of four annular coils) added to the width of the teeth in the axial direction. In contrast, if the positions of the teeth of the three phases can be suitably adjusted in the axial direction, the width of the stator in the axial direction can be decreased to a value obtained by adding the size of the annular coils of two phases (that is, the size of the two annular coils) to the width of the teeth in the axial direction.

In the stator of the present aspect, it is preferable that the annular coils have meandering portions; the teeth be mounted in the meandering portions, with at least the base end portions of the teeth in the radial direction being disposed at positions shifted in the axial direction substantially parallel to the axial direction of the annular coils; and there be provided with stepped portions formed by the teeth adjacent in the circumferential direction of the annular coils, and at which the annular coils are disposed.

According to the stator of the above constitution, by disposing the annular coils on stepped portions formed by mutually shifting the positions in the axial direction of teeth adjacent in the circumferential direction, increases in the height of the coil end and the dimensions in the axial direction of the stator can be prevented.

In the stator of the present aspect, it is preferable that the annular coils have meandering portions; the teeth be mounted in the meandering portions, with at least the base end portions of the teeth in the radial direction being disposed at positions shifted in the axial direction substantially parallel to the axial direction of the annular coils; and there be provided with stepped portions formed by the teeth adjacent in the circumferential direction of the annular coils, with the meandering portions of the annular coils disposed at the stepped portions.

According to the stator of the above constitution, by disposing the meandering portions of the annular coils on stepped portions formed by mutually shifting the positions in the axial direction of teeth adjacent in the circumferential direction, increases in the height of the coil end and the dimensions in the axial direction of the stator can be prevented.

In the stator of the present aspect, it is preferable that the annular coils have meandering portions; the teeth be mounted in the meandering portions, with at least the base end portions of the teeth in the radial direction being disposed at positions shifted in the axial direction substantially parallel to the axial direction of the annular coils; and there be provided stepped portions formed by the teeth adjacent in the circumferential direction of the annular coils, with the amount of shifting in the axial direction of the teeth adjacent in the circumferential direction being equivalent to the thickness of the annular coils.

According to the stator of the above constitution, by making the annular coil of one phase be arrangeable on stepped portions formed by mutually shifting the positions in the axial direction of teeth adjacent in the circumferential direction, increases in the height of the coil end and the dimensions in the axial direction of the stator can be prevented.

In the stator of the present aspect, it is preferable that the annular coils have meandering portions; the teeth be mounted in the meandering portions, with at least the base end portions of the teeth in the radial direction being disposed at positions shifted in the axial direction substantially parallel to the axial direction of the annular coils; stepped portions be formed by the teeth adjacent in the circumferential direction of the annular coils; and a slot between the teeth where the step of the stepped portion is a maximum slope with respect to the axial direction.

According to the stator of the above constitution, compared to the case of providing slots parallel to the axial direction, by providing a slot that slants with respect to the axial direction, the slot width dimension, that is, the dimension of the space in which the annular coil can be mounted, can be increased in the state of the teeth pitch, that is, the intervals in the circumferential position of centroid positions of teeth adjacent in the circumferential direction, being equivalent. Moreover, in the slot that slants with respect to the axial direction, the cross-sectional shape with respect to the slant direction of the slot can be set to a rectangular shape having a similar cross-sectional shape as a slot that is parallel to the axial direction.

For this reason, in the case of the annular coils of two phases being short-pitch wave windings of 120° in electrical angle, even when the number of phases of the annular coils mounted in slots between the teeth that are adjacent in the circumferential direction is nonuniform, such as one phase or two phases, the desired winding wire space factor can be secured for annular coils mounted in the slot without setting the intervals in the circumferential position of centroid positions of teeth to be nonuniform in accordance with the number of phases of the annular coils to be mounted. Thereby, reductions in the maximum torque that can be output due to for example the relative positions of teeth opposing the rotor being nonuniform and increases in the cogging torque and torque ripple can be prevented.

Moreover, the desired winding wire space factor can be ensured by annular coils having a simple cross-sectional shape with flat wire or the like, without using annular coils having a special cross-sectional shape.

In the stator of the present invention, the teeth can be disposed in accordance with the arrangement of the annular coils of two phases having meandering portions in which the teeth of three phase are mounted, and increases in the coil end height and the dimensions in the axial direction of the stator can be prevented, and copper loss can be reduced by preventing an increase in the winding length.

In the stator of the present invention, the desired winding wire space factor can be ensured by annular coils having a simple cross-sectional shape with flat wire, without using annular coils having a special cross-sectional shape, while preventing reductions in the maximum torque that can be output and increases in the cogging torque and torque ripple.

In the stator of the present aspect, it is preferable that the annular coils have meandering portions; the teeth be mounted in the meandering portions; and the intervals between the teeth adjacent in the circumferential direction of the annular coils be set so as to be nonuniform.

According to the stator of the above constitution, each of the teeth can be disposed in accordance with the arrangement state of the annular coils of two phases having meandering portions in which teeth of the three phases are mounted, and reductions in the winding wire space factor can be prevented. For example, in the case of the annular coils of two phases being short-pitch wave windings of 120° in electrical angle, the number of phases of the annular coils mounted on the slots between teeth that are adjacent in the circumferential direction is one or two phases, being nonuniform. For this reason, by setting the interval between teeth so as to be nonuniform, reductions in the winding wire space factor in accordance with the number of phases of the annular coils mounted on the slots can be prevented.

In the stator of the present invention, reductions in the winding wire space factor of the annular coils mounted in the slots between the teeth adjacent in the circumferential direction can be prevented.

In the stator of the present aspect, it is preferable that the annular coils have meandering portions, and the teeth be mounted in the meandering portions; and the intervals between the teeth adjacent in the circumferential direction of the annular coils being set to a value corresponding to the number of the annular coils disposed between the teeth.

According to the stator of the above constitution, the intervals between teeth that are adjacent in the circumferential direction can be set so as to change to an increasing tendency in accordance with the number of annular coils disposed between the teeth, for example, an increase in the number of annular coils. Thereby, reductions in the winding wire space factor of the annular coils that are mounted on slots between teeth that are adjacent in the circumferential direction can be prevented.

In the stator of the present aspect, it is preferable that the stator be provided with: stator members having the teeth; the annular coils having meandering portions; and for specified teeth of the teeth mounted in the meandering portions, the intervals between the teeth adjacent in the circumferential direction of the annular coils be set to change to an increasing tendency from rotor opposing portions that oppose the rotor to connection portions connected to the stator members.

According to the stator of the above constitution, by setting the interval between teeth that are adjacent in the circumferential direction so as to change to an increasing tendency from rotor opposing portions of the teeth distal end portions along the radial direction of the stator to connection portions of the teeth base end portions, the intervals between teeth near the connection portions that are connected to the stator body can be suitably set with the relative positions of the rotor opposing portions unchanged, and reductions in the maximum torque that is can be output and increases in the cogging torque and torque ripple can be prevented while preventing reductions in the winding wire space factor.

In the stator of the present invention, reductions in the winding wire space factor may be prevented while preventing reductions in the maximum torque that can be output and increases in the cogging torque and torque ripple.

In the stator of the present aspect, it is preferable that the stator be provided with: stator members having the teeth; the annular coils having meandering portions; and for specified teeth of the teeth mounted in the meandering portions, the width of the teeth in the circumferential direction of the annular coils change to a decreasing tendency and the length of the teeth in the axial direction substantially parallel to the axis of the annular coils change to an increasing tendency from rotor opposing portions that oppose the rotor to connection portions connected to the stator members.

According to the stator of the above constitution, since the width of the teeth in the circumferential direction changes to a decreasing tendency and the length of the teeth in the axial direction changes to an increasing tendency from rotor opposing portions of the teeth distal end portions along the radial direction of the stator to connection portions of the teeth base end portions, all the magnetic flux passing through the rotor opposing surface can be set to pass the base end surface of the teeth. Thereby, the interval between teeth near the connection portions where the annular coils are disposed can be appropriately set, and reductions in the winding wire space factor can be prevented while preventing increases in conduction loss per unit current at the time of generating the desired torque.

In the stator of the present invention, reductions in the winding wire space factor can be prevented while preventing increases in conduction loss per unit current at the time of generating the desired torque.

In the stator of the present aspect, it is preferable that the annular coils have meandering portions, and extension portions that project in the circumferential direction of the annular coils from distal end portions of the teeth be provided.

According to the stator of the above constitution, even in the case of the intervals between teeth being set to be nonuniform in accordance with the number of phases of the annular coils mounted on slots between teeth that are adjacent in the circumferential direction being nonuniform, for opposing portions constituted by the distal end of the teeth and the extension portions protruding from the distal end portions, by setting the interval between the opposing portions of the teeth that are adjacent in the circumferential direction to be uniform, reductions in the maximum torque that can be output due to, for example, the interval between opposing portions opposing the rotor being nonuniform, and increases in the cogging torque and torque ripple can be prevented.

In the stator of the present aspect, it is preferable that the annular coils have meandering portions, extension portions that project in the circumferential direction of the annular coils from distal end portions of the teeth be provided, and with respect to opposing portions having the distal end portions and the extension portions, the interval between the opposing portions of the teeth adjacent in the circumferential direction of the annular coils be uniform.

According to the stator of the above constitution, reductions in the maximum torque that can be output due to, for example, the interval between opposing portions opposing the rotor being nonuniform, and increases in the cogging torque and torque ripple can be prevented.

In the stator of the present invention, reductions in the maximum torque that can be output due to, for example, the interval between opposing portions opposing the rotor being nonuniform, and increases in the cogging torque and torque ripple can be prevented.

In the stator of the present aspect, it is preferable that the annular coils have meandering portions, extension portions that project in the circumferential direction of the annular coils from distal end portions of the teeth be provided, and the thickness of the extension portions along the radial direction of the annular coils be set to change to an increasing tendency from the distal end portions to base end portions of the extension portions in the circumferential direction of the annular coils.

According to the stator of the above constitution, while the magnetic flux that has passed the opposing surface of the extension portion opposing the rotor passes the connection portion between the extension portion and the distal end portion of the teeth to flow to the base end portion of the teeth, reductions due to magnetic saturation can be prevented, and the field flux between the rotor and the teeth of the stator can be effectively utilized.

In the stator of the present invention, while the magnetic flux that has passed the opposing surface of the extension portion opposing the rotor passes the connection portion between the extension portion and the distal end portion of the teeth to flow to the base end portion of the teeth, reductions of the magnetic flux due to magnetic saturation can be prevented, and the field flux between the rotor and the teeth of the stator can be effectively utilized.

A second aspect of a stator of the present invention has a plurality of annular coils having meandering portions, and a plurality of stator pieces having teeth that are mounted in the meandering portions.

According to the stator of the aforementioned second aspect, since the teeth provided on the stator pieces are mounted on the meandering portions of the annular coils, an annular stator can be easily constituted with a plurality of teeth.

In the stator of the present invention, an annular stator can be easily constituted with a plurality of teeth.

In the stator of the present aspect, it is preferable that the meandering portions have bent portions that bend perpendicularly and meander in a crank shape, and the annular coils have a plurality of the meandering portions.

According to the stator of the above constitution, by setting the meandering portions of the annular coils to be crank shaped, meandering portions of the desired shape can be easily and accurately formed in annular coils.

In the stator of the present invention, meandering portions of the desired shape can be easily and accurately formed into annular coils.

In the stator of the present aspect, it is preferable that the meandering portions have bent portions that bend at obtuse angles and meander in a trapezoidal shape, and the annular coils have a plurality of the meandering portions.

According to the stator of the above constitution, compared to for example an annular coil that meanders in a crank shape, an annular coil that meanders in a trapezoidal shape can shorten the winding length without hardly changing the winding factor according to inductance of the annular coil, and can lower copper loss.

In the stator of the present invention, compared to for example an annular coil that meanders in a crank shape, an annular coil that meanders in a trapezoidal shape can shorten the winding length without hardly changing the winding factor according to inductance of the annular coil, and can lower copper loss.

In the stator of the present aspect, it is preferable that the meandering portions of the plurality of the annular coils have a similar shape.

According to the stator of the above constitution, by configuring mutual meandering portions of a plurality of annular coils to have a similar shape, meandering portions of the desired shape can be easily and accurately formed into annular coils, and an increase in the number of steps needed for forming a plurality of annular coils can be prevented.

In the stator of the present invention, meandering portions of the desired shape can be easily and accurately formed into annular coils, and an increase in the number of steps needed for forming a plurality of annular coils can be prevented.

In the stator of the present aspect, it is preferable that the meandering portions of the plurality of the annular coils have different shapes.

According to the stator of the above constitution, by configuring mutual meandering portions of a plurality of annular coils to have different shapes, positional interference by crossover of mutual meandering portions and the like can be prevented, and increases in the coil end height and the dimensions in the axial direction of the motor can be prevented.

In the stator of the present invention, positional interference by crossover of mutual meandering portions and the like can be prevented, and increases in the coil end height and the dimensions in the axial direction of the motor can be prevented.

In the stator of the present aspect, it is preferable that the meandering portions of some of the annular coils among the plurality of the annular coils have bend portions that bend so as to project in the radial direction of the annular coils.

According to the stator of the above constitution, with the annular coil being provided with a curved portion that curves in a direction parallel with the radial direction, and the annular coil not being provided with a curved portion, positional interference by crossover of mutual meandering portions and the like can be prevented, and increases in the coil end height and the dimensions in the axial direction of the motor can be prevented.

A motor of the present invention is a motor having a stator provided with: mutually independent annular coils of two phases having meandering portions; and teeth of three phases that are mounted in the meandering portions; and a rotor provided with permanent magnets; wherein at least base end portions of the teeth in the radial direction are disposed at positions shifted in the axial direction substantially parallel to the axial direction of the annular coils; stepped portions are formed by the teeth adjacent in the circumferential direction of the annular coils; the length of the permanent magnets along the axial direction is shorter than the effective length in the axial direction of the teeth of three phases; and the length in the axial direction of opposing portions of the rotor that oppose distal end portions of the teeth of three phases is not less than the length of the permanent magnets in the axial direction and not longer than the effective length in the axial direction of the teeth of three phases.

According to the motor of the above constitution, compared to the case of setting the length of permanent magnets along the axial direction to be equivalent to the effective length in the axial direction of the teeth of the three phases, by having the length of permanent magnets along the axial direction be shorter than the effective length in the axial direction of the teeth of the three phases, the length of the permanent magnets in the circumferential direction and the thickness of the permanent magnets in the radial direction increases, whereby the weight of the rotor can be reduced without changing the amount of field flux between the permanent magnets of the rotor and the teeth of the stator.

In the motor of the present invention, the weight of the rotor can be reduced without changing the amount of field flux between the permanent magnets of the rotor and each teeth of the stator.

A method of manufacturing a stator of the present invention includes the following steps:

a winding arrangement step in which a plurality of annular coils having meandering portions are disposed so that the positions of the meandering portions are mutually shifted along the circumferential direction;

a teeth insertion step in which some of teeth among the plurality of teeth of a stator are inserted in a specified insertion direction into teeth mounting portions formed by a plurality of the annular coils; and a teeth mounting step in which the remaining teeth are mounted in the meandering portions in a suitable mounting direction.

In the aforementioned method of manufacturing the stator, in a coil arrangement step, a plurality of annular coils having meandering portions at specified positions in the circumferential direction are disposed so as to be coaxial with the meandering portions shifted by a specified distance along the circumferential direction. In a teeth insertion step, some teeth among the plurality of teeth in the stator are inserted along a specified insertion direction into teeth mounting portions formed by at least their peripheries being surrounded by the plurality of annular coils. Next, in a teeth mounting step, other teeth among the plurality of teeth in the stator are mounted in a suitable mounting direction into meandering portions of the plurality of annular coils.

Thereby, since the plurality of teeth are disposed after disposing the plurality of annular coils formed into a specified shape in advance in specified relative positions, the desired winding wire space factor can be easily secured for annular coils disposed between teeth that are adjacent in the circumferential direction, and excessive height dimensions of the coil end can be prevented.

In the method of manufacturing the stator of the present invention, since the plurality of teeth are disposed after disposing the plurality of annular coils formed into a specified shape in advance in specified relative positions, the desired winding wire space factor can be easily secured for annular coils disposed between teeth that are adjacent in the circumferential direction, and excessive height dimensions of the coil end can be prevented.

In the method of manufacturing the stator of the present invention, the insertion direction is preferably set to a direction substantially parallel to the radial direction of the annular coils, the mounting direction is set to a direction substantially parallel to the axial direction of the annular coils, and the insertion direction and the mounting direction are substantially perpendicular.

In the aforementioned method of manufacturing the stator, one part of teeth is inserted from a direction substantially parallel to the radial direction of the annular coil into teeth mounting portions formed by their peripheries being surrounded by the plurality of annular coils. At the meandering portions other than the teeth mounting portions, that is the meandering portions where the peripheries are not surrounded, other teeth are mounted from a mounting direction parallel to the axial direction of the annular coils, that is, from a direction perpendicular to the insertion direction of the predetermined one part of the teeth.

Thereby, with respect to the plurality of annular coils formed in a specified shape in advance and disposed at specified relative positions, the predetermined one part of the teeth and the other teeth can be simultaneously mounted along a direction without mutual interference, the manufacturing process of the stator can be simplified, and the manufacturing efficiency can be enhanced.

In the method of manufacturing the stator of the present invention, with respect to the plurality of annular coils disposed at specified relative positions, some teeth and the other teeth can be simultaneously mounted along a direction without mutual interference, the manufacturing process of the stator can be simplified, and the manufacturing efficiency can be enhanced.

In the method of manufacturing the stator of the present invention, the teeth provided on a plurality of stator pieces constituting the stator are preferably inserted into the teeth mounting portions in the teeth insertion step, and the teeth provided on a plurality of stator pieces constituting the stator are mounted in the meandering portions in the teeth mounting step.

In the aforementioned method of manufacturing the stator, since teeth provided on a plurality of stator pieces constituting the annular stator are inserted into teeth mounting portions or mounted on the meandering portions, even if the insertion direction of some teeth and the mounting direction of the other teeth differ, a plurality of teeth can be easily disposed.

In the method of manufacturing the stator of the present invention, even if the insertion direction of some teeth and the mounting direction of the other teeth differ, a plurality of teeth can be easily disposed.

In the method of manufacturing the stator of the present invention, the annular coils are preferably formed in a specified shaped by sandwiching the annular coils from both sides with a coil abutting portion provided on the some teeth and a coil guide member.

In the aforementioned method of manufacturing the stator, with respect to the plurality of annular coils disposed at specified relative positions in advance, by forming the annular coils in a specified shape when inserting some teeth into the teeth mounting portion, the annular coils can be easily formed into suitable shapes following the shapes of the teeth, the manufacturing process of the stator can be simplified, and the manufacturing efficiency can be enhanced.

In the method of manufacturing the stator of the present invention, the annular coils can be easily formed into a suitable shape following the shapes of the teeth, the manufacturing process of the stator can be simplified, and the manufacturing efficiency can be enhanced.

BRIEF DESCRIPTION OF THE DRAWINGS

FIG. 4A is a schematic view showing the claw pole-type stator according to the embodiment of the present invention, while

FIG. 10 is an exploded view showing a portion of the stator according to the second embodiment of the present invention.

FIG. 29 is a schematic view showing an example of a state of positions of teeth of three phases in an axial direction P being set to a same position.

FIG. 34A is a perspective view showing slots between U-phase teeth and V-phase teeth viewed from the axial direction P in FIG. 33, while

FIG. 48 is a perspective view showing a claw pole motor according to the fifth embodiment of the present invention.

As to steps included in a manufacturing method of the stator according to the sixth embodiment of the present invention.

As to steps included in a manufacturing method of a stator according to as second modification example of the sixth embodiment of the present invention.

As to steps included in a manufacturing method of a stator according to a third modification example of the sixth embodiment of the present invention.

DETAILED DESCRIPTION OF THE INVENTION

First Embodiment

A first embodiment of the stator of the present invention will be explained below with reference to the accompanying drawings.

A stator 10 according to the present embodiment is a constituent element of a claw pole motor mounted, for example, in a hybrid vehicle as a driving source of the vehicle together with an internal combustion engine. For example, in a parallel hybrid vehicle of a structure in which the internal combustion engine, the claw pole motor, and a gear transmission are linked in series, a driving power of at least either the internal combustion engine or the claw pole motor is transmitted to driving wheels of the vehicle through the gear transmission.

When the driving power is transmitted to the claw pole motor from the driving wheels during deceleration of the vehicle, the claw pole motor serves as a generator that generates so-called regenerative-braking force and recover the kinetic energy of the vehicle in the form of electrical energy (regenerative energy). Furthermore, the claw pole motor also serves as a generator to produce electrical energy when the power of the internal combustion engine is transmitted to the claw pole motor.

Figure 1:
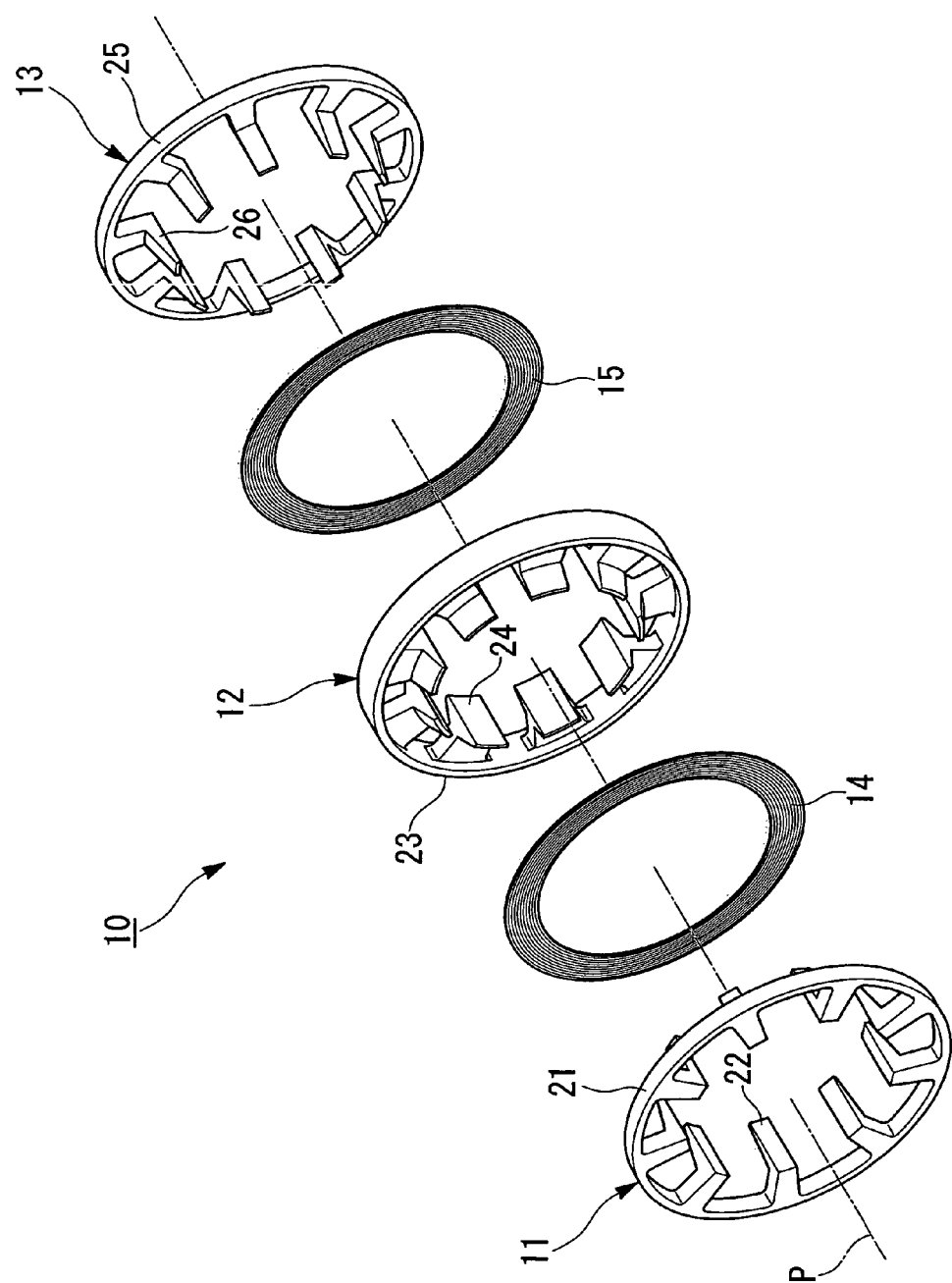
FIG. 1 is an exploded perspective view showing a constitution of a claw pole-type stator according to an embodiment of the present invention.
Figure 2:
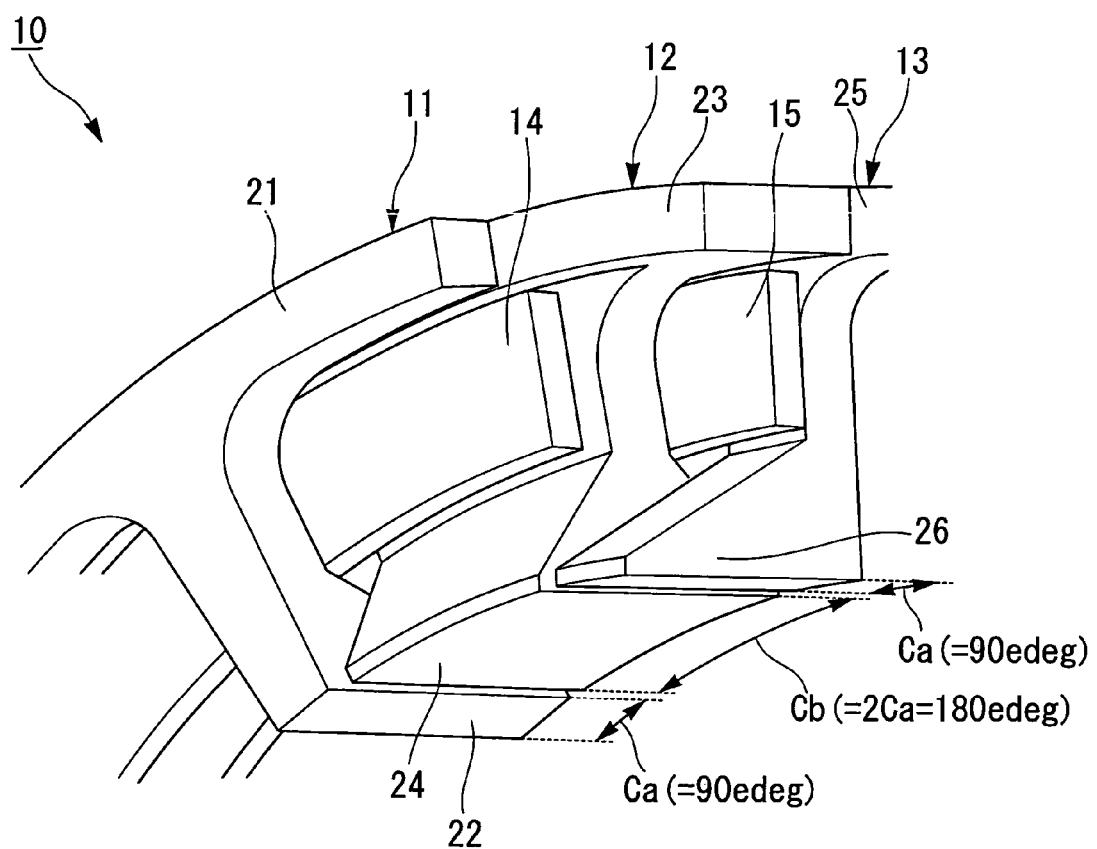
FIG. 2 is a perspective view showing a main portion of the claw pole-type stator according to the embodiment of the present invention.

As shown for example in FIGS. 1 and 2, the stator 10, which generates a rotating magnetic field for rotating a rotor (not illustrated), is provided with an A-phase stator ring 11, a B-phase stator ring 12, and a D-phase stator ring 13 for the respective A, B, and C phases, and an α-phase annular coil 14 and a β-phase annular coil 15 for the respective α and β phases.

The A-phase stator ring 11 is provided with a ring-shaped A-phase back yoke 21 and claw-shaped A-phase claw poles 22 (i.e., teeth) that project radially inward from positions spaced at a specified interval in the circumferential direction on the inner circumferential side of the A-phase back yoke 21, extending in a manner to bend to one side in the axial direction from a base end to a distal end thereof.

The A-phase claw poles 22 have a rectangular shape in which their cross-sectional shape in the circumferential direction is L-shaped, and their cross-sectional shape in the radial direction has a specified circumferential width Ca, which corresponds to an electrical angle of 90°.

The B-phase stator ring 12 is provided with a ring-shaped B-phase back yoke 23 and double claw-shaped B-phase claw poles 24 (i.e., teeth) that project radially inward from positions spaced at a specified interval in the circumferential direction on the inner circumferential side of the B-phase back yoke 23, extending to one side and the other side in the axial direction while heading from a base end to a distal end thereof.

The B-phase claw poles 24 have a rectangular shape in which their cross-sectional shape in the circumferential direction is T-shaped, and their cross-sectional shape in the radial direction has a circumferential width Cb that is twice the specified circumferential width Ca (Cb=2Ca), corresponding to an electrical angle of 180°.

The D-phase stator ring 13 has a shape similar to the A-phase stator ring 11, being provided with a ring-shaped D-phase back yoke 25 and claw-shaped D-phase claw poles 26 (i.e., teeth) that project radially inward from positions spaced at a specified interval in the circumferential direction on the inner circumferential side of the D-phase back yoke 25, extending in a manner to bend to the other side in the axial direction from a base end to a distal end thereof.

The D-phase claw poles 26 have a rectangular shape in which their cross-sectional shape in the circumferential direction is L-shaped, and their cross-sectional shape in the radial direction has a specified circumferential width Ca, which corresponds to an electrical angle of 90°.

The stator rings 11, 12, and 13 are disposed on an axis P and superimposed in that order in the axial direction, and are joined so that the claw poles 22, 24, and 26 are sequentially arranged in that order along the circumferential direction. When an axial end face of the A-phase back yoke 21 and an axial end face of the second side of the B-phase back yoke 23 abut, the α-phase annular coil 14 is fixed so as to be held from both sides in the axial direction by the base end portions of the claw poles 22 and 24 disposed at a specified interval in the axial direction. Also, when an axial end face of the first side of the B-phase back yoke 23 and an axial end face of the D-phase back yoke 25 abut, the β-phase annular coil 15 is fixed so as to be held from both sides in the axial direction by the claw poles 24 and 26 disposed at a specified interval in the axial direction.

Figure 3:
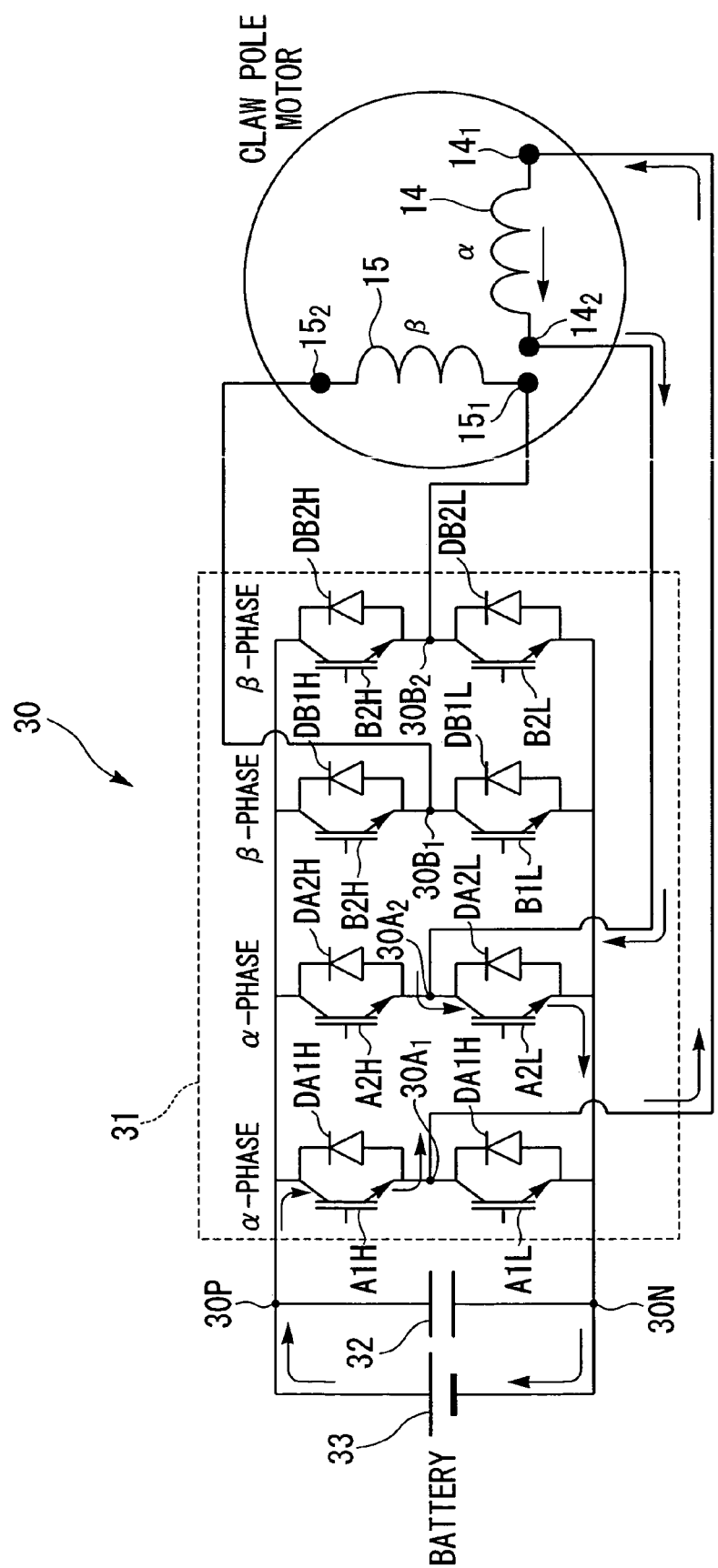
FIG. 3 is a circuit diagram showing a driving circuit that drives the claw pole-type stator according to the embodiment of the present invention.

As shown in FIG. 3, when the α-phase annular coil 14 and the β-phase annular coil 15 for the two phases are driven by sinusoidal currents of two phases (that is, an α-phase current and a β-phase current) having a phase difference of 90° using a driving circuit 30 that can independently energize the annular coils 14 and 15, a rotating magnetic field is generated equivalent to that of a four-phase stator energized by sinusoidal waves with a phase difference of 90°.

Figure 4A:
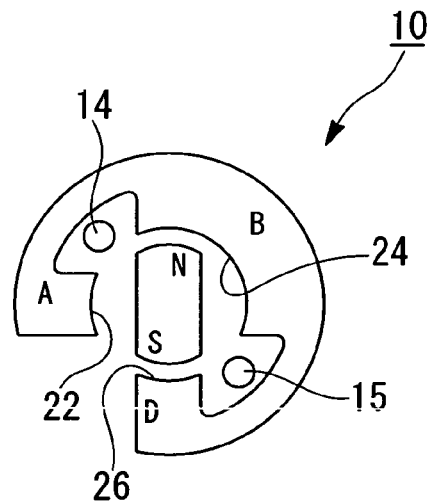
Figure 4B:
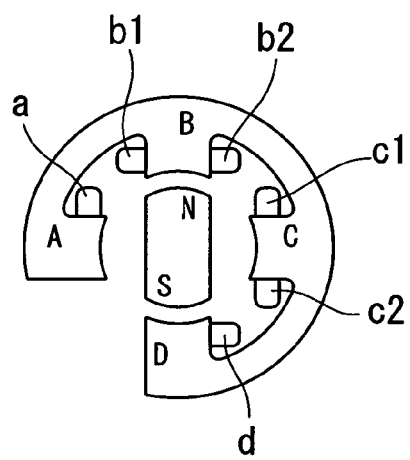
FIGS. 4B and 4C are schematic views showing a four-phase claw pole-type stator that generates a rotating magnetic field similarly to the claw pole-type stator according to the embodiment of the present invention.
Figure 4C:
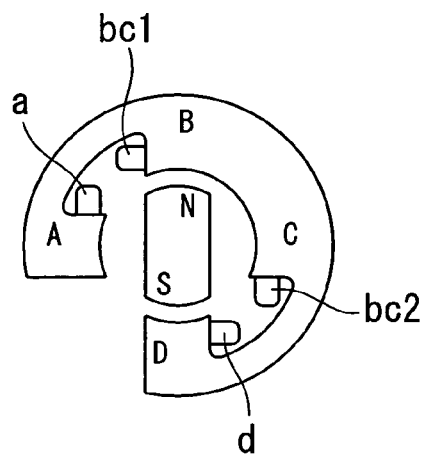

That is, the stator 10 as shown in FIG. 4A, which is provided with the α-phase annular coil 14 and the β-phase annular coil 15 for two phases, the A-phase claw pole 22 and the D-phase claw pole 26 for two phases having a circumferential width of 90° in terms of electrical angle, and the B-phase claw pole 24 of one phase having a circumferential width of 180° in terms of electrical angle, is equivalent to the stators shown in FIG. 4B and FIG. 4C.

As shown for example in FIG. 4B, a four-phase claw pole-type stator has A-phase, B-phase, C-phase and D-phase stator rings equipped with claw poles A, B, C and D of the respective A-phase, B-phase, C-phase and D-phase. The stator rings are disposed on an axis P and superimposed in that order in the axial direction, and are joined so that the claw poles, which have an equivalent circumferential width of 90° in terms of electrical angle, are sequentially arranged in that order along the circumferential direction. An A-phase annular coil a and a first B-phase annular coil b1 are fixed so as to be held from both sides in the axial direction by the base end portions of claw poles A and B, respectively, which are disposed at a specified interval in the axial direction. A second B-phase annular coil b2 and a first C-phase annular coil c1 are fixed so as to be held from both sides in the axial direction by the base end portions of claw poles B and C, respectively, which are disposed at a specified interval in the axial direction. A second C-phase annular coil c2 and a D-phase annular coil d are fixed so as to be held from both sides in the axial direction by the base end portions of claw poles C and D, respectively, which are disposed at a specified interval in the axial direction.

By unifying the B-phase claw poles B and the C-phase claw poles C, which are adjacent in the circumferential direction, and sharing the annular coils b1, b2, c1 and c2 in the four-phase claw pole-type stator shown in FIG. 4B, the stator as shown in FIG. 4C is constituted. In the stator shown in FIG. 4C, A-phase, BC-phase, and D-phase stator rings for 3 phases respectively equipped with claw poles A, BC and D of the respective A-phase, BC-phase, and D-phase are disposed coaxially to the axis P and superimposed in that order in the axial direction, and joined so that the A-phase claw poles, which have a circumferential width of 90° in terms of electrical angle, the BC-phase claw poles, which have a circumferential width of 180° in terms of electrical angle, and the D-phase claw poles, which have a circumferential width of 90° in terms of electrical angle, are sequentially arranged in that order along the circumferential direction. Moreover, the A-phase annular coil a and the first BC-phase annular coil bc1, as well as the second BC-phase annular coil bc2 and the D-phase annular coil d are fixed so as to be held from both sides in the axial direction by the respective base end portions of the claw poles A and BC, and BC and D, respectively, which are disposed at a specified interval in the axial direction.

By sharing the annular coils bc1 and bc2 in the four-phase claw pole-type stator shown in FIG. 4C, the stator 10 as shown in FIG. 4A is constituted.

The driving circuit 30 is equipped with a bridge circuit 31, which is formed by bridge connection of a plurality of transistor switching elements, and a smoothing capacitor 32, and is a PWM inverter utilizing pulse width modulation (PWM).

This bridge circuit 31 is equipped with transistors A1H, A2H, B1H, B2H, A1L, A2L, B1L, and B2L, which make up a plurality of switching elements. These transistors A1H to B2L are, for example, IGBT (Insulated Gate Bipolar-mode Transistors).

Diodes DA1H, DA2H, DB1H, DB2H, DA1L, DA2L, DB1L, and DB2L are arranged, respectively, between the collector and emitter of the transistors A1H, A2H, B1H, B2H, A1L, A2L, B1L, and B2L. The anode of each of the diodes DA1H to DB2L is connected to the emitter of the respective transistor A1H to B2L, and the cathode of each of the diodes DA1H to DB2L is connected to the collector of the respective transistor.

The collectors of the transistors A1H, A2H, B1H and B2H are all connected to a DC input/output terminal 30P. The emitter of the transistor A1H is connected to the collector of the transistor A1L, the emitter of the transistor A2H is connected to the collector of the transistor A2L, the emitter of transistor the B1H is connected to the collector of the transistor B1L, and the emitter of the transistor B2H is connected to the collector of the transistor B2L. The emitters of the transistors A1L, A2L, B1L and B2L are all connected to a DC input/output terminal 30N. Also, the smoothing capacitor 32 is connected between the DC input/output terminals 30P, 30N.

AC input/output terminals 30A1, 30A2, 30B1 and 30B2 of the bridge circuit 31 are connected respectively to AC input/output terminals 141 and 142 of one side and the other side of the α-phase annular coil 14 and AC input/output terminals 151 and 152 of one side and the other side of the β-phase annular coil. Here, the AC input/output terminal 30A1 of the bridge circuit 31 is connected to the emitter of the transistor A1H and the collector of the transistor A1L, the AC input/output terminal 30A2 is connected to the emitter of the transistor A2H and the collector of the transistor A2L, the AC input/output terminal 30B1 is connected to the emitter of the transistor B1H and the collector of the transistor B1L, and the AC input/output terminal 30B2 is connected to the emitter of the transistor B2H and the collector of the transistor B2L.

A high-voltage type nickel-hydrogen battery 33 that performs transfer of electrical power with the claw pole motor is connected to the driving circuit 30.

The driving circuit 30 controls the actuation and the regenerative operation of the claw pole motor in response to control commands from a control unit (not illustrated). For example, when driving the claw pole motor, DC power output from the battery 33 is converted to two-phase AC power (i.e., α-phase AC power and β-phase AC power) having a phase difference of 90° to be supplied to the claw pole motor. During regenerative operation of the claw pole motor, three-phase AC power output from the claw pole motor is converted to DC power to be stored in the battery 33.

The power conversion operation of the driving circuit 30 is controlled in accordance with a pulse input from the control unit to the gates of the transistors A1H to B2L in the bridge circuit 31, that is, a pulse for turning ON/OFF the transistors A1H to B2L by pulse width modulation (PWM), with the pulse duty ratio, that is the map (data) of the ON/OFF ratio, stored in the control unit beforehand.

The stator 10 according to the present embodiment is provided with the aforementioned constitution. Next will be described the result of a test of supplying a sinusoidal currents of two phases (α-phase current and β-phase current) having a phase difference of 90° to a claw pole motor equipped with this stator 10.

In this test, the α-phase current and the β-phase current, which are the sinusoidal currents of two phases having a phase difference of 90°, are supplied to the α-phase annular coil 14 and the β-phase annular coil 15 respectively, and changes in the torque output from the claw pole motor are detected. The results of this test are shown in FIG. 5.

Figure 5:
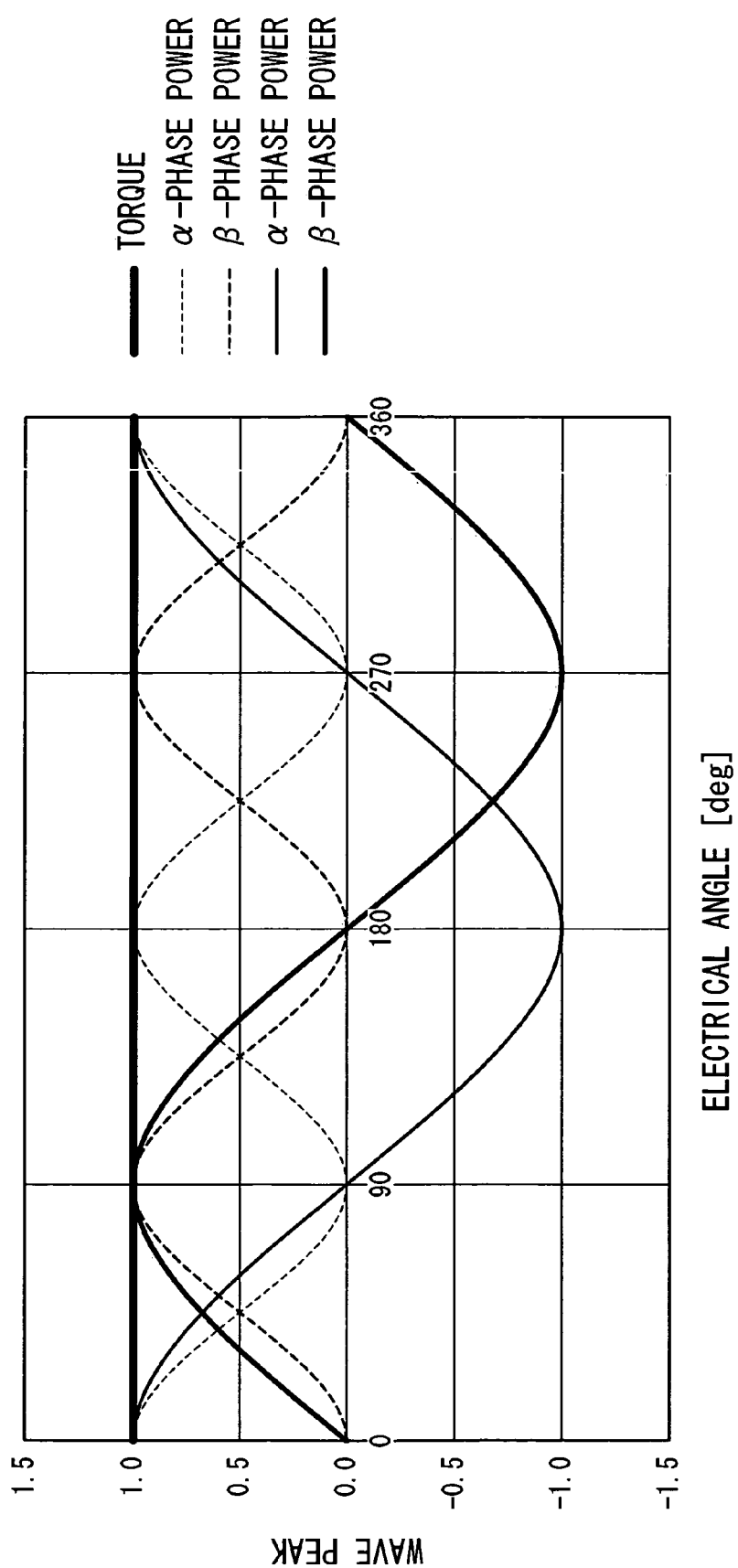
FIG. 5 is a graph showing changes in a peak value of torque output from a claw pole motor as a test result of energizing the claw pole type motor equipped with the claw pole-type stator according to the embodiment of the present invention with two-phase sinusoidal current forming of α-phase current and β-phase current having a phase difference of 90°.

As shown in FIG. 5, for a change of one cycle (i.e., 360° in terms of electrical angle) in the α-phase current and the β-phase current, which are two-phase sinusoidal electrical currents having a phase difference of 90°, the α-phase power and the β-phase power show a change of two cycles, ensuring that the peak value of torque output from the claw pole motor maintains the prescribed value.

As stated above, the stator 10 of the present embodiment can prevent mismatch from occurring among the inductances of each phase by being provided with annular coils 14 and 15 of two phases, an even number, that are independently energized; can generate a four-phase rotating magnetic field, the fewest number of phases after three phases; and can prevent structural complication of the stator 10 required to generate a rotating magnetic field.

Modification Example of the First Embodiment

Figure 6:
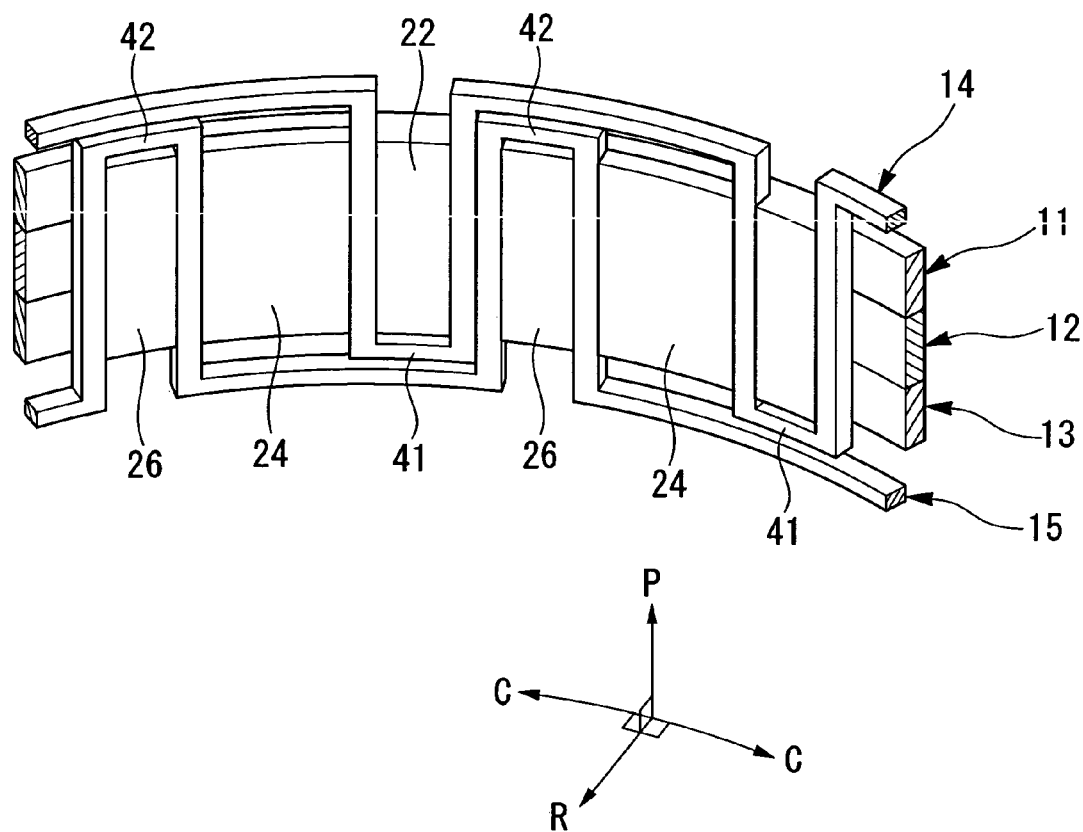
FIG. 6 is a perspective view showing a portion of a claw pole-type stator according to a modification of the embodiment of the present invention.
Figure 7:
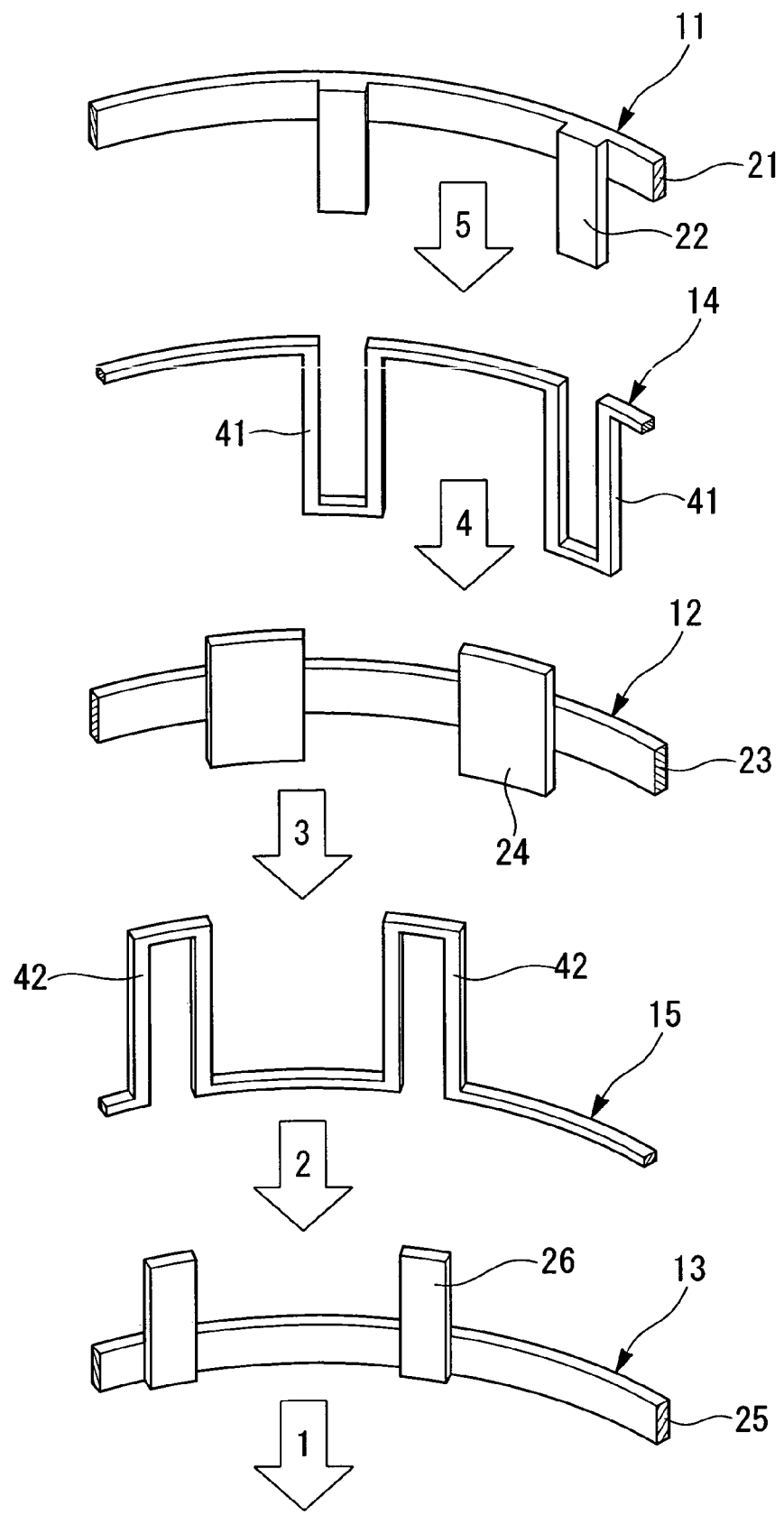
FIG. 7 is an exploded perspective view showing a constitution of the claw pole-type stator according to the modification of the embodiment of the present invention.

In the first embodiment, the α-phase annular coil 14 and the β-phase annular coil 15 of two phases have a simple circular shape, but are not limited thereto. As shown in FIG. 6 and FIG. 7, the annular coils 14 and 15 may be constituted to surround the circumference around the axis while meandering in a crank shape within the circumferential surface, being provided with a plurality of α-phase meandering portions 41, and β-phase meandering portions 42.

In this modification example, the width of the meandering portions 41 and 42 in a circumferential direction C, that is, a coil pitch, is set to be an electrical angle of 90°. The meandering portions 41 and 42 are configured to project in mutually different directions (that is, toward the one and the other sides in the axial direction P, which are mutually opposing directions). The α-phase annular coil 14 and the β-phase annular coil 15 are disposed at relatively shifted positions along the circumferential direction C so as to have a phase difference of 90° in terms of electrical angle. Thereby, the meandering portions 41 and 42, which alternately project in mutually opposite directions, are alternately arranged along the circumferential direction C, so that the annular coils 14 and 15 of the two phases are disposed so as not to mutually cross.

One A-phase claw pole 22 is mounted in each α-phase meandering portion 41, and one D-phase claw pole 26 is mounted in each β-phase meandering portion 42, and one B-phase claw pole 24 is disposed between each A-phase claw pole 22 and each D-phase claw pole 26 that are adjacent in the circumferential direction C.

Thereby, the annular coils 14 and 15 of two phases, which are disposed so as to weave between the claw poles 22 and 24, or the claw poles 24 and 26 adjacent in the circumferential direction C, have so-called short-pitch wave windings.

Second Embodiment

A second embodiment of a stator of the present invention will be explained below with reference to the accompanying drawings.

A stator 110 according to the present embodiment is, similarly to the first embodiment, a constituent element of a claw pole motor mounted, for example, in a hybrid vehicle as a driving source of the vehicle together with an internal combustion engine. For example, in a parallel hybrid vehicle of a structure in which the internal combustion engine, the claw pole motor, and a gear transmission are linked in series, a driving power of at least either the internal combustion engine or the claw pole motor is transmitted to driving wheels of the vehicle through the gear transmission.

When the driving power is transmitted to the claw pole motor from the driving wheels during deceleration of the vehicle, the claw pole motor serves as a generator that generates so-called regenerative-braking force and recover the kinetic energy of the vehicle in the form of electrical energy (regenerative energy). Furthermore, the claw pole motor also serves as a generator to produce electrical energy when the power of the internal combustion engine is transmitted to the claw pole motor.

Figure 8:
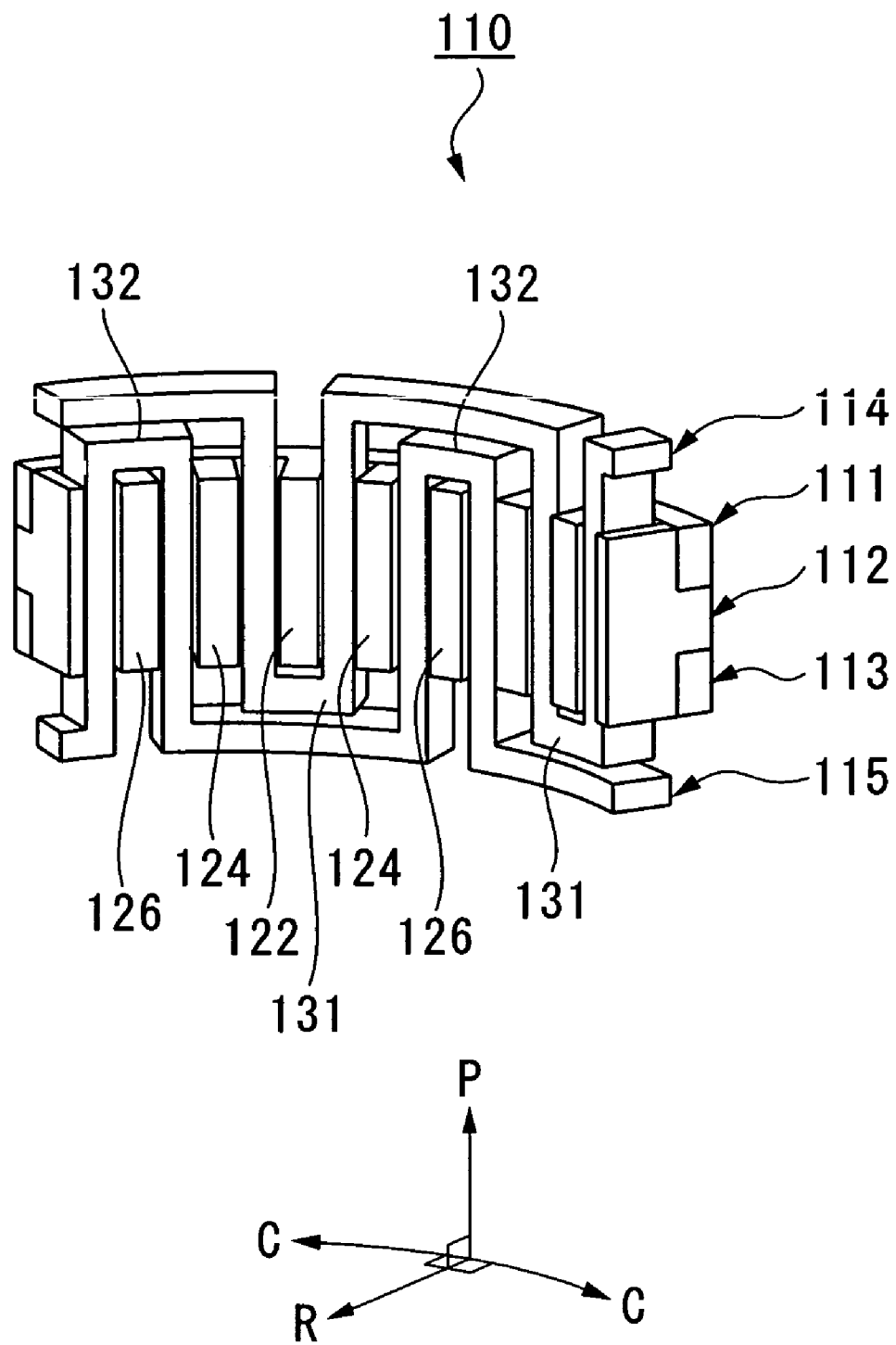
FIG. 8 is a perspective view showing a portion of a stator according to a second embodiment of the present invention.

As shown for example in FIG. 8, the stator 110, which generates a rotating magnetic field for rotating a rotor (not illustrated), is provided with an U-phase stator ring 111, a V-phase stator ring 112, and a W-phase stator ring 113 for the respective U, V, and W phases, and a U-phase annular coil 114 and a W-phase annular coil 115 for the respective U and W phases.

Figure 9:
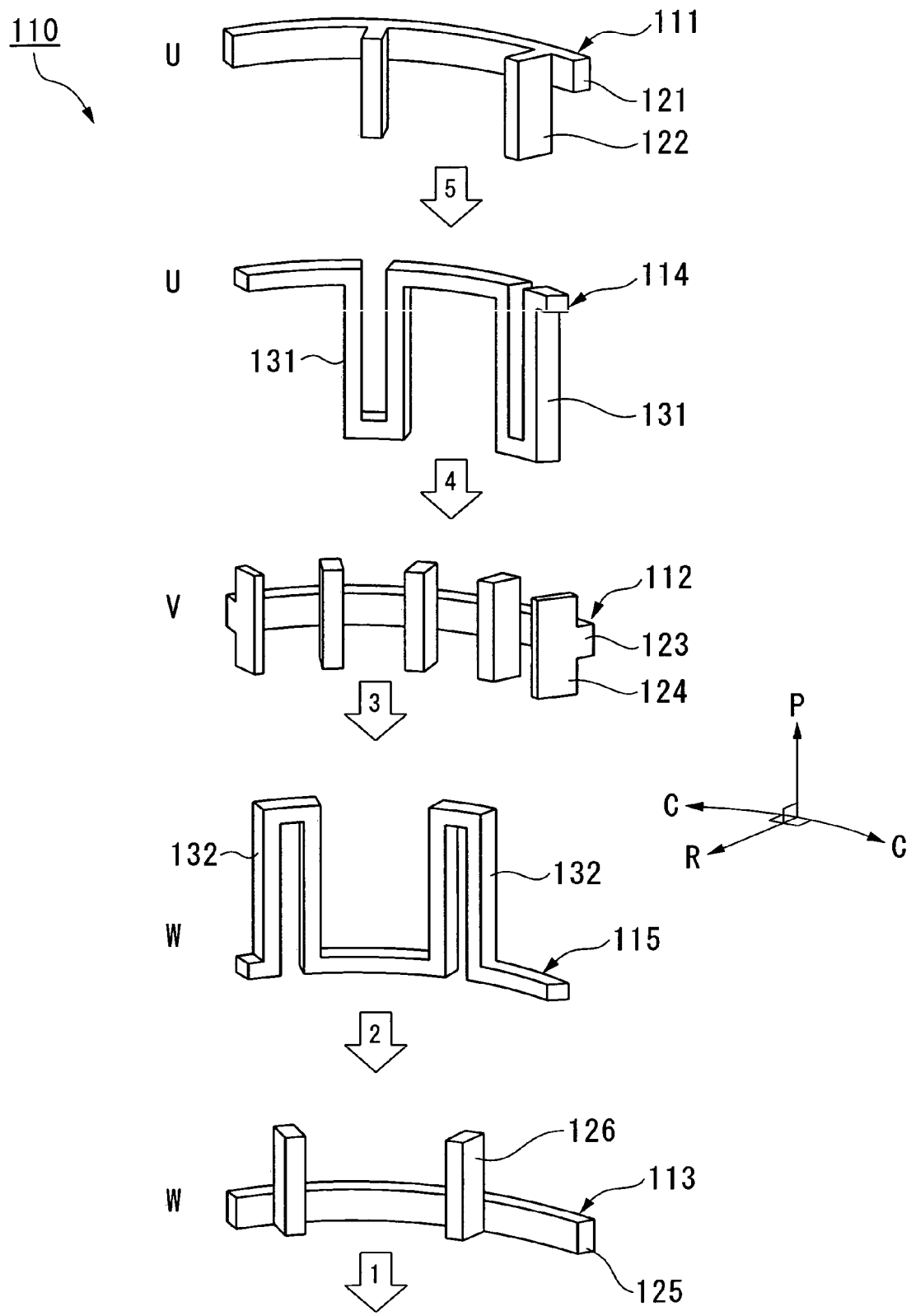
FIG. 9 is an exploded perspective view showing a portion of the stator according to the second embodiment of the present invention.

As shown, for example, in FIGS. 8 and 9, the U-phase stator ring 111 is provided with a ring-shaped U-phase yoke 121 and U-phase teeth 122. The U-phase teeth 122 project inward in a radial direction R from positions spaced at a specified interval in a circumferential direction C on the inner circumferential side of the U-phase yoke 121, and project in a first direction along an axis P, with the cross-sectional shape in the radial direction R being rectangular. The cross-sectional shape in the circumferential direction C of the U-phase stator ring 111 having the U-phase yoke 121 and the U-phase teeth 122 is L-shaped.

As shown, for example, in FIGS. 8 and 9, the V-phase stator ring 112 is provided with a ring-shaped V-phase yoke 123 and V-phase teeth 124. The V-phase teeth 124 project inward in the radial direction R from positions spaced at a specified interval in the circumferential direction C on the inner circumferential side of the V-phase yoke 123, and project in the first direction and a second direction along the axis P, with the cross-sectional shape in the radial direction R being rectangular. The cross-sectional shape in the circumferential direction C of the V-phase stator ring 112 having the V-phase yoke 123 and the V-phase teeth 124 is T-shaped.

As shown, for example, in FIGS. 8 and 9, the W-phase stator ring 113 is provided with a ring-shaped W-phase yoke 125 and W-phase teeth 126. The W-phase teeth 126 project inward in the radial direction R from positions spaced at a specified interval in the circumferential direction C on the inner circumferential side of the W-phase yoke 125, and project in the second direction along the axis P, with the cross-sectional shape in the radial direction R being rectangular. The cross-sectional shape in the circumferential direction C of the W-phase stator ring 113 having the W-phase yoke 125 and the W-phase teeth 126 is L-shaped.

The stator rings 111, 112, and 113 are, as shown, for example, in FIG. 8, joined so that the yokes 121, 123, and 125 are superimposed in the axial direction P. The teeth 122, 124, and 126 are arranged in the circumferential direction C in a specified order (for example, in the order of U-phase tooth 122, V-phase tooth 124, W-phase tooth 126, V-phase tooth 124, etc.). Slots where the U-phase annular coil 114 is to be disposed are formed between the teeth 122 and 124 that are adjacent in the circumferential direction C. Slots where the W-phase annular coil 115 is to be disposed are formed between the teeth 124 and 126 that are adjacent in the circumferential direction C.

The annular coils 114 and 115, which are formed by, for example, flat wire having a specified thickness, surround the circumference around the axis while meandering in a crank shape within the circumferential surface, to be thereby provided with a plurality of U-phase meandering portions 131 and W-phase meandering portions 132, respectively.

The width of the meandering portions 131 and 132 in the circumferential direction C, that is, a coil pitch, is set to a specified value of not more than an electrical angle of 120°, as shown, for example, in FIG. 10. The meandering portions 131 and 132 are configured to project in mutually different directions (that is, the first direction and the second direction along the axis P, which are mutually opposing directions). The U-phase annular coil 114 and the W-phase annular coil 115 are disposed at relatively shifted positions along the circumferential direction C so as to have a phase difference of 240° in terms of electrical angle. Thereby, the meandering portions 131 and 132, which alternately project in mutually opposite directions, are alternately arranged along the circumferential direction C, so that the annular coils 114 and 115 of the two phases are disposed so as not to cross each other.

One U-phase tooth 122 is disposed in each U-phase meandering portion 131, and one W-phase tooth 126 is disposed in each W-phase meandering portion 132. One V-phase tooth 124 is disposed between each U-phase meandering portion 131 and each W-phase meandering portion 132 that are adjacent in the circumferential direction C.

Thereby, the annular coils 114 and 115 of two phases, which are disposed so as to weave between the teeth 122 and 124 or between the teeth 124 and 126 adjacent in the circumferential direction C, have so-called short-pitch wave windings of not more than 120° in terms of electrical angle.

Figure 11A:
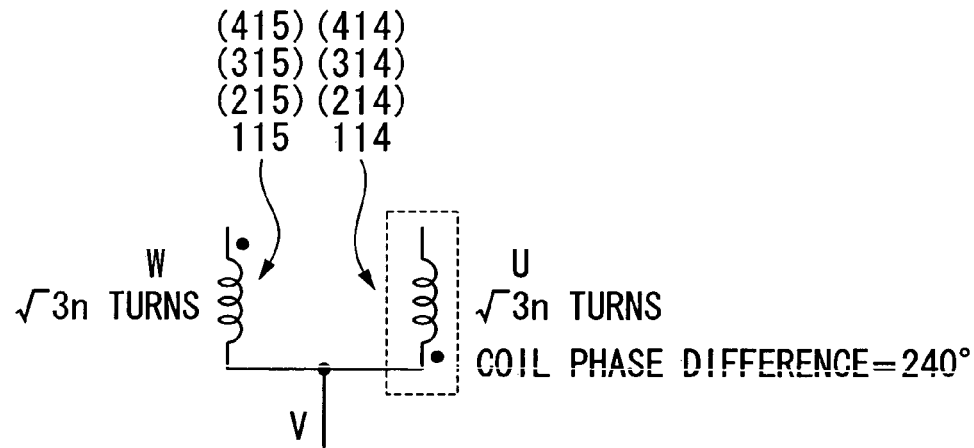
FIG. 11A is a diagram showing a connected state of annular coils of the stator according to the second embodiment shown in FIG. 8, a fifth embodiment or a sixth embodiment.

The annular coils 114 and 115 of two phases having a phase difference (coil phase difference) of 240° in terms of electrical angle are as shown, for example, in FIG. 11A connected in a V-shape, and energized with sinusoidal waves having a mutual phase difference of 120°. Thereby, for example, when leakage flux can be disregarded, as shown in FIG. 11C, a rotating magnetic field is produced similar to that of a three-phase stator in which its coils of the U, V, and W phases are connected in a Y-shape and energized by sinusoidal waves with a mutual phase difference of 120°.

Figure 11B:
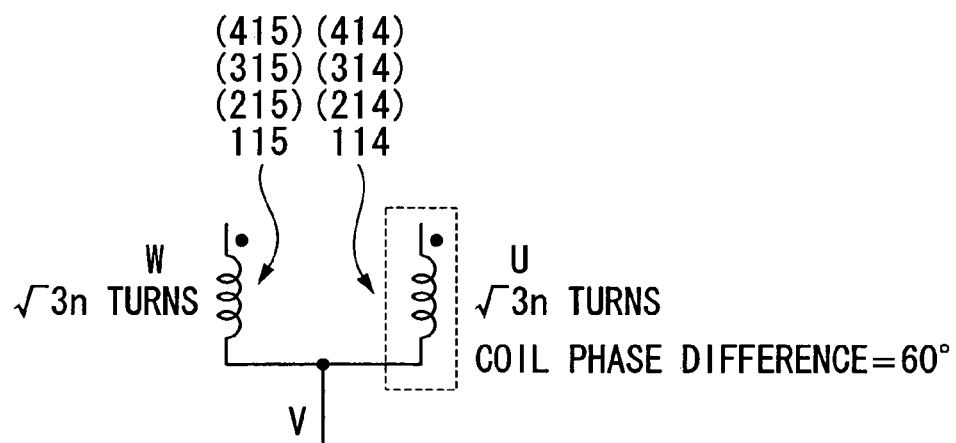
FIG. 11B is a diagram showing a connected state of the annular coils of the stator according to the second embodiment, the fifth embodiment or the sixth embodiment of the present invention.
Figure 11C:
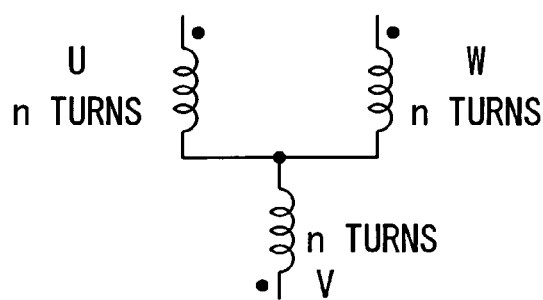
FIG. 11C is a diagram showing a connected state of a stator of three phases (U-phase, V-phase and W-phase).

When connecting the annular coils 114 and 115 of two phases having a phase difference of 60° in terms of electrical angle in a V-shape with their meandering portions 131 and 132 projecting in the same direction (that is, the first direction or the second direction along the axis P) as shown, for example, in FIG. 11B, similarly to connecting the annular coils 114 and 115 of two phases having a phase difference of 240° in terms of electrical angle in a V-shape with their meandering portions 131 and 132 projecting in mutually different directions (that is, the first direction and the second direction along the axis P) as shown in FIG. 11A, in the case of being energized with sinusoidal waves having a mutual phase difference of 120°, for example, when leakage flux can be disregarded, as shown in FIG. 11C, a rotating magnetic field can be produced similarly to that of a three-phase stator in which its coils of U, V, and W phases are connected in a Y-shape and energized by sinusoidal waves with a mutual phase difference of 120°.

That is, ignoring phase resistance, the voltage equation of a three-phase (U-phase, V-phase, W-phase) motor can be written as Eq. (1) below, with Vu, Vv, and Vw being phase voltage command values; Iu, Iv, and Iw being phase currents; L being the self-inductance of each phase; M being the mutual inductance; ω being the angular velocity of the rotor; and Ke being the induced voltage constant.

Note that in Eq. (1), L=−2M, and leakage flux disregarded.

$$\begin{bmatrix} V_u \\ V_v \\ V_w \end{bmatrix} = \frac{d}{dt} \begin{bmatrix} L & M & M \\ M & L & M \\ M & M & L \end{bmatrix} \begin{bmatrix} I_u \\ I_v \\ I_w \end{bmatrix} + \omega \quad (1)$$

$$Ke \begin{bmatrix} \sin\omega t \\ \sin(\omega t - \frac{2}{3}\pi) \\ \sin(\omega t + \frac{2}{3}\pi) \end{bmatrix} \approx \frac{d}{dt} L \begin{bmatrix} 2 & -1 & -1 \\ -1 & 2 & -1 \\ -1 & -1 & 2 \end{bmatrix} \begin{bmatrix} I_u \\ I_v \\ I_w \end{bmatrix} + \omega Ke \begin{bmatrix} \sin\omega t \\ \sin(\omega t - \frac{2}{3}\pi) \\ \sin(\omega t + \frac{2}{3}\pi) \end{bmatrix}$$

In Eq. (1), since the phase currents Iu, Iv, and Iw can be expressed by any two phase currents, by canceling out the V-phase current Iv with the U-phase current Iu and the W-phase current Iw, a line-to-line voltage from the voltage command values Vu, Vv, Vw (for example, a line-to-line voltage Vuv between the U-phase and V-phase (=Vu−Vv), and a line-to-line voltage Vwv between the W-phase and V-phase (=Vw−Vv)) is expressed as shown in Eq. (2) below.

$$\begin{bmatrix} V_{uv} \\ V_{wv} \end{bmatrix} = \begin{bmatrix} 1 & -1 & 0 \\ 0 & -1 & 1 \end{bmatrix} \begin{bmatrix} V_u \\ V_v \\ V_w \end{bmatrix} \quad (2)$$

$$= \begin{bmatrix} 1 & -1 & 0 \\ 0 & -1 & 1 \end{bmatrix} \frac{d}{dt} \begin{bmatrix} L & M & M \\ M & L & M \\ M & M & L \end{bmatrix} \begin{bmatrix} 1 & 0 \\ -1 & -1 \\ 0 & 1 \end{bmatrix} \begin{bmatrix} I_u \\ I_w \end{bmatrix} +$$

$$\begin{bmatrix} 1 & -1 & 0 \\ 0 & -1 & 1 \end{bmatrix} \omega$$

$$Ke \begin{bmatrix} \sin\omega t \\ \sin(\omega t - \frac{2}{3}\pi) \\ \sin(\omega t + \frac{2}{3}\pi) \end{bmatrix} = \frac{d}{dt}(L-M) \begin{bmatrix} 2 & 1 \\ 1 & 2 \end{bmatrix} \begin{bmatrix} I_u \\ I_w \end{bmatrix} + \omega Ke \begin{bmatrix} \sqrt{3}\sin(\omega t + \frac{\pi}{6}) \\ \sqrt{3}\cos\omega t \end{bmatrix}$$

$$\approx \frac{d}{dt} L \begin{bmatrix} 3 & 1.5 \\ 1.5 & 3 \end{bmatrix} \begin{bmatrix} I_u \\ I_w \end{bmatrix} + \omega Ke \begin{bmatrix} \sqrt{3}\sin(\omega t + \frac{\pi}{6}) \\ \sqrt{3}\cos\omega t \end{bmatrix}$$

A model that eliminates, for example, the V-phase from the voltage equation of the three-phase (U-phase, V-phase, W-phase) motor shown in Eq. (1) above is described as shown in Eq. (3) below.

$$\begin{bmatrix} V_{uv} \\ V_{wv} \end{bmatrix} = \frac{d}{dt} \begin{bmatrix} L & M \\ M & L \end{bmatrix} \begin{bmatrix} I_u \\ I_w \end{bmatrix} + \omega Ke \begin{bmatrix} \sin\omega t \\ \sin\left(\omega t + \frac{2}{3}\pi\right) \end{bmatrix} \quad (3)$$

$$\approx \frac{d}{dt}L\begin{bmatrix} 1 & -0.5 \\ -0.5 & 1 \end{bmatrix} \begin{bmatrix} I_u \\ I_w \end{bmatrix} + \omega Ke \begin{bmatrix} \sin\omega t \\ \sin\left(\omega t + \frac{2}{3}\pi\right) \end{bmatrix}$$

By inverting the orientation of the W-phase coil (that is, inverting the direction of rotation of the rotor), the model shown in Eq. (3) above is expressed as shown in Eq. (4) below.

$$\begin{bmatrix} V_u \\ V_w \end{bmatrix} = \frac{d}{dt} \begin{bmatrix} L & -M \\ -M & L \end{bmatrix} \begin{bmatrix} I_u \\ I_w \end{bmatrix} + \omega Ke \begin{bmatrix} \sin\omega t \\ -\sin\left(\omega t + \frac{2}{3}\pi\right) \end{bmatrix} \quad (4)$$

$$\approx \frac{d}{dt}L\begin{bmatrix} 1 & 0.5 \\ 0.5 & 1 \end{bmatrix} \begin{bmatrix} I_u \\ I_w \end{bmatrix} + \omega Ke \begin{bmatrix} \sin\omega t \\ -\sin\left(\omega t + \frac{2}{3}\pi\right) \end{bmatrix}$$

By altering the number of turns "n" of the coils to a multiple of √3, the model shown in Eq. (4) above can be expressed as shown in Eq. (5) below.

$$\begin{bmatrix} V_u \\ V_w \end{bmatrix} = \frac{d}{dt} 3\begin{bmatrix} L & -M \\ -M & L \end{bmatrix} \begin{bmatrix} I_u \\ I_w \end{bmatrix} + \omega Ke \begin{bmatrix} \sqrt{3}\sin\omega t \\ -\sqrt{3}\sin\left(\omega t + \frac{2}{3}\pi\right) \end{bmatrix} \quad (5)$$

$$\approx \frac{d}{dt}L\begin{bmatrix} 3 & 1.5 \\ 1.5 & 3 \end{bmatrix} \begin{bmatrix} I_u \\ I_w \end{bmatrix} + \omega Ke \begin{bmatrix} \sqrt{3}\sin\omega t \\ -\sqrt{3}\sin\left(\omega t + \frac{2}{3}\pi\right) \end{bmatrix}$$

By moving the angle of origin of the phase of the induced voltages by 90° (=π/2) and performing substitution with the U-phase component and the W-phase component, the model shown in the above-mentioned Eq. (5) can be expressed as Eq. (6) below, which is equivalent to the above-mentioned Eq. (2).

$$\begin{bmatrix} V_{uv} \\ V_{wv} \end{bmatrix} = \frac{d}{dt} 3\begin{bmatrix} L & -M \\ -M & L \end{bmatrix} \begin{bmatrix} I_u \\ I_w \end{bmatrix} + \omega Ke \begin{bmatrix} \sqrt{3}\sin\left(\omega t + \frac{\pi}{6}\right) \\ \sqrt{3}\cos\omega t \end{bmatrix} \quad (6)$$

$$\approx \frac{d}{dt}L\begin{bmatrix} 3 & 1.5 \\ 1.5 & 3 \end{bmatrix} \begin{bmatrix} I_u \\ I_w \end{bmatrix} + \omega Ke \begin{bmatrix} \sqrt{3}\sin\left(\omega t + \frac{\pi}{6}\right) \\ \sqrt{3}\cos\omega t \end{bmatrix}$$

The stator 110 according to the present embodiment is provided with the aforementioned constitution. Next, a method of manufacturing the stator 110 will be explained below with reference to the accompanying drawings.

As shown, for example, in FIGS. 9 and 10, by forming the U-phase annular coil 114 and the W-phase annular coil 115 into a crank shape so as to have a coil pitch of a specified value of not more than an electrical angle of 120°, a plurality of U-phase meandering portions 131 and W-phase meandering portions 132 are formed. The meandering portions 131 and 132 are configured to protrude in mutually opposing directions (that is, a first direction and a second direction along the axis P) of the U-phase annular coil 114 and the W-phase annular coil 115, with the annular coils 114 and 115 being disposed coaxially with respect to the axis.

The W-phase stator ring 113, which is provided with a plurality of W-phase teeth 126 that project in the first direction of the axis P, is disposed at a specified position that is coaxial with respect to the axis.

Next, the W-phase annular coil 115 is relatively moved from the second direction to the first direction along the axis P with respect to the W-phase stator ring 113, and the plurality of W-phase teeth 126 of the W-phase stator ring 113 are relatively inserted into the W-phase meandering portions 132 of the W-phase annular coil 115.

Next, the V-phase stator ring 112 is relatively moved from the second direction to the first direction along the axis P with respect to the W-phase annular coil 115 in the state of being disposed coaxially with respect to the axis, and a specified number (for example, two) of the V-phase teeth 124 of the V-phase stator ring 112 are inserted between the W-phase meandering portions 132 that are adjacent in the circumferential direction C of the W-phase annular coil 115. The W-phase yoke 125 of the W-phase stator ring 113 and the V-phase yoke 123 of the V-phase stator ring 112 are thereby joined so as to be superimposed along the axis P.

Next, the U-phase annular coil 114 is relatively moved from the second direction to the first direction along the axis P with respect to the W-phase annular coil 115 in the state of the U-phase annular coil 114 being disposed at a position relatively shifted along the circumferential direction C with respect to the W-phase annular coil 115, so that the U-phase annular coil 114 and the W-phase annular coil 115 have a phase difference of 240° in terms of electrical angle. Then, the meandering portions 131 and 132 that project in mutually opposing directions are alternately arranged along the circumferential direction C, the annular coils 114 and 115 of the two phases are disposed so as not to cross each other, and the U-phase meandering portions 131 are inserted between the V-phase teeth 124 that are adjacent in the circumferential direction C.

Next, the U-phase stator ring 111 is relatively moved from the second direction to the first direction along the axis P with respect to the U-phase annular coil 114 in the state of the U-phase stator ring 111 being disposed coaxially with respect to the axis, so that the U-phase teeth 122 of the U-phase stator ring 111 are relatively inserted into the U-phase meandering portions 131 of the U-phase annular coil 114. The V-phase yoke 123 of the V-phase stator ring 112 and the U-phase yoke 121 of the U-phase stator ring 111 are thereby joined so as to be superimposed along the axis P.

According to the stator ring 110 of the second embodiment, the annular coils 114 and 115 of two phases connected in a V-shape and having a mutual phase difference of 240° or 60° in terms of electrical angle can generate a rotating magnetic field similar to a three-phase stator in which coils of three phases U, V and W are connected in a Y-shape. Accordingly, by reducing the number of phases of coils required, the number of parts needed for constructing the stator 110 is reduced, the structure of the stator 110 is simplified, and excessive increases in the height of the coil end and the dimension of the motor in the axial direction due to crossover of the coils from positional interference of the lateral portions of the coils can be prevented.

Figure 12:
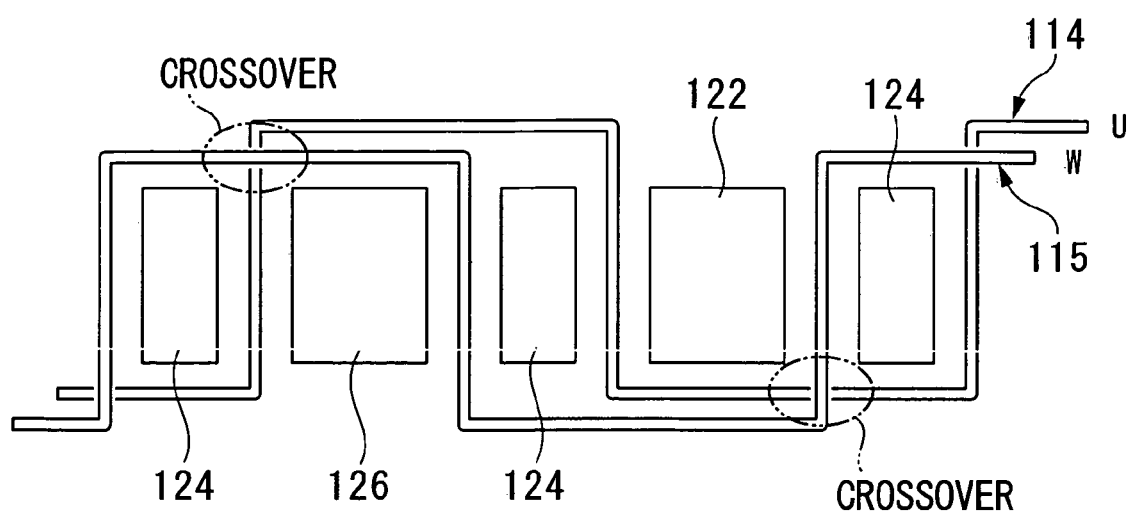
FIG. 12 is a schematic view showing an example of a state of positional crossover between annular coils.

Moreover, since the meandering portions 131 and 132 that alternately project in mutually opposing directions in the annular coils 114 and 115 of two phases are alternately arranged along the circumferential direction C, crossover as shown in FIG. 12 due to positional interference of the annular coils 114 and 115 is prevented, which can prevent increases in the coil end height and the dimensions of the stator 110 in the axial direction P.

In addition, the stator 110 can be easily manufactured by the simple procedure of alternately arranging the stator rings 111 and 112 and 113 of the three phases and the annular coils 114 and 115 of the two phases so as to be superimposed along the P axis.

First Modification of Second Embodiment

Figure 13:
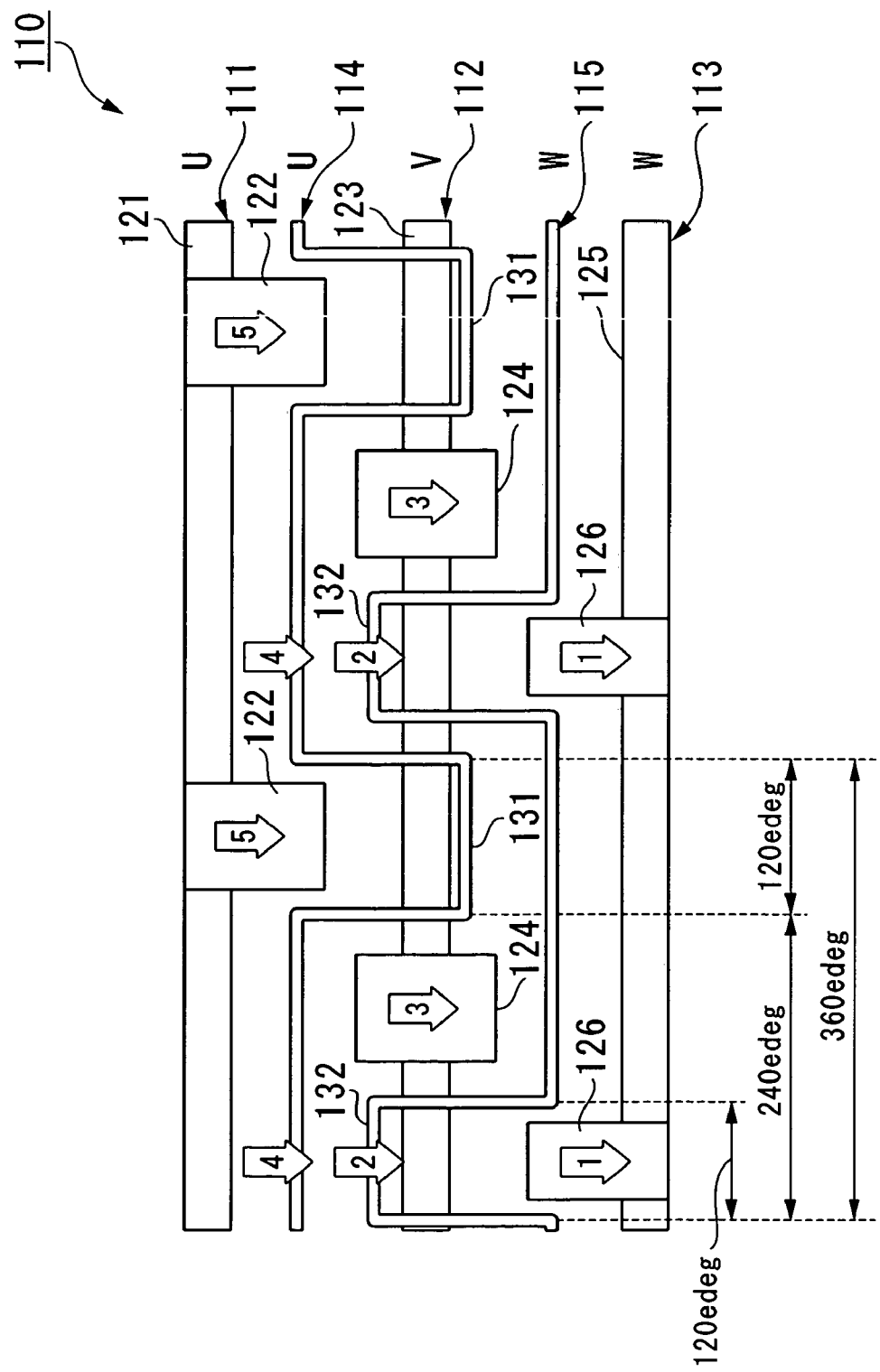
FIG. 13 is an exploded view showing a portion of a stator according to a first modification example of the second embodiment of the present invention.

In the second embodiment, the width in the circumferential direction C of the meandering portions 131 and 132 in the annular coils 114 and 115, that is, the coil pitch, is set to a specified value of not more than an electrical angle of 120°. However, as in a first modification shown, for example, in FIG. 13, by specifically setting the coil pitch to an electrical angle of 120°, the V-phase teeth 124 of the V-phase stator ring 112 to be relatively inserted between the U-phase meandering portions 131 that are adjacent in the circumferential direction C of the U-phase annular coil 114 and the W-phase meandering portions 132 that are adjacent in the circumferential direction C of the W-phase annular coil 115 can be of a single type.

Thereby, the W-phase teeth 126, the V-phase teeth 124, and the U-phase teeth 122 are arranged sequentially in the circumferential direction C, and the magnetic pole width in the circumferential direction C of the teeth 122, 124, and 126 is 120° in terms of electrical angle, and complication of the process of electrification control can be restricted.

In this case, with respect to the U-phase meandering portions 131, the W-phase meandering portions 132 that are adjacent on one side in the circumferential direction C have a phase difference of 240° in terms of electrical angle, and the W-phase meandering portions 132 that are adjacent on the other side in the circumferential direction C have a phase difference of 120°.

Figure 14:
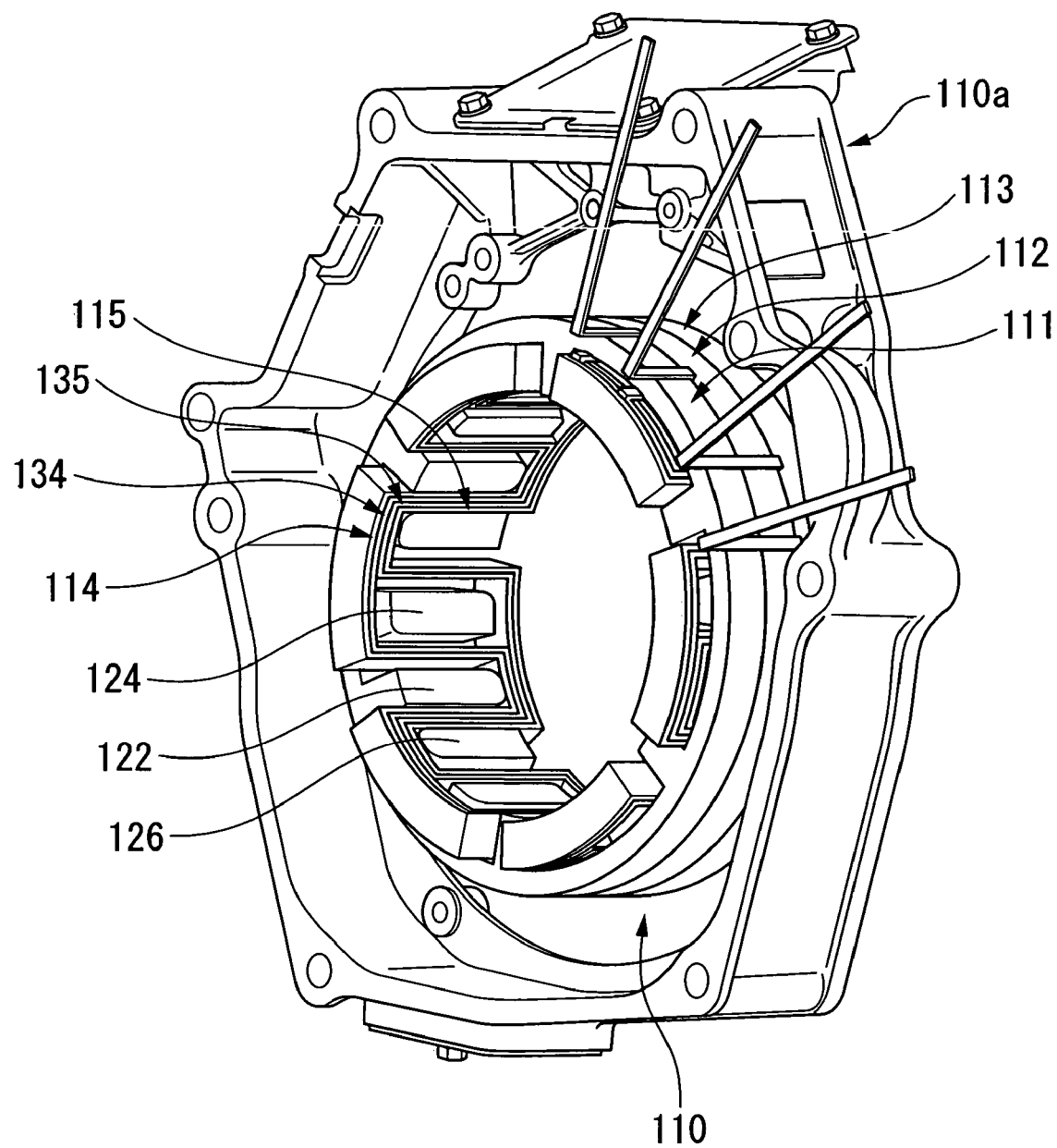
FIG. 14 is a perspective view showing the stator provided with cooling tubes that circulate a cooling medium.
Figure 15:
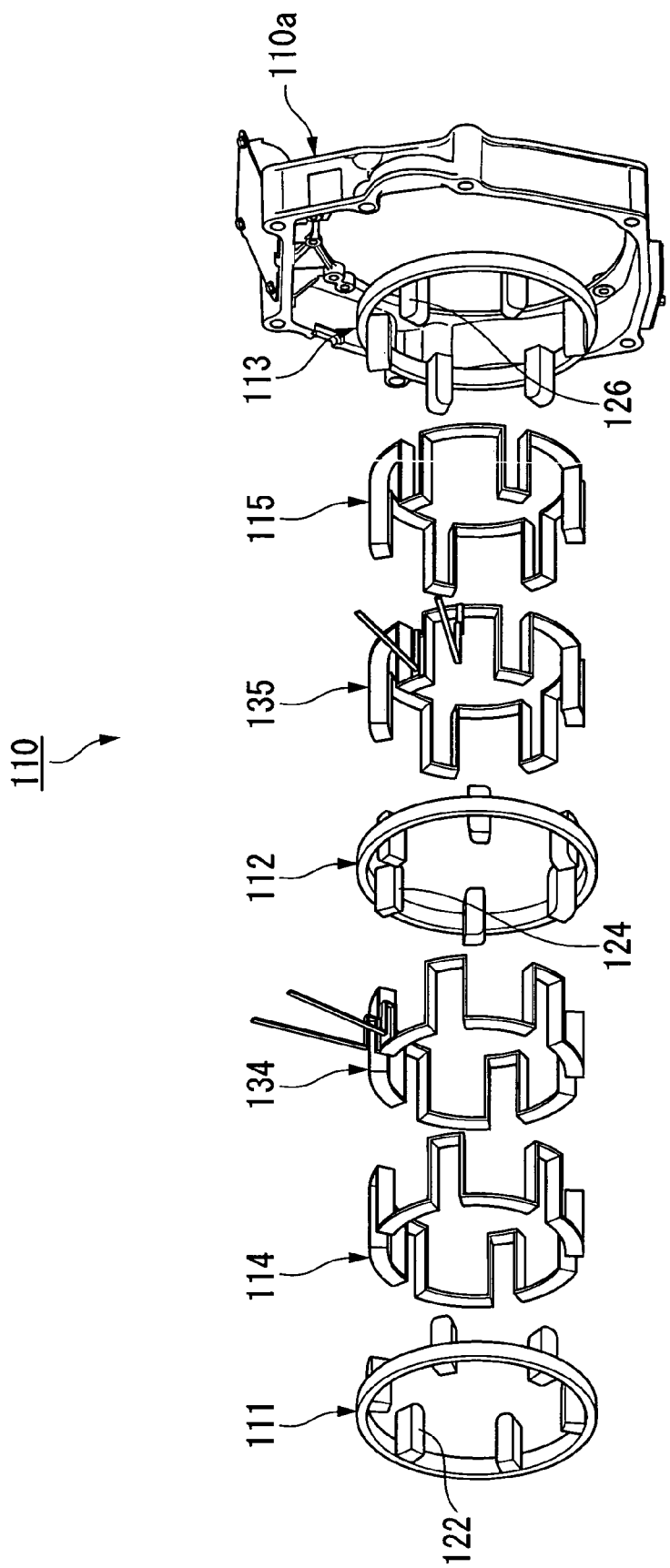
FIG. 15 is an exploded perspective view showing the stator provided with the cooling tubes that circulate the cooling medium.

In the second embodiment, as shown, for example, in FIGS. 14 and 15, the stator 110 that is fixed to a housing 110a via a stator holder (not illustrated), is provided with cooling tubes 134 and 135 that circulate a cooling medium between the annular coils 114 and 115 and the stator body having stator rings 111, 112, and 113 superimposed along the axial direction P. The cooling tubes 134 and 135 have an annular shape conforming to the shape of the annular coils 114 and 115.

For example, the annular coils 114 and 115 of two phases are disposed so as to sandwich the V-phase stator ring 112 from both sides of rotation axis O, and the two cooling tubes 134 and 135 are disposed between the annular coils 114 and 115 of two phases and the V-phase stator ring 112.

The cooling tubes 134 and 135 are formed, for example, with a metal such as aluminum or resin having relatively large thermal conductivity. The cooling tubes 134 and 135 are, for example, square tubes having a rectangular cross section, and are formed by being bent to shapes that conform to the annular coils 114 and 115 that meander. Or, they may be constituted with a plurality of round pipes with round cross sections bent to shapes that conform to the meandering annular coils 114 and 115, the plurality of bent round pipes being disposed so as to be mutually adjacent in the radial direction R.

Thereby, compared to the case of disposing the cooling tubes on the outer part of the stator 110, for example, on the housing 110a that houses the stator 110, the cooling tubes can directly and efficiently cool the annular coils 114 and 115 and the stator body that act as heat sources during electrification. Moreover, the cooling tubes 134 and 135, having a shape that conforms to the shape of the annular coils 114 and 115, can be disposed close to the annular coils 114 and 115 to suppress uneven temperature distribution along the lengths of the annular coils 114 and 115, which serve as heat sources during electrification, and efficiently cool them.

Second Modification of Second Embodiment

In the second embodiment, the annular coils 114 and 115 were made to have a specified thickness, but they are not limited thereto. For example, in the case of setting the coil pitch to be 120° in terms of electrical angle as in the first modification described above, when the number of phases of the annular coils 114 and 115 mounted in slots between the teeth 122, 124, and 126 that are adjacent in the circumferential direction varies between one phase and two phases, compared to the thickness of the annular coils 114 and 115 in slots in which the U-phase annular coil 114 or the W-phase annular coil 115 of one phase is mounted, the thickness of the annular coils 114 and 115 in a slot in which both the U-phase annular coil 114 and the W-phase annular coil 115 of two phases are mounted may be set thin.

Figure 16A:
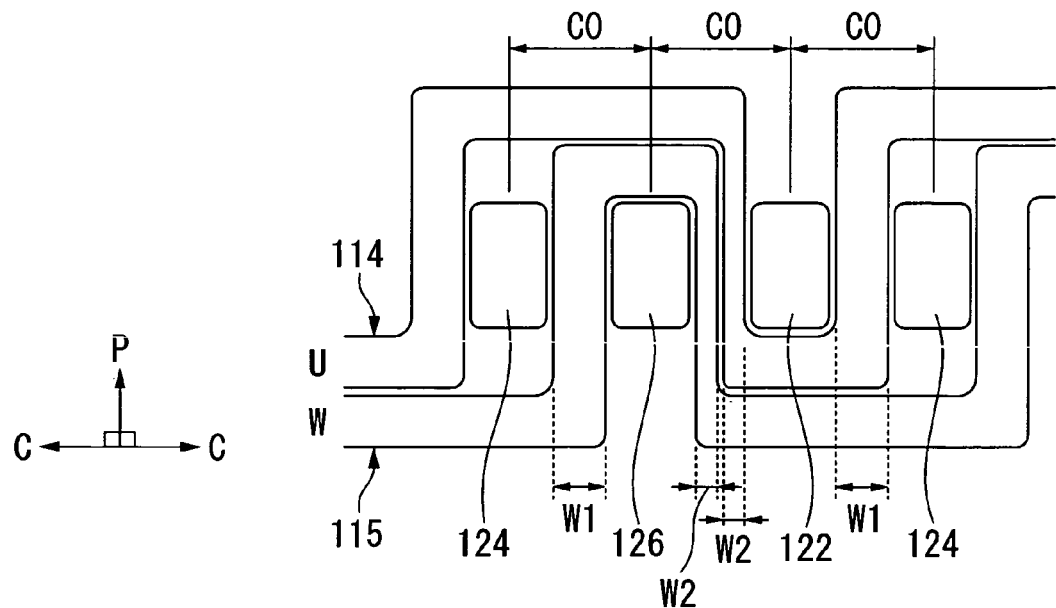
FIG. 16A is a schematic view showing a wound state of annular coils of a stator according to a second modification example of the second embodiment of the present invention.

In the stator 110 according to the second modification, as shown, for example, in FIG. 16A, in the slots in which the U-phase annular coil 114 and the W-phase annular coil 115 of two phases are mounted, that is, in the slots formed by the U-phase teeth 122 and the W-phase teeth 126, the thickness W2, W2 of the annular coils 114 and 115 mutually adjacent in the circumferential direction may be set to be thinner than the thickness W1, W1 of the annular coils 114 and 115 in other locations (for example, $W2 < W1 \approx 2 \times W2$).

Figure 16B:
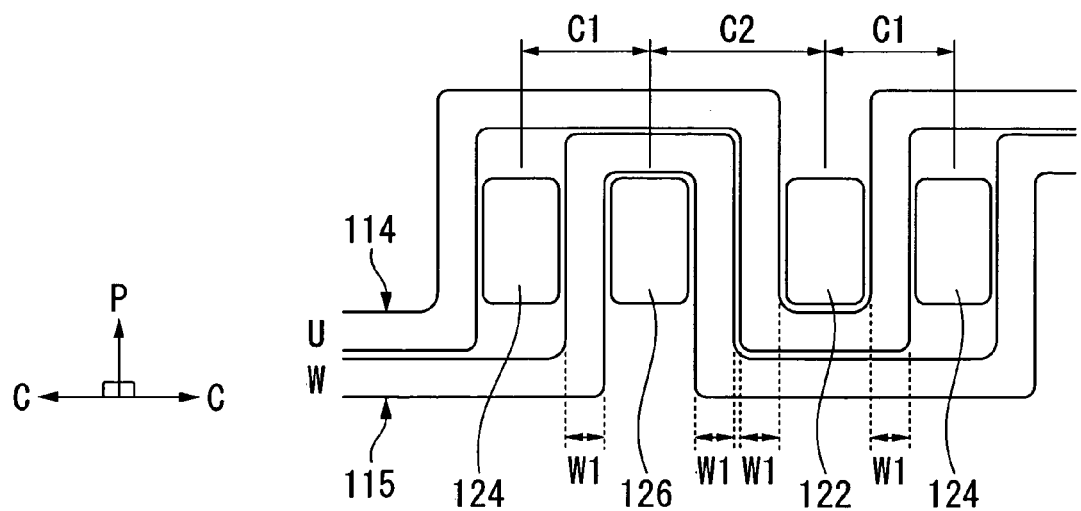
FIG. 16B is a schematic view showing an example of a wound state of annular coils of a specified thickness.

When ensuring the desired winding space factor with respect to each slot by setting each annular coil 114 and 115 to have a specified thickness W1 as shown in FIG. 16B, in accordance with the number of phases of the annular coils 114 and 115 mounted in slots between the teeth 122, 124, and 126 that are adjacent in the circumferential direction C, the intervals between the centroid positions of the teeth 122, 124, and 126 in the circumferential direction C, that is, the teeth pitch (e.g. teeth pitch C1, C2 shown in FIG. 16B) in effect become nonuniform (C2>C1). In contrast, in the second modification, even in the case of the number of phases of the annular coils 114 and 115 mounted in slots between the teeth 122, 124, and 126, which are adjacent in the circumferential direction C, varying between one phase or two phases, it is not necessary to set the interval C0 between each centroid position of the teeth 122, 124, and 126 to be nonuniform in accordance with the number of phases of the annular coils 114 and 115 to be mounted. Thereby, the desired winding space factor with respect to the annular coils 114 and 115 mounted in the slots can be ensured. Accordingly, reductions in the maximum torque that can be output due to, for example, the relative positions of teeth 122, 124, and 126 being nonuniform in the circumferential direction C and increases in the cogging torque and torque ripple can be prevented.

Third Modification of Second Embodiment

Figure 17A:
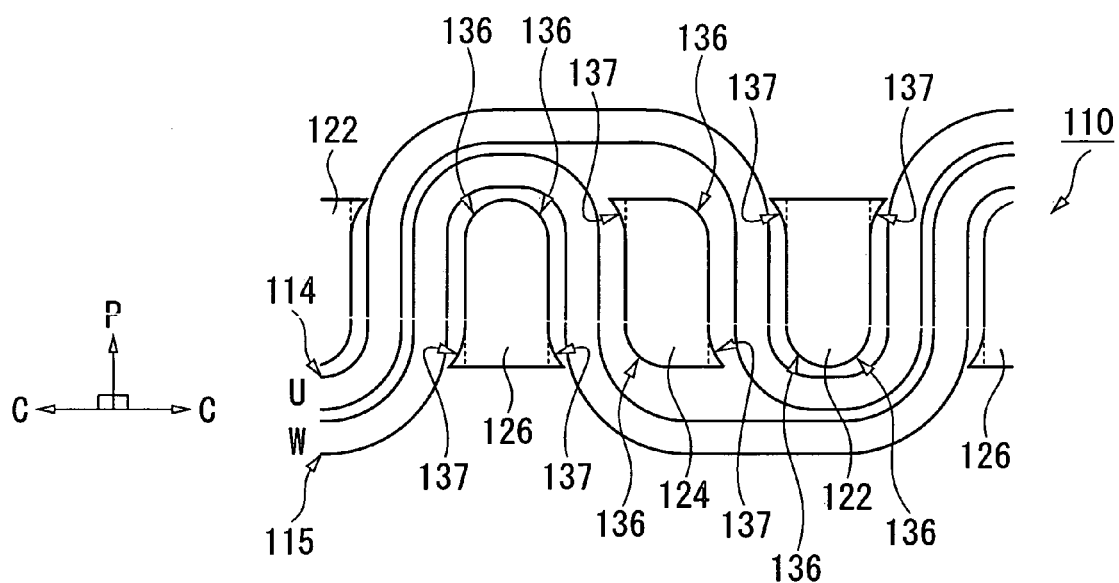
FIG. 17A is a schematic view showing a wound state of annular coils of a stator according to a third modification example of the second embodiment of the present invention.

In the second embodiment, the cross-sectional shape of the teeth 122, 124, and 126 in the radial direction R was made to be rectangular, and the annular coils 114 and 115 meandered in a crank shape, but they are not limited thereto. As shown, for example, in FIG. 17A, with respect to the corner portions of the teeth 122, 124, and 126 on the circumferential surface around the axis, chamfered portions 136 with a chamfered shape may be formed at the corners adjacent on one side in the axial direction P, and extension portions 137 that project in the circumferential direction may be formed at the corners on the other side, with the projection amount in the circumferential direction changing to an increasing tendency the greater the separation from the respective corners on the one side.

Figure 17B:
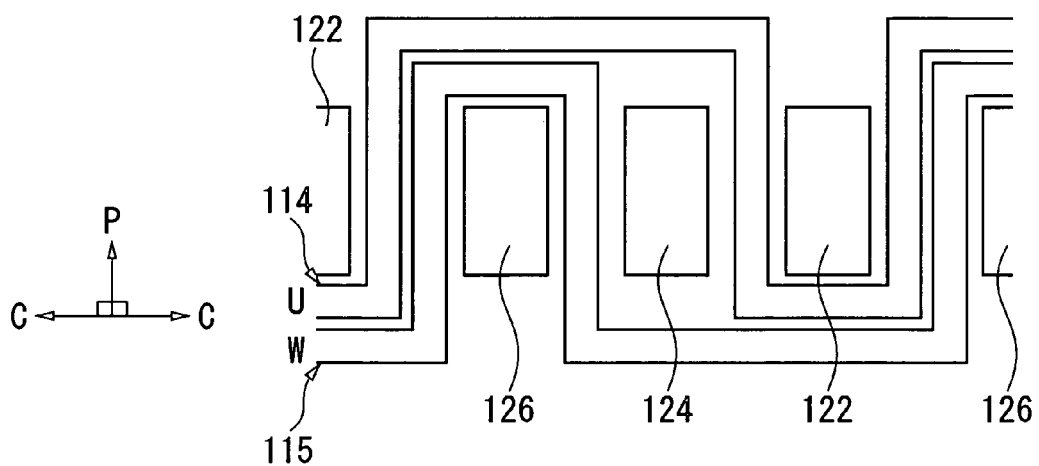
FIG. 17B is a schematic view showing an example of a wound state of annular coils for teeth whose cross-sectional shape in a radial direction R is rectangular.

In the third modification, the annular coils 114 and 115 disposed so as to weave between the teeth 122, 124, and 126 arranged in the circumferential direction smoothly curve along the chamfered portions 136 formed at the corners of the teeth 122, 124, and 126. Therefore, as shown in FIG. 17B, compared to the case of the annular coils 114 and 115 being bent at the corners of the teeth 122, 124, and 126, whose cross-sectional shape in the radial direction R is rectangular, damage to the insulation coating provided on the surface of the annular coils 114 and 115 can be suppressed.

Moreover, the extension portions 137, which are provided at the corners adjacent in the axial direction with respect to the corners having the chamfered portions 136, have shapes conforming to the shapes of the outer periphery side of the curved annular coils 114 and 115, with the projection amount in the circumferential direction changing to an increasing tendency the greater the separation from the respective corners on the one side.

Figure 18:
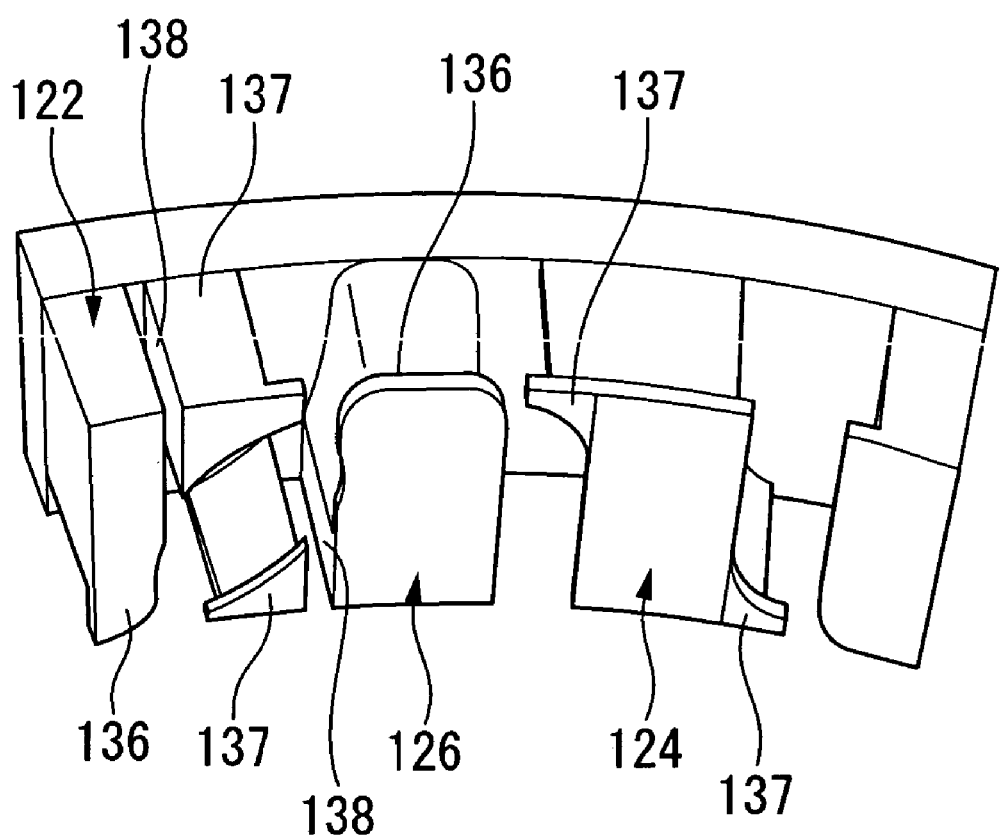
FIG. 18 is a perspective view showing a portion of the stator according to the third modification example of the second embodiment of the present invention.

In the third modification, as shown, for example, FIG. 18, by providing slots 138 between the corner portions and extension portions 137 of the teeth 122, 124, and 126, short-circuiting of magnetic flux via the extension portions 137 can be prevented.

Fourth Modification Example of Second Embodiment

The stator 110 according to the fourth modification example of the second embodiment is explained below.

Figure 19:
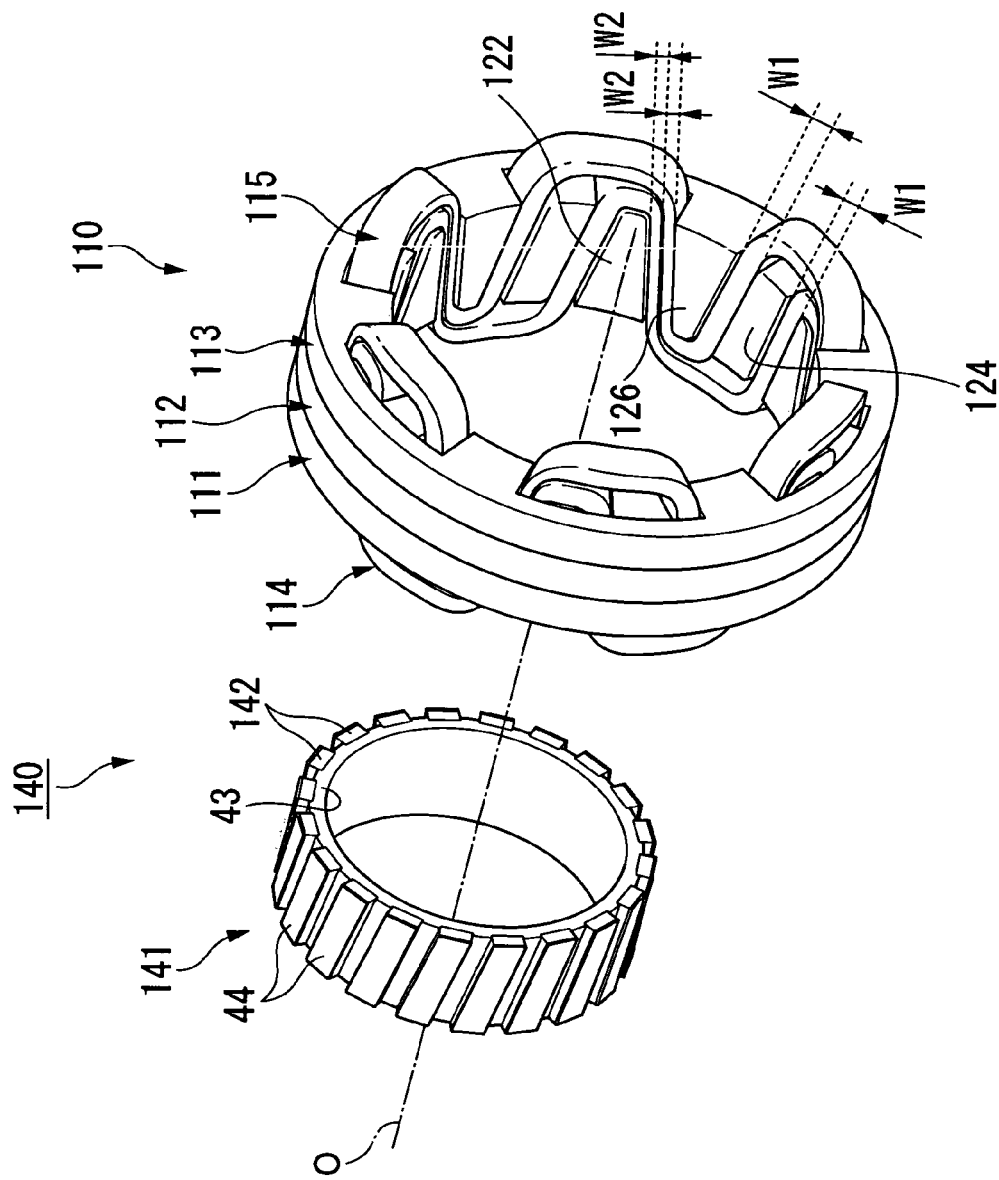
FIG. 19 is an exploded perspective view showing a claw pole motor according to a fourth modification example of the second embodiment of the present invention.
Figure 20A:
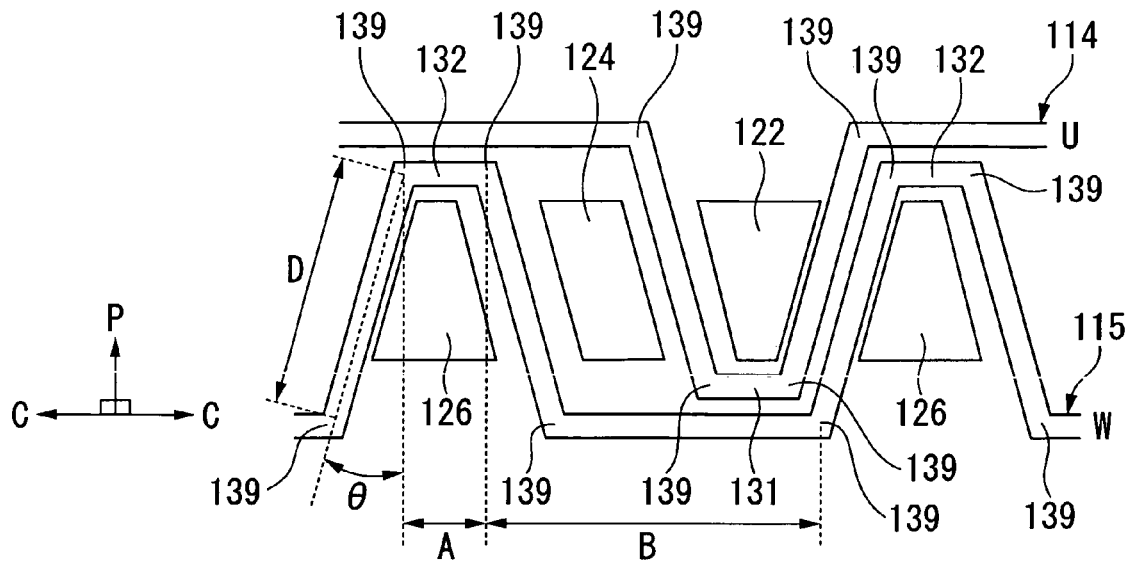
FIG. 20A is schematic view showing a wound state of annular coils of the stator according to the fourth modification example of the second embodiment of the present invention.

In the stator 110 according to the fourth modification example, as shown in FIGS. 19 and 20A, the U-phase annular coil 114 and the W-phase annular coil 115 of two phases have a coil pitch of 120° in terms of electrical angle, and are provided with a plurality of U-phase meandering portions 131 and W-phase meandering portions 132. The meandering portions 131 and 132 each have four bends 139 bending to, for example, a specified obtuse angle, and are formed to have two oblique sides on the peripheral surface around the axis (for example, oblique sides that slant by a specified angle θ with respect to the axial direction P).

Thereby, the U-phase teeth 122 to be inserted into the U-phase meandering portions 131 and the W-phase teeth 126 to be inserted into the W-phase meandering portions 132 are formed to have a cross-sectional shape that is substantially trapezoidal with respect to the radial direction R. The V-phase teeth 124, which are inserted between the U-phase meandering portions 131 that are adjacent in the circumferential direction C in the U-phase annular coil 114 and the W-phase meandering portions 132 that are adjacent in the circumferential direction C in the W-phase annular coil 115, have a cross-sectional shape of a parallelogram in the radial direction R.

In the slots in which the U-phase annular coil 114 and the W-phase annular coil 115 of the two phases are mounted, that is, in the slots formed by the U-phase teeth 122 and the W-phase teeth 126, the thickness W2 of the annular coils 114 and 115 mutually adjacent in the circumferential direction is set to be thinner than the thickness W1 of the annular coils 114 and 115 in other locations (for example, W2<W1≈2×W2).

Figure 20B:
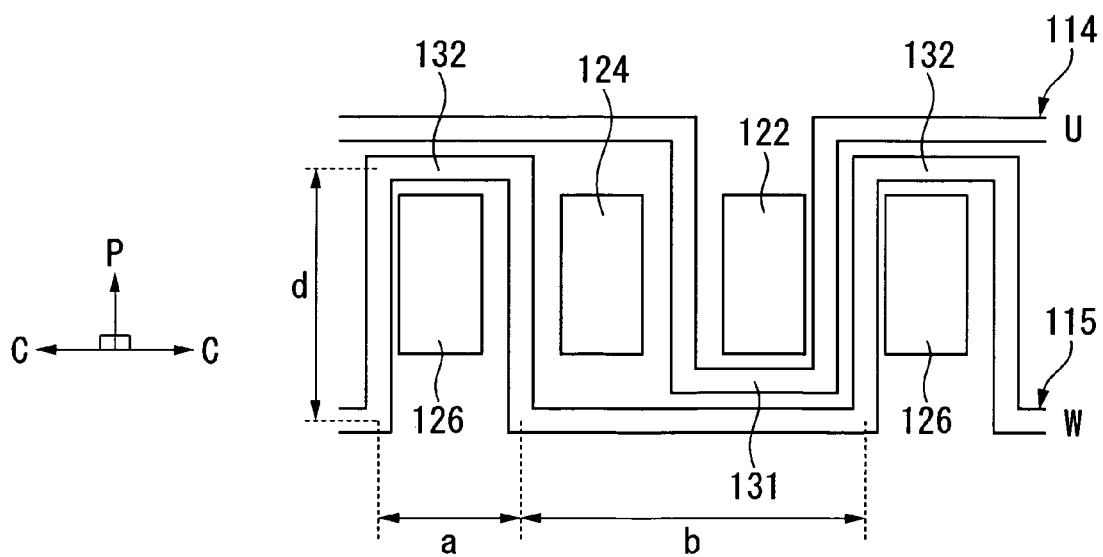
FIG. 20B is a schematic view showing an example of a wound state of annular coils for teeth whose cross-sectional shape in a radial direction R is rectangular.

In the fourth modification example, compared to the annular coils 114 and 115 that meander in a crank shape shown for example in FIG. 20B, by meandering the annular coils 114 and 115, the wire length is shortened without hardly changing the inductance of the annular coils 114 and 115, and so copper loss can be reduced.

To wit, as shown in FIGS. 20A and 20B, given the lengths (a+b), (A+B) of the annular coils 114 and 115 along the circumferential direction C, and the lengths d, D of the annular coils 114 and 115 between the teeth 122, 124, and 126, the total length of one pole is (A+B+2×D) for the meandering annular coils 114 and 115, and the total length of one pole is (a+b+2×d) for the annular coils 114 and 115 that meander in a crank shape.

Here, since d=D×cos θ, a+b=A+B+2×D×sin θ, and (0°<θ<90°), so (a+b+2×d)=A+B+2×D×(sin θ+cos θ))>(A+B+2×D).

Figure 21:
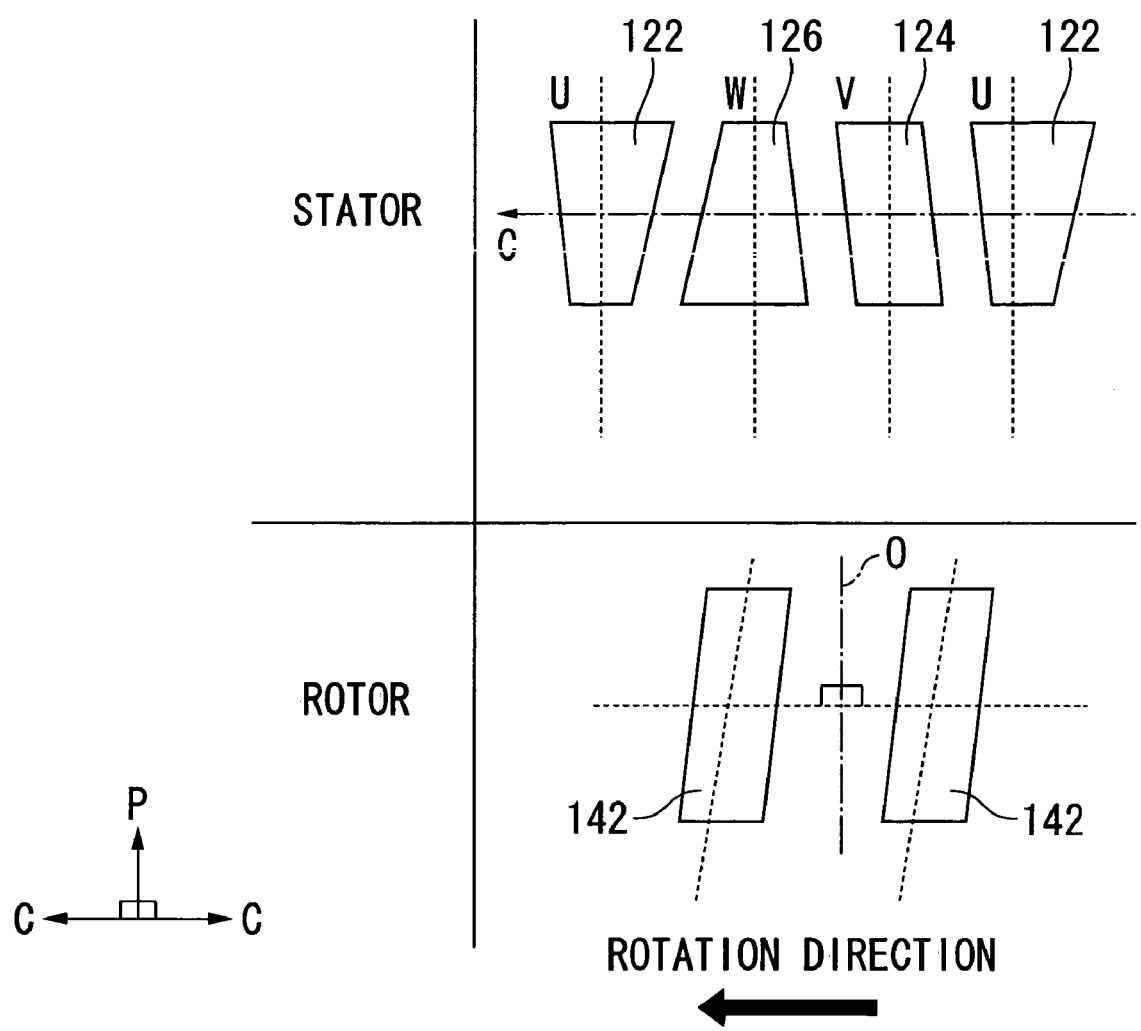
FIG. 21 is a schematic view showing an arrangement state of the teeth and permanent magnets of the claw pole motor according to the fourth modification example of the second embodiment of the present invention.

The rotor 141 of the claw pole motor 140 equipped with the stator 110 according to the fourth modification example is, as shown for example in FIG. 21, a permanent magnet-type rotor employing permanent magnets 142 as fields. The plurality of permanent magnets 142 are disposed at a specified interval in the circumferential direction on the outer circumferential surface of the rotor body 43.

The permanent magnets 142 are, for example, magnetized in the radial direction, with the magnetization directions of the permanent magnets 142 and 142 adjacent in the circumferential direction disposed so as to be alternated. To wit, a permanent magnet 142 whose outer circumferential side serves as an N-pole is adjacent to another permanent magnetic 142 whose outer circumferential side serves as an S-pole.

Surface yokes 44 forming opposing faces that oppose the distal end portions of the teeth 122, 124, and 126 of the stator 110 are provided on the outer circumferential surfaces of the permanent magnets 142.

The permanent magnets 142 on the outer circumferential surface of the rotor body 43 are slanted by a specified angle with respect to the direction of rotation axis O of the rotor 141, as shown, for example, in FIG. 19. The permanent magnets 142 are set so as to be substantially parallel to the slots in which the U-phase annular coil 114 and the W-phase annular coil 115 of two phases are mounted in the stator 110, that is, the slots formed by the U-phase teeth 122 and the W-phase teeth 126.

By increasing the number of instances that the slots and the permanent magnets 142 slant in different directions over the entire stator 110 in the claw pole motor 140, cogging torque and torque ripple can be suppressed.

Fifth Modification Example of Second Embodiment

Figure 22:
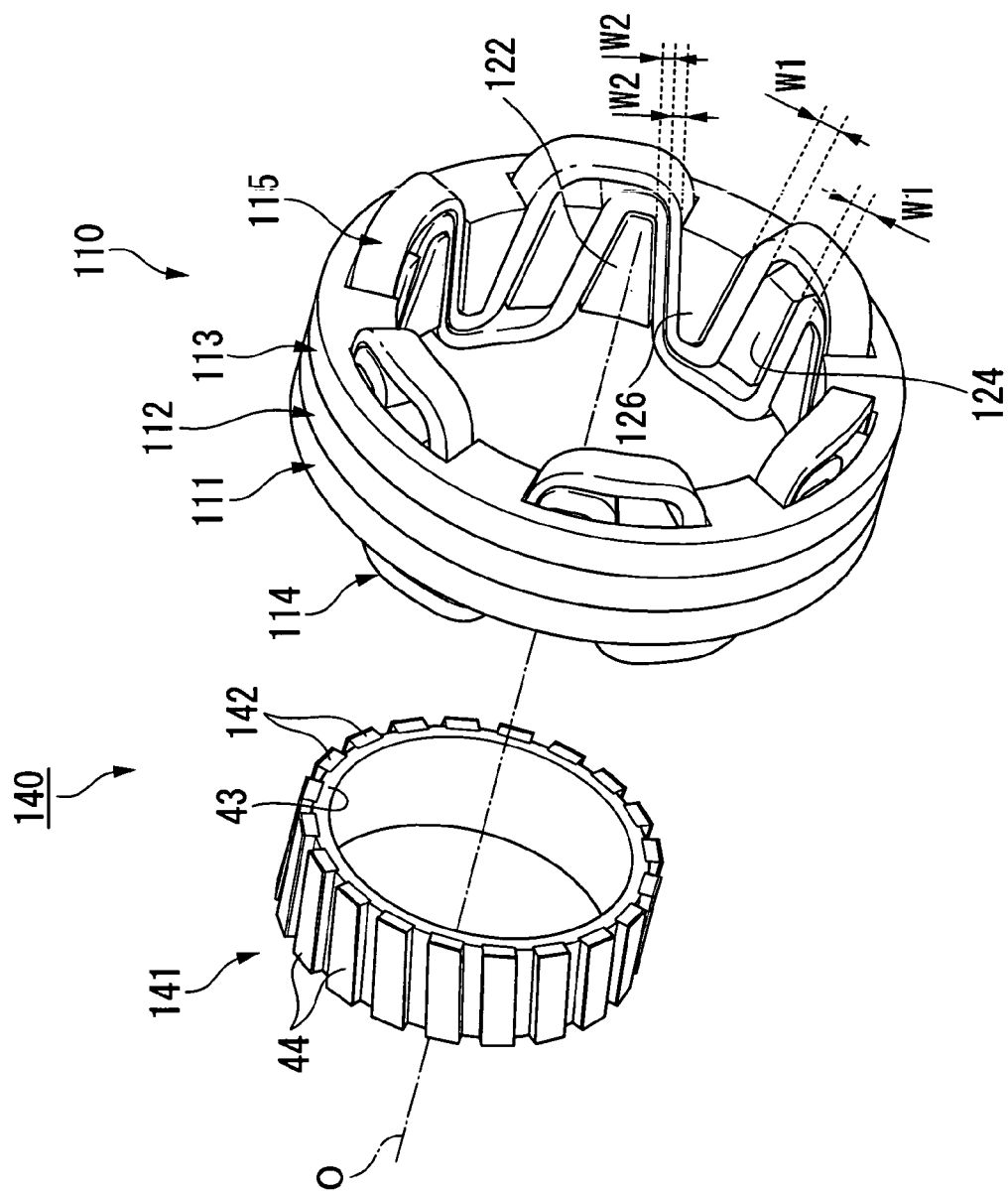
FIG. 22 is an exploded perspective view showing a claw pole motor according to a fifth modification example of the second embodiment of the present invention.
Figure 23:
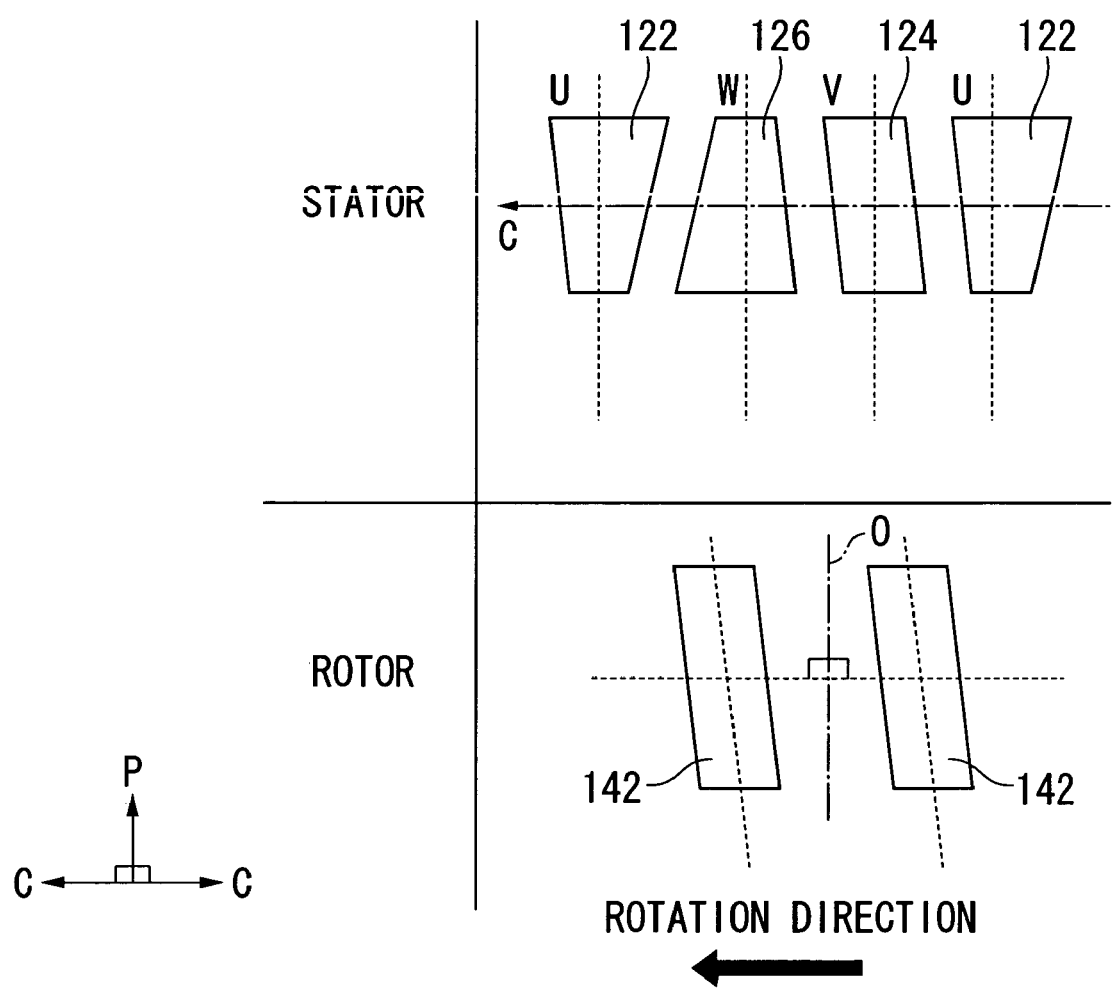
FIG. 23 is a schematic view showing an arrangement state of teeth and permanent magnets of the claw pole motor according to the fifth modification example of the second embodiment of the present invention.

In the fourth modification example, the permanent magnets 142 and the slots in which the U-phase annular coil 114 and the W-phase annular coil 115 of two phases are mounted are set to be substantially parallel, but it is not limited thereto. The permanent magnets 142 on the outer circumferential surface of the rotor body 143, as shown FIG. 22 and FIG. 23 for example, may be configured in the stator 110 to be substantially parallel to the slots in which the U-phase annular coil 114 or the W-phase annular coil 115 of one phase are mounted, that is, the slots formed by the U-phase teeth 122 and the V-phase teeth 124, or the slots formed by the V-phase teeth 124 and the W-phase teeth 126.

In the claw pole motor 140 according to the fifth modification example, the number of instances in which the slots and the permanent magnets 142 of the stator body 110 are in the same direction increase, which can increase the maximum torque that can be output.

Third Embodiment

A third embodiment of the stator of the present invention will be explained below with reference to the accompanying drawings.

In a stator 50 according to the third embodiment, a point differing from the stator 110 according to the aforementioned second embodiment is that of a U-phase annular coil 54 and a W-phase annular coil 55 not having U-phase meandering portions 131 and W-phase meandering portions 132, respectively.

In the following, descriptions are omitted for those elements which are identical to those of the second embodiment.

Figure 24:
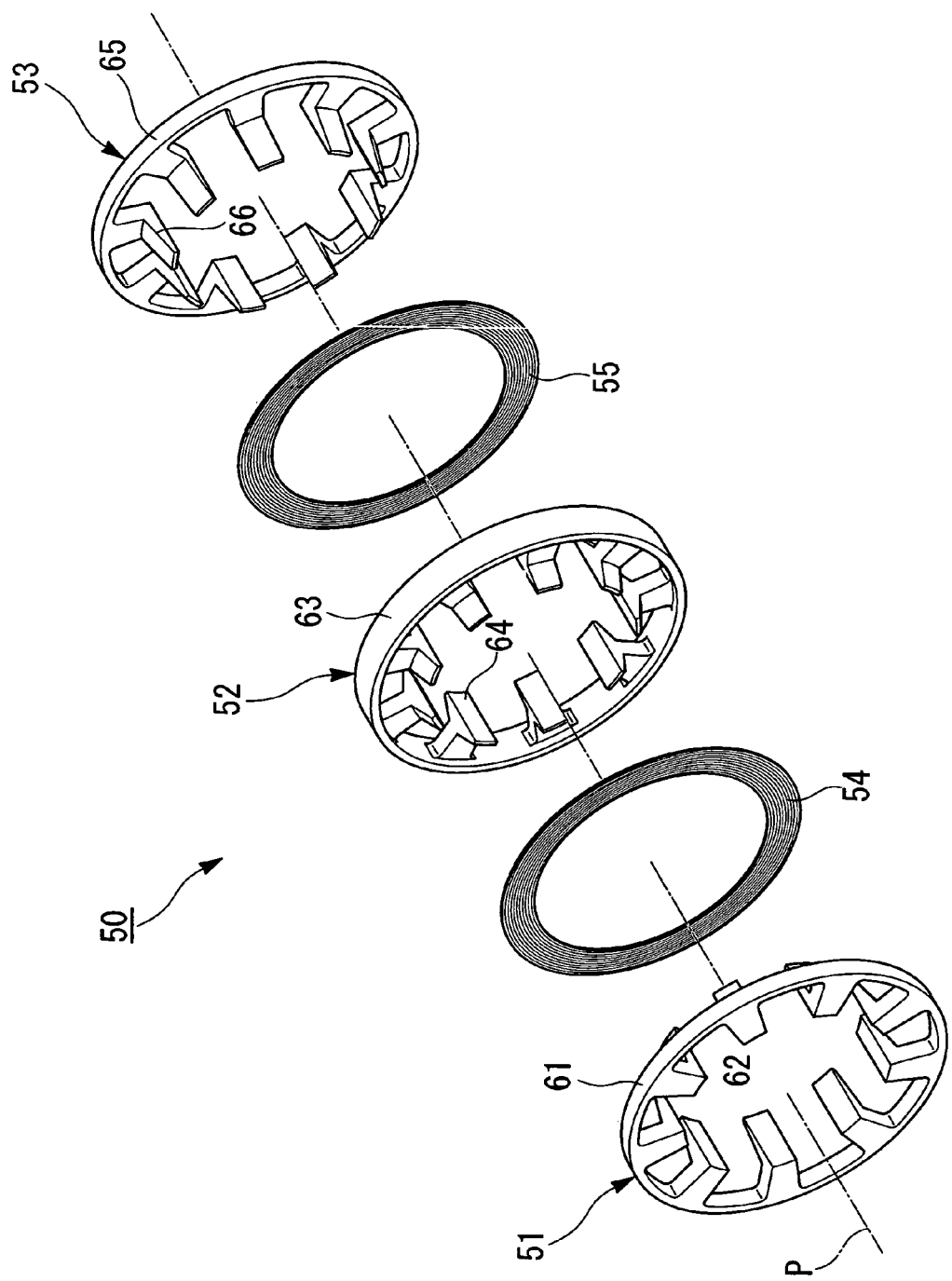
FIG. 24 is an exploded perspective view showing a constitution of a stator according to a third embodiment of the present invention.
Figure 25:
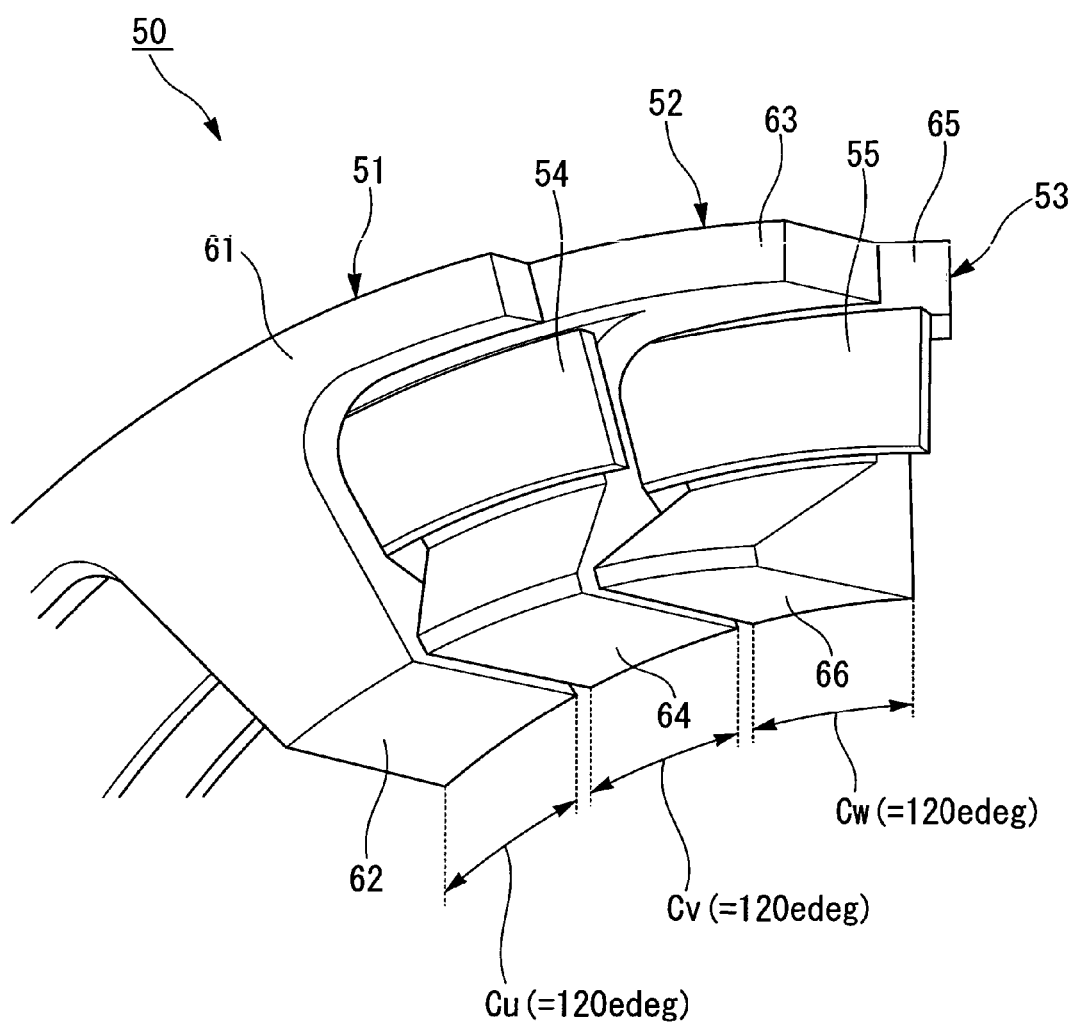
FIG. 25 is a perspective view showing a portion of the stator according to the third embodiment of the present invention.

The stator 50 according to the present embodiment, as shown, for example, in FIGS. 24 and 25, has U-phase stator ring 51 for the U-phase, V-phase stator ring 52 for the V-phase, and W-phase stator ring 53 for the W-phase, and the U-phase annular coil 54 for the U-phase and the W-phase annular coil 55 for the W-phase.

The U-phase stator ring 51 is provided with a ring-shaped U-phase back yoke 61 and claw-shaped U-phase claw poles (teeth) 62 that project radially inward from positions spaced at a specified interval in the circumferential direction on the inner circumferential side of the U-phase back yoke 61, extending in a manner to bend to one side in the axial direction from a base end to a distal end thereof.

The U-phase claw poles 62 have an L-shaped cross-sectional shape in the circumferential direction, and a rectangular cross-sectional shape in the radial direction which has a specified circumferential width Cu of at least an electrical angle of 180° or less (for example, a width corresponding to an electrical angle of 120°).

The V-phase stator ring 52 is provided with a ring-shaped V-phase back yoke 63 and double claw-shaped V-phase claw poles (teeth) 64 that project radially inward from positions spaced at a specified interval in the circumferential direction on the inner circumferential side of the V-phase back yoke 63, extending to one side and the other side in the axial direction while extending from a base end to a distal end thereof.

The V-phase claw poles 64 have a T-shaped cross-sectional shape in the circumferential direction, and a rectangular shape cross-sectional shape in the radial direction which has a specified circumferential width Cv of at least an electrical angle of 180° or less (for example, a width corresponding to an electrical angle 120°).

The W-phase stator ring 53 has a shape similar to, for example, the U-phase stator ring 51, being provided with a ring-shaped W-phase back yoke 65 and claw-shaped W-phase claw poles (teeth) 66 that project radially inward from positions spaced at a specified interval in the circumferential direction on the inner circumferential side of the W-phase back yoke 65, extending in a manner to bend to the other side in the axial direction from a base end to a distal end thereof.

The W-phase claw poles 66 have an L-shaped cross-sectional shape in the circumferential direction, and a rectangular cross-sectional shape in the radial direction which has a specified circumferential width Cw of at least an electrical angle of 180° or less (for example, a width corresponding to an electrical angle of 120°).

The stator rings 51, 52, and 53 are disposed coaxially to an axis P and superimposed in that order in the axial direction, and are joined so that the claw poles 62, 64, and 66 are sequentially arranged in that order along the circumferential direction. When the axial end face of the U-phase back yoke 61 and the axial end face of the other side of the V-phase back yoke 63 abut, the U-phase annular coil 54 is fixed so as to be held from both sides in the axial direction by the base end portions of the claw poles 62 and 64 disposed at a specified interval in the axial direction. Also, when the axial end face of the one side of the V-phase back yoke 63 and the axial end face of the W-phase back yoke 65 abut, the W-phase annular coil 55 is fixed so as to be held from both sides in the axial direction by base end portions of the claw poles 64 and 66 disposed at a specified interval in the axial direction.

In this case, the stator rings 51, 52, and 53 have a specified mutual phase difference of an electrical angle of 180° or less (for example, in the stator 50 shown in FIGS. 24 and 25, the stator rings have a phase difference of an electrical angle of 120°).

The annular coils 54 and 55 of two phases having a phase difference (coil phase difference) of 120° in terms of electrical angle are, similarly to the annular coils 114 and 115 of the second embodiment shown in FIG. 11A described above, constituted to be connected in a V-shape, and energized with sinusoidal waves having a mutual phase difference of 120°. Thereby, when leakage flux can be disregarded, as shown in FIG. 11C, a rotating magnetic field is produced similar to that of a three-phase stator in which its coils of the U, V, and W phases are connected in a Y-shape and energized with sinusoidal waves having a mutual phase difference of 120°.

Figure 26:
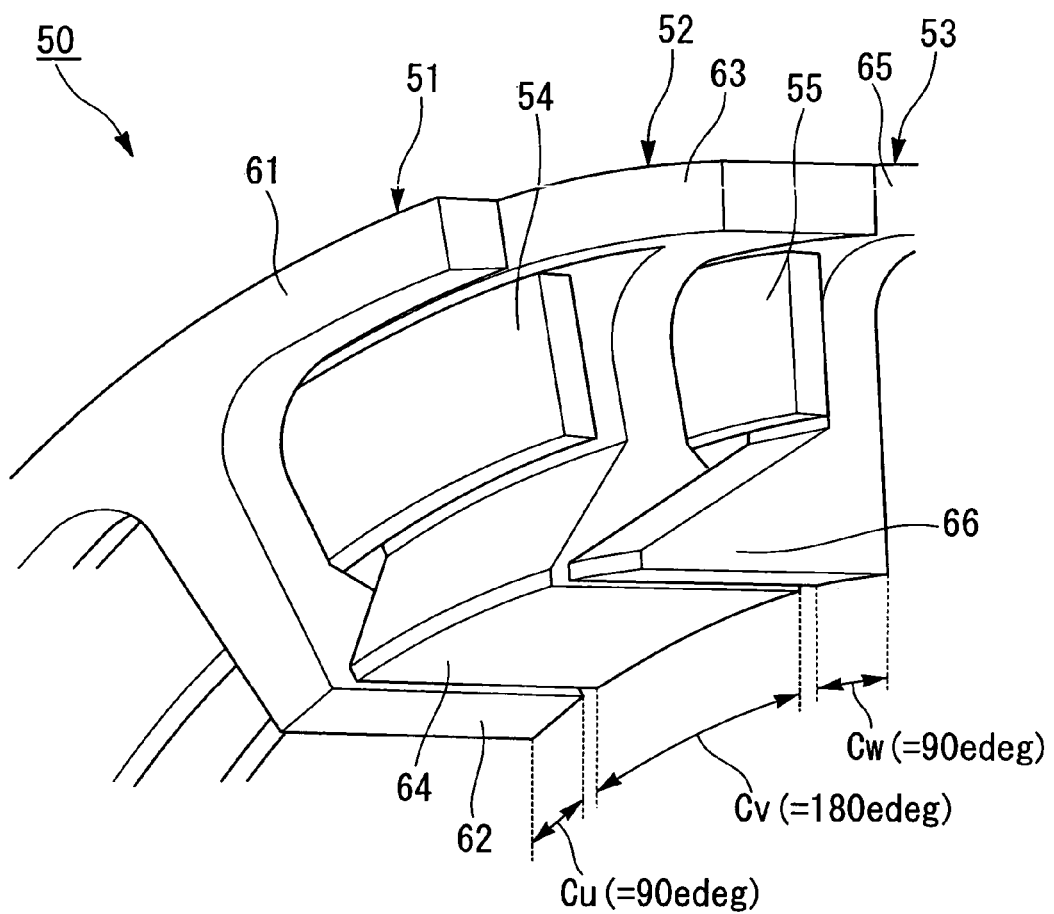
FIG. 26 is a perspective view showing a portion of a stator according to a modification example of the third embodiment of the present invention.

In the third embodiment, the circumferential widths Cu, Cv, and Cw of the respective claw poles 62, 64, and 66 were set to widths corresponding to 120° in terms of electrical angle, but they are not limited thereto. Similarly to the first embodiment, as shown, for example, in FIG. 26, the circumferential widths Cu, Cv, Cw may be set to a specified circumferential width of at least an electrical angle of 180° or less (for example, Cu=Cw=90° (electrical angle), Cv=180° (electrical angle)), with the sum of the circumferential widths Cu, Cv, Cw being 360° in terms of electrical angle.

In the second and third embodiments, the stators 110 and 50 were respectively provided with stator rings 111, 112, and 113 and stator rings 51, 52, and 53, but are not limited thereto. The stator rings 111, 112, 113, 51, 52, and 53 may be formed to be dividable into a plurality of stator pieces.

The stators 110 and 50 may have a plurality of stator pieces for each phase, with annular stator members of each phase being formed by mounting and fixing the plurality of stator pieces at specified positions relative to the annular coils 114 and 115 or annular coils 54 and 55 of the two phases in specified relative disposition states.

Fourth Embodiment

A fourth embodiment of a stator and a motor of the present invention will be explained below with reference to the accompanying drawings.

A stator 210 and a U-phase stator ring 211, a V-phase stator ring 212, a W-phase stator ring 213, a U-phase annular coil 214, and a W-phase annular coil 215 which are provided in the stator 210 of the present embodiment are identical to the stator 110, the U-phase stator ring 111, the V-phase stator ring 112, the W-phase stator ring 113, the U-phase annular coil 114, and the W-phase annular coil 115 which are provided in the stator 110 of the second embodiment, and so descriptions thereof shall be omitted.

A U-phase yoke 221 and U-phase teeth 222 provided in the U-phase stator ring 211 of the present embodiment; a V-phase yoke 223 and V-phase teeth 224 provided in the V-phase stator ring 212 of the present embodiment; and a W-phase yoke 225 and W-phase teeth 226 provided in the W-phase stator ring 213 of the present embodiment are identical to the U-phase yoke 121, U-phase teeth 122; V-phase yoke 123, V-phase teeth 124; and W-phase yoke 125, W-phase teeth 126 of the second embodiment, and so descriptions thereof shall be omitted.

In the present embodiment, the respective teeth 222, 224, and 226 of the stator rings 211, 212, and 213 have identical widths in the circumferential direction, and the teeth 222 and 224, and the teeth 224 and 226, which are adjacent in the circumferential direction C, are disposed at positions mutually shifted along the axis P. Thereby, step portions 233 is formed by the teeth 222 and 224, and 224 and 226. For example, as shown in FIG. 27, the U-phase teeth 222 are disposed at a position shifted one step to the one side in the axial direction P with respect to the V-phase teeth 224, and the W-phase teeth 226 are disposed at a position shifted one step to the other side in the axial direction P with respect to the V-phase teeth 224.

The annular coils 214 and 215 surround the circumference around the axis while meandering in a crank shape within the circumferential surface, to be thereby provided with a plurality of U-phase meandering portions 231 and W-phase meandering portions 232, respectively.

Figure 27:
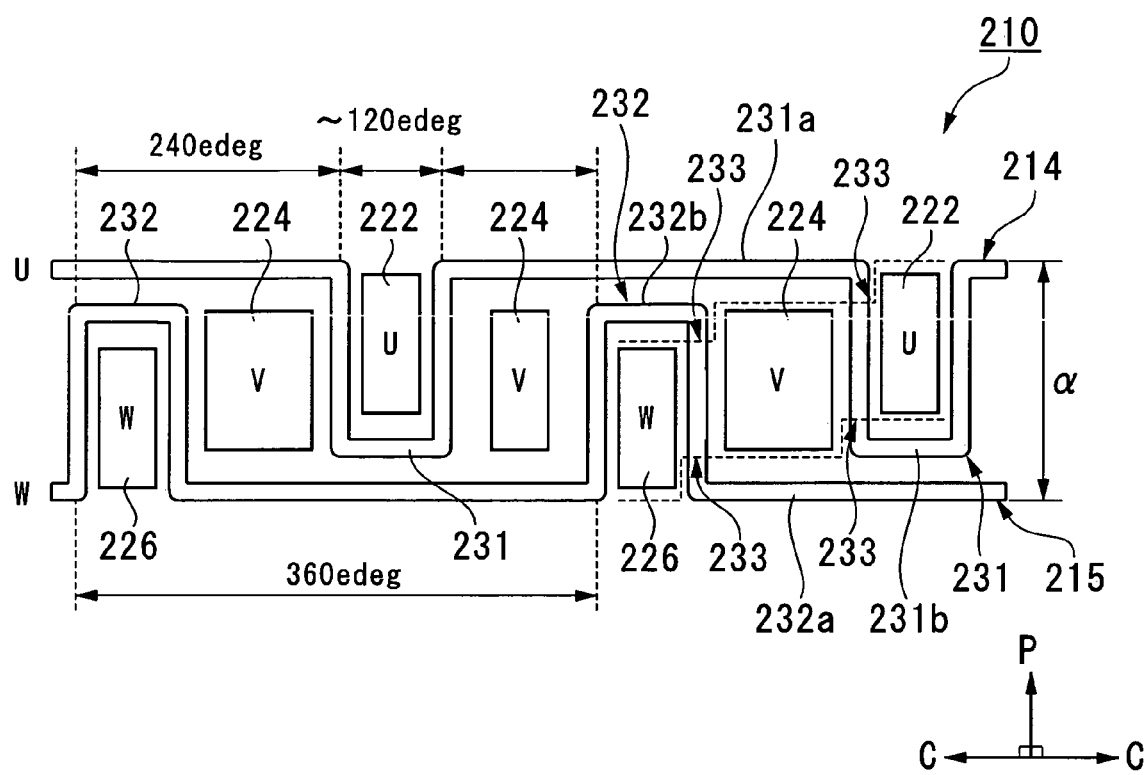
FIG. 27 is a radial direction sectional view showing a portion of a stator according to a fourth embodiment of the present invention.
Figure 28:
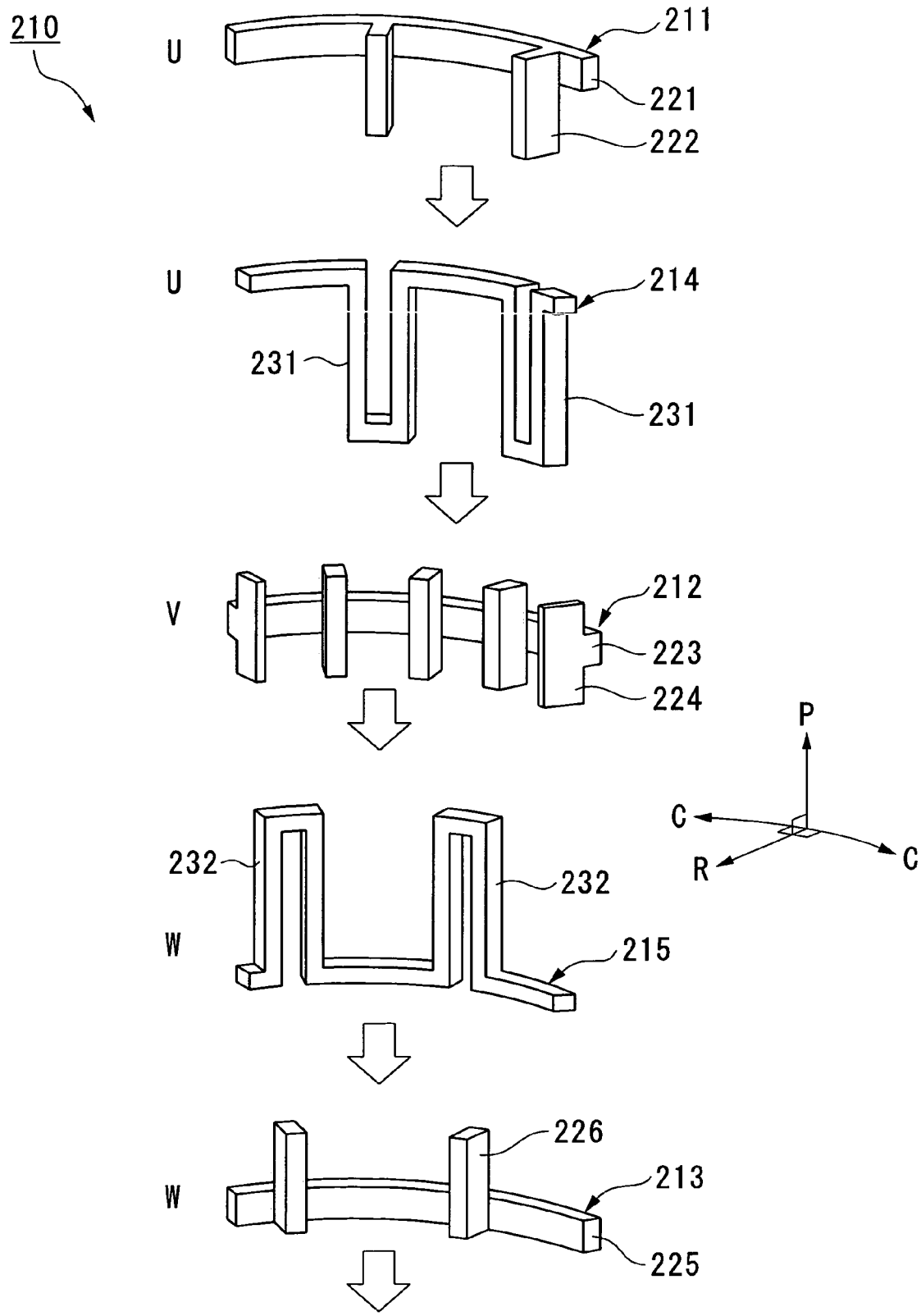
FIG. 28 is an exploded perspective view showing a portion of the stator according to the fourth embodiment of the present invention.

The width of the meandering portions 231 and 232 in the circumferential direction C, that is, the coil pitch, is set to a specified value of not more than an electrical angle of 120°, as shown, for example, in FIG. 27. The meandering portions 231 and 232 are configured to project in mutually different directions (that is, the one direction and the other direction along the axis P, which are mutually opposing directions). The U-phase annular coil 214 and the W-phase annular coil 215 are disposed at relatively shifted positions along the circumferential direction C so as to have a phase difference of 240° in terms of electrical angle. Thereby, the meandering portions 231 and 232, which alternately project in mutually opposite directions, are alternately arranged along the circumferential direction C, and the annular coils 214 and 215 of the two phases are disposed so as not to mutually cross.

One U-phase tooth 222 of the U-phase stator ring 211 is disposed in each U-phase meandering portion 231 of the U-phase annular coil 214. One W-phase tooth 226 of the W-phase stator ring 213 is disposed in each W-phase meandering portion 232 of the W-phase annular coil 215. One V-phase tooth 224 of the V-phase stator ring 212 is disposed between each U-phase meandering portion 231 and each W-phase meandering portion 232 that are adjacent in the circumferential direction C.

As shown in FIG. 27, with respect to the V-phase teeth 224 disposed between the U-phase meandering portions 231 and the W-phase meandering portions 232 adjacent in the circumferential direction C, the adjacent U-phase teeth 222 are disposed at positions shifted one step to the one side (a first side) in the axial direction P. For this reason, U-phase lateral portions 231a of the U-phase annular coil 214 that connect the U-phase meandering portions 231 adjacent in the circumferential direction C are disposed at step portions 233 formed on the first side of the V-phase teeth 224. With respect to the V-phase teeth 224 disposed between the U-phase meandering portions 231 and the W-phase meandering portions 232 adjacent in the circumferential direction C, the adjacent W-phase teeth 226 are disposed at positions shifted one step to the other side (a second side) in the axial direction P. For this reason, W-phase lateral portions 232a of the W-phase annular coil 215 that connect the W-phase meandering portions 232 adjacent in the circumferential direction C are disposed at step portions 233 formed on the second side of the V-phase teeth 224.

In other words, the U-phase teeth 222, the V-phase teeth 224, and the W-phase teeth 226 are sequentially arranged in the circumferential direction C, with the U-phase annular coil 214 and the W-phase annular coil 215 being disposed on only the second side of the U-phase teeth 222 in the axial direction P so as to be superimposed for U-phase teeth 222; the U-phase annular coil 214 being disposed on the first side of the V-phase teeth 224 in the axial direction P and the W-phase annular coil 215 being disposed on the second side of the V-phase teeth 224 for V-phase teeth 224; and the U-phase annular coil 214 and the W-phase annular coil 215 being disposed on only the first side of the W-phase teeth 226 so as to be superimposed for W-phase teeth 226. In this manner, the U-phase teeth 222 face the first side in the axial direction P, that is, the side on which the annular coils 214 and 215 do not exist, being made to relatively project a step in height equivalent to the size of the single U-phase annular coil 214, while the W-phase teeth 226 face the second side in the axial direction P, that is, the side on which the annular coils 214 and 215 do not exist, being made to relatively project a step in height equivalent to the size of the single W-phase annular coil 215.

Thereby, the U-phase lateral portions 231a and a portion of the U-phase meandering portions 231 (that is, lateral portions 231b) are disposed in the step portions 233 on the first side and the second side formed by the U-phase teeth 222 and the V-phase teeth 224, which are adjacent in the circumferential direction C, being disposed at positions mutually shifted in the axial direction P (that is, the step portions 233 formed on the first side of the V-phase teeth 224 and the step portions 233 formed on the second side of the U-phase teeth). A portion of the W-phase meandering portions 232 in the W-phase annular coil 215 (that is, lateral portions 232b) and W-phase lateral portions 232a are disposed in the step portions 233 on the first side and the second side formed by the V-phase teeth 224 and the W-phase teeth 226, which are adjacent in the circumferential direction C, being disposed at positions mutually shifted in the axial direction P (that is, the step portions 233 formed on the first side of the W-phase teeth and the step portions 233 formed on the second side of the V-phase teeth 224).

The annular coils 214 and 215 of two phases, which are disposed so as to weave between the teeth 222 and 224 or between the teeth 224 and 226 adjacent in the circumferential direction C, are formed so as to have so-called short-pitch wave windings of not more than 120° in terms of electrical angle, with excessive separation of the teeth 222, 224, and 226 and the annular coils 214 and 215 being prevented in the axial direction P.

Similarly to the annular coils 114 and 115 of the second embodiment, the annular coils 214 and 215 of two phases having a phase difference (coil phase difference) of 240° in terms of electrical angle are as shown, for example, in FIG. 11A connected in a V-shape, and energized with sinusoidal waves having a mutual phase difference of 120°. Thereby, for example, when leakage flux can be disregarded, as shown in FIG. 11C, a rotating magnetic field is produced similar to that of a three-phase stator in which its coils of the U, V, and W phases are connected in a Y-shape and energized by sinusoidal waves with a mutual phase difference of 120°.

When connecting the annular coils 214 and 215 of two phases having a phase difference of 60° in terms of electrical angle in a V-shape with their meandering portions 231 and 232 projecting in the same direction (that is, to one side or another side along the axis P) as shown, for example, in FIG. 11B, similarly to connecting the annular coils 214 and 215 of two phases having a phase difference of 240° in terms of electrical angle in a V-shape with their meandering portions 231 and 232 projecting in mutually different directions (that is, to the one side and the other side along the axis P) as shown in FIG. 11A, in the case of being energized with sinusoidal waves with a mutual phase difference of 120°, for example, when leakage flux can be disregarded, as shown in FIG. 11C, a rotating magnetic field can be produced similarly to that of a three-phase stator in which its three-phase coils of U, V, and W phases are connected in a Y-shape and energized by sinusoidal waves with a mutual phase difference of 120°.

Similarly to the second embodiment, the voltage equation of a three-phase (U-phase, V-phase, W-phase) motor can be expressed as shown in the above-mentioned Eq. (1).

Similarly to the second embodiment, the line-to-line voltage from the phase voltage command values Vu, Vv, and Vw (for example, the line-to-line voltage Vuv between the U-phase and V-phase (=Vu−Vv), and the line-to-line voltage Vwv between the W-phase and V-phase (=Vw−Vv)) is expressed as shown in the above-mentioned Eq. (2).

Similarly to the second embodiment, a model that eliminates, for example, the V-phase from the voltage equation of the three-phase (U-phase, V-phase, W-phase) motor shown in the above-mentioned Eq. (1) is described as shown in the above-mentioned Eq. (3).

Similarly to the second embodiment, by inverting the orientation of the W-phase coil (that is, inverting the direction of rotation of the rotor), the model shown in the above-mentioned Eq. (3) is expressed as shown in the above-mentioned Eq. (4).

Similarly to the second embodiment, by altering the number of turns "n" of the coils to a multiple of √3, the model shown in the above-mentioned Eq. (4) can be expressed as shown in the above-mentioned Eq. (5).

Similarly to the second embodiment, by moving the angle of origin of the phase of the induced voltages by 90° (=π/2) and performing substitution with the U-phase component and the W-phase component, the model shown in the above-mentioned Eq. (5) can be expressed as the above-mentioned Eq. (6), which is equivalent to the above-mentioned Eq. (2).

The stator 210 according to the fourth embodiment is provided with the aforementioned constitution. The method of manufacturing the stator 210 is identical to that of the stator 110 according to the second embodiment, and so the description thereof shall be omitted.

In the stator 210 of the fourth embodiment, by configuring the positions of the teeth 222, 224, and 226 in the axial direction P in accordance with the arrangement of the teeth 222, 224, and 226 of three phases and the annular coils 214 and 215 of two phases, increases in the coil end height and the dimensions in the axial direction of the stator can be prevented, and copper loss can be reduced by preventing an increase in the winding length.

As shown in FIG. 29, by setting the teeth 222, 224, and 226 of three phases to be at the same position in the axial direction P in the state of the annular coils 214 and 215 of two phases having meandering portions 231 and 232 being disposed so as to be superimposed in the axial direction P, a width β of the stator in the axial direction P is at least a value calculated by adding the widths of the annular coils 214 and 215 of two phases disposed so as to be superimposed at the end portions of the teeth 222, 224, and 226 in the axial direction P (equivalent to the thickness of four diameters of an annular coil) to the width of the teeth 222, 224, and 226 in the axial direction P.

In contrast, if the positions of the teeth 222, 224, and 226 of three phases in the axial direction P can be suitably set, a width α (α<β) of the stator 210 in the axial direction P can be lowered to a value calculated by adding the widths of the annular coils 214 and 215 of two phases (equivalent to the thickness of two diameters of an annular coil) to the width of the teeth 222, 224, and 226 in the axial direction P.

First Modification Example of Fourth Embodiment

Figure 30A:
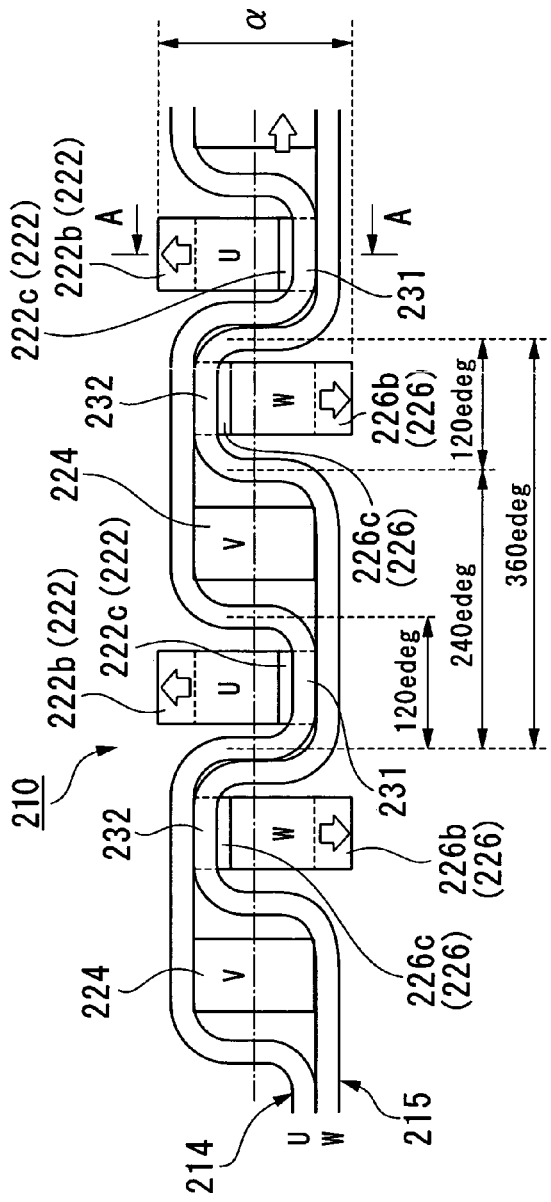
FIG. 30A is a schematic view showing a portion of a stator according to a first modification example of the fourth embodiment of the present invention, viewed from a base end portion side toward a distal end portion side of teeth in a radial direction.
Figure 31A:
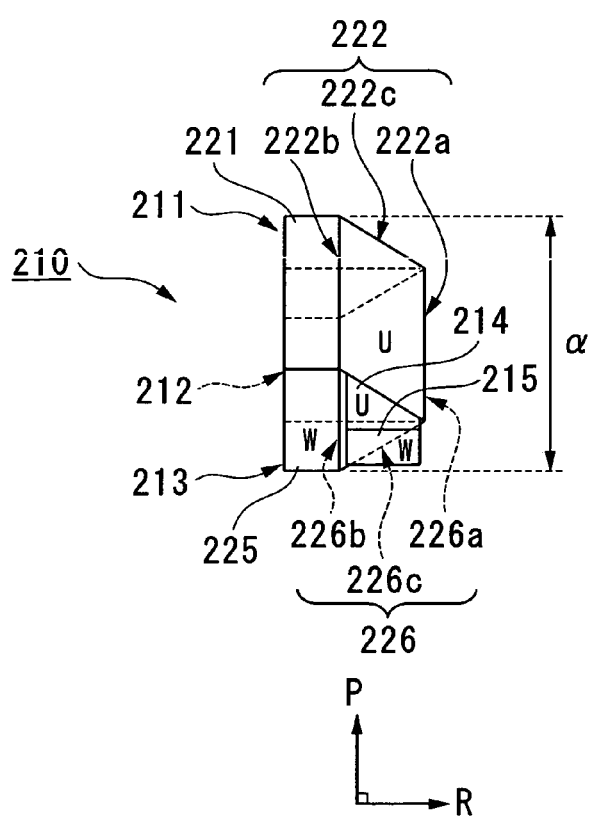
FIG. 31A is a sectional view taken along the line A-A in FIG. 30A.

In the fourth embodiment, the teeth 222, 224, and 226 were disposed at positions shifted in the axial direction P, but it is not limited thereto. As shown in FIGS. 30A and 31A, at least the base end portions of the teeth 222, 224, and 226 respectively connected to the yokes 221, 223, and 225 may be set to positions mutually shifted in the axial direction P, and the positions of the distal end portions of the teeth 222, 224, and 226 constituting the rotor opposing portion that opposes the rotor (not illustrated) may be set to the same positions in the axial direction P.

In the first modification example shown, for example, in FIG. 31A, a tilting portion 222c is formed in the U-phase teeth 222, at which the U-phase annular coil 214 and the W-phase annular coil 215 are disposed only on the second side so as to be superimposed in the axial direction P, so that while heading from a distal end portion 222a to a base end portion 222b in the radial direction R without altering the axial width of the U-phase teeth 222, the position of the U-phase teeth 222 in the axial direction P progressively shifts to the first side in the axial direction P, that is, the side at which the annular coils 214 and 215 do not exist.

A tilting portion 226c is formed in the W-phase teeth 226, at which the U-phase annular coil 214 and the W-phase annular coil 215 are disposed on the first side only so as to be superimposed in the axial direction P, so that while heading from a distal end portion 226a to a base end portion 226b in the radial direction R without altering the axial width of the W-phase teeth 226, the position of the W-phase teeth 226 in the axial direction P progressively shifts to the second side in the axial direction P, that is, the side at which the annular coils 214 and 215 do not exist.

For the V-phase teeth 224, on whose first side in the axial direction P the U-phase annular coil 214 is disposed and on whose second side the W-phase annular coil 215 is disposed, the V-phase teeth 224 are formed to be unvarying the positions in the axial direction P thereof without altering the axial width of the V-phase teeth 224 from a distal end portion to a base end portion in the radial direction R.

Thereby, the cross-sectional shape of the U-phase teeth 222 and the W-phase teeth 226 in the circumferential direction C is a parallelogram, and the cross-sectional shape of the V-phase teeth 224 in the circumferential direction C is a rectangle.

Figure 30B:
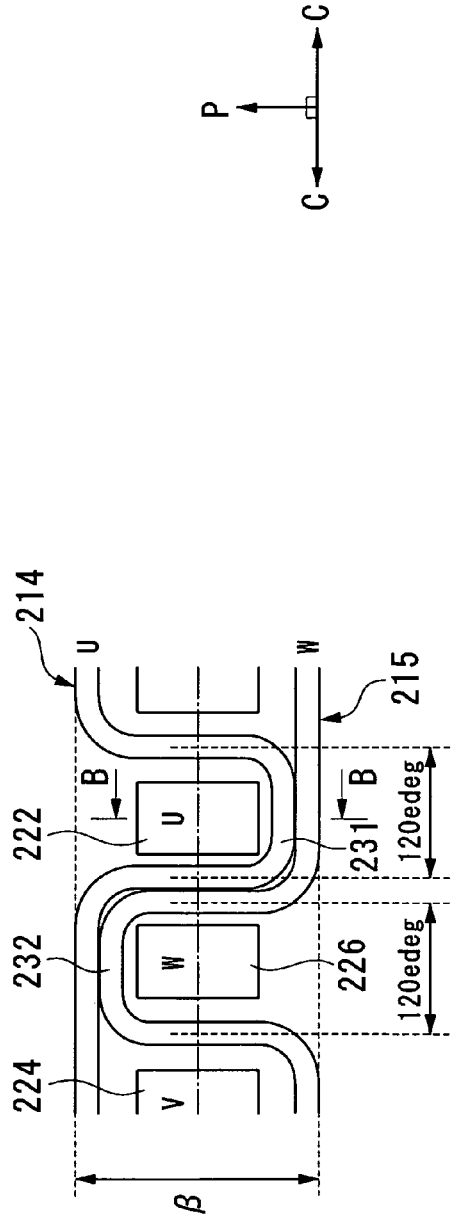
FIG. 30B is a schematic view showing a portion of the stator in which positions of the teeth of three phases in an axial direction P are set to a same position, viewed from the base end portion side toward the distal end portion side of the teeth in the radial direction.
Figure 31B:
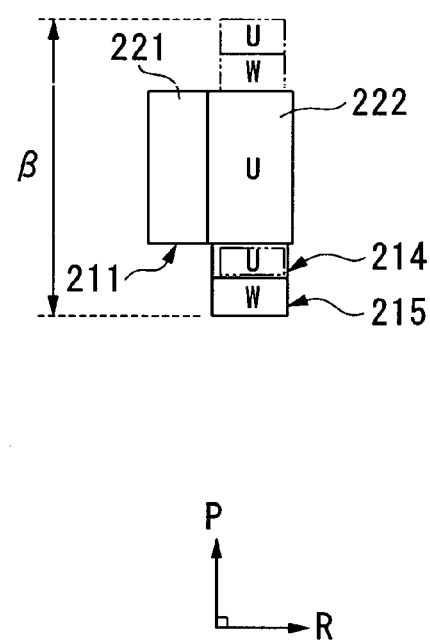
FIG. 31B is a sectional view taken along the line B-B in FIG. 30B.

In the first modification example, as shown, for example, in FIGS. 30B and 31B, compared to the width β of the stator in the axial direction P in the state of the teeth 222, 224, and 226 of three phases being set in the same position in the axial direction P, the width α (α<β) of the stator 210 in the axial direction P can be lowered to a value calculated by adding the widths of the annular coils 214 and 215 of two phases (equivalent to the thickness of two diameters of an annular coil) to the width of the teeth 222, 224, and 226 in the axial direction P.

Moreover, since the distal end portions of the teeth 222, 224, and 226 forming the rotor opposing portion that opposes the rotor (not illustrated) can be set in the same position in the axial direction P, increases due to mutually shifting the positions of the teeth 222, 224, and 226 in the axial direction P in the axial width of the rotor can be prevented.

In the fourth embodiment, the width in the circumferential direction C of the meandering portions 231 and 232 in the annular coils 214 and 215, that is, the coil pitch, is set to a specified value of not more than an electrical angle of 120°.

However, as shown, for example, in FIGS. 30A and 31A, by specifically setting the coil pitch to an electrical angle of 120°, the V-phase teeth 224 of the V-phase stator ring 212 to be relatively inserted between the U-phase meandering portions 231 that are adjacent in the circumferential direction C of the U-phase annular coil 214 and between the W-phase meandering portions 232 that are adjacent in the circumferential direction C of the W-phase annular coil 215 can be of a single type. Thereby, the W-phase teeth 226, the V-phase teeth 224, and the U-phase teeth 222 are arranged sequentially in the circumferential direction C, and the magnetic pole width in the circumferential direction of the teeth 222, 224, and 226 is 120° in terms of electrical angle, and complication of the process of electrification control can be restricted.

Second Modification Example of Fourth Embodiment

Figure 32A:
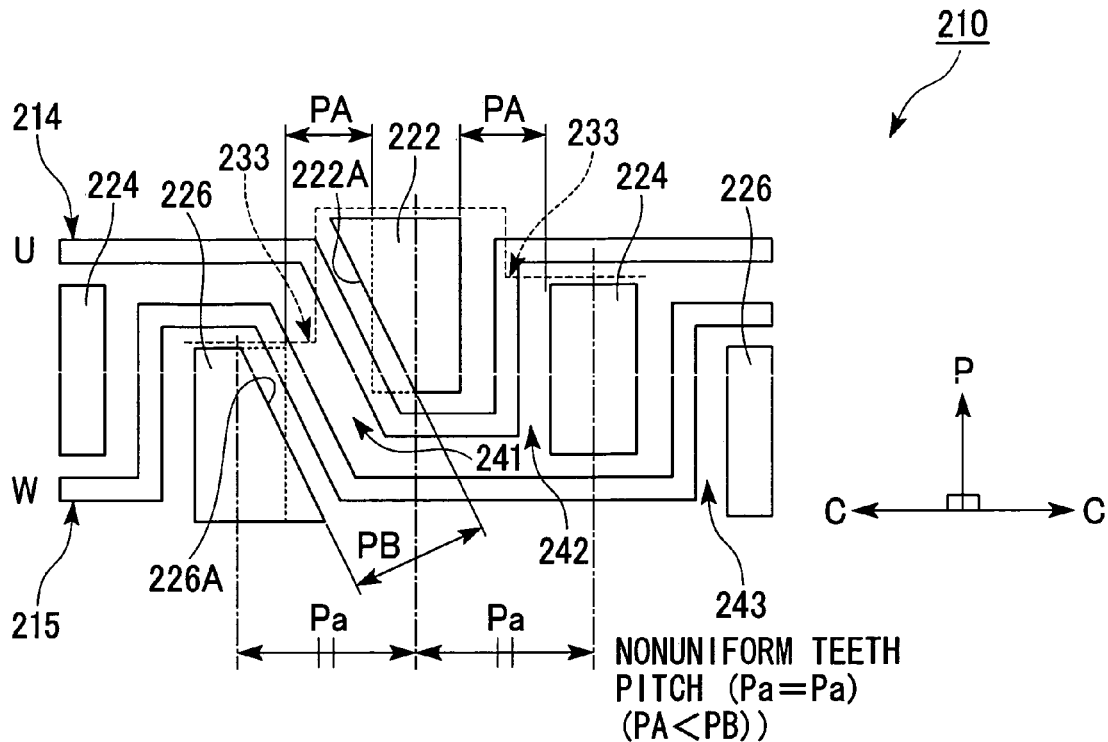
FIG. 32A is a schematic view showing a portion of a stator according to a second modification example of the fourth embodiment of the present invention, viewed from a base end portion side toward a distal end portion side of teeth in a radial direction.
Figure 33:
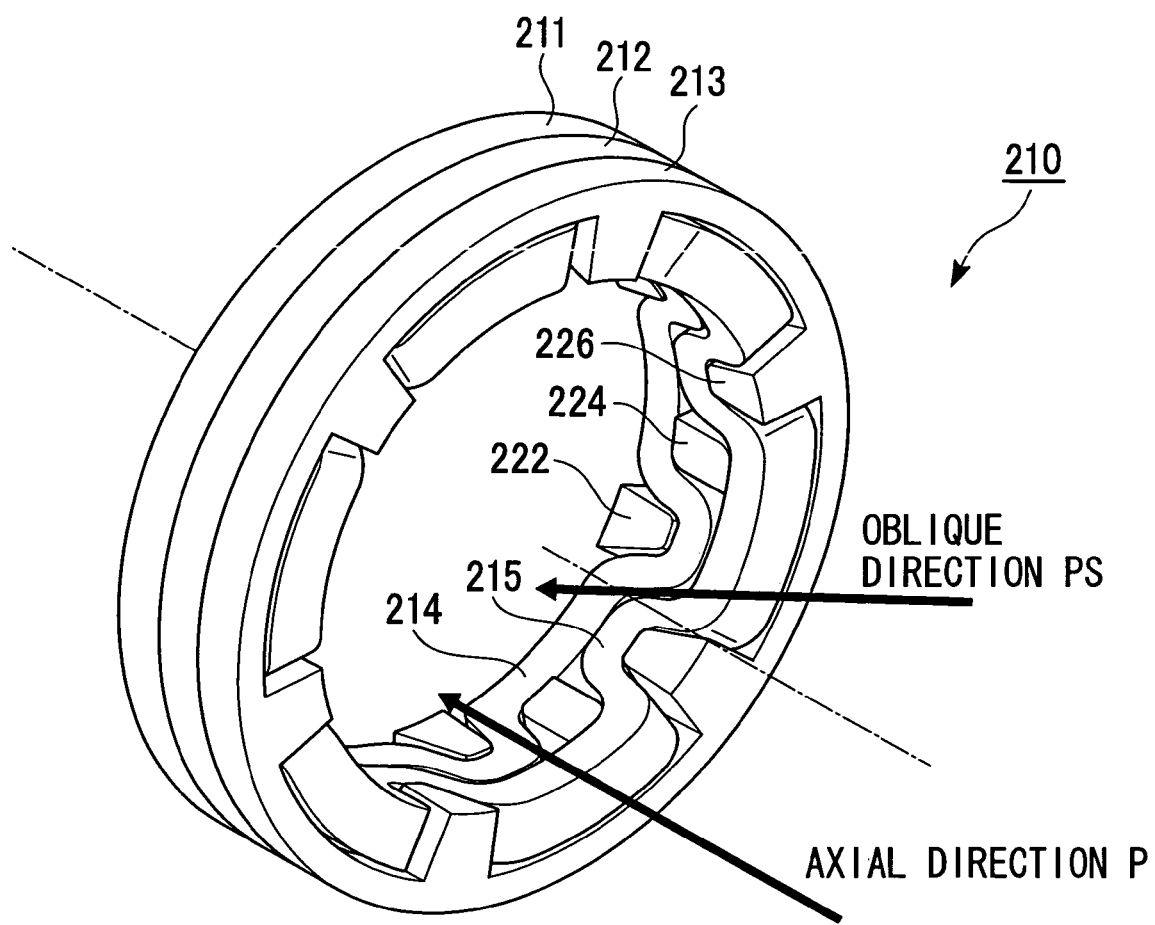
FIG. 33 is a perspective view showing the stator according to the second modification example of the fourth embodiment of the present invention.

In the fourth embodiment, the cross-sectional shape of the teeth 222, 224, and 226 in the radial direction R is rectangular, but is not limited thereto. As shown in FIGS. 32A and 33, in the case of the coil pitch being set to an electrical angle of 120°, when the number of phases of the annular coils 114 and 115 mounted in slots between the teeth 122, 124, and 126 that are adjacent in the circumferential direction varies between one phase and two phases, the U-phase teeth 222 and the W-phase teeth 226 that form the slot 241 in which both the U-phase annular coil 214 and the W-phase annular coil 215 of two phases are mounted, that is, the U-phase teeth 222 and the W-phase teeth 226 where the size of the step portion 233 in the axial direction P reaches a maximum, may be formed to have parallel sloping surfaces 222A, 226A, respectively, that slant with respect to the axial direction P, with the cross-sectional shape in the radial direction R being a trapezoid, so that the slot 241 between the U-phase teeth 222 and the W-phase teeth 226 may slant with respect to the axial direction P (for example, the sloping direction PS shown in FIG. 33 sloping with respect to the axial direction P).

In the second modification example, in the state of the teeth 222, 224, and 226 being set so that the intervals between each centroid position of the teeth 222, 224, and 226 in the circumferential direction C, that is, the teeth pitch (i.e., teeth pitch Pa shown in FIG. 32A), are uniform (Pa=Pa), with respect to the widths of the slots 241, 242, and 243, that is, the intervals between the adjacent teeth 222, 224, and 226 in a direction perpendicular to the slots 241, 242, and 243, the width PB of the slot 241 in which the U-phase annular coil 214 and the W-phase annular coil 215 of two phases are both mounted is set to be greater than the width PA of the slots 242 and 243 in which the U-phase annular coil 214 or the W-phase annular coil 215 of one phase is mounted (for example, PA<PB≈2× PA).

Figure 34A:
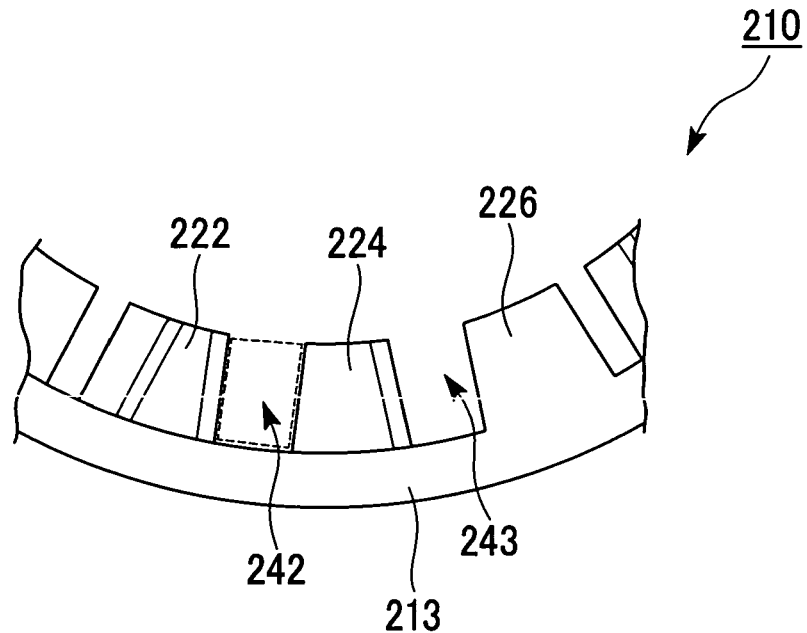
Figure 34B:
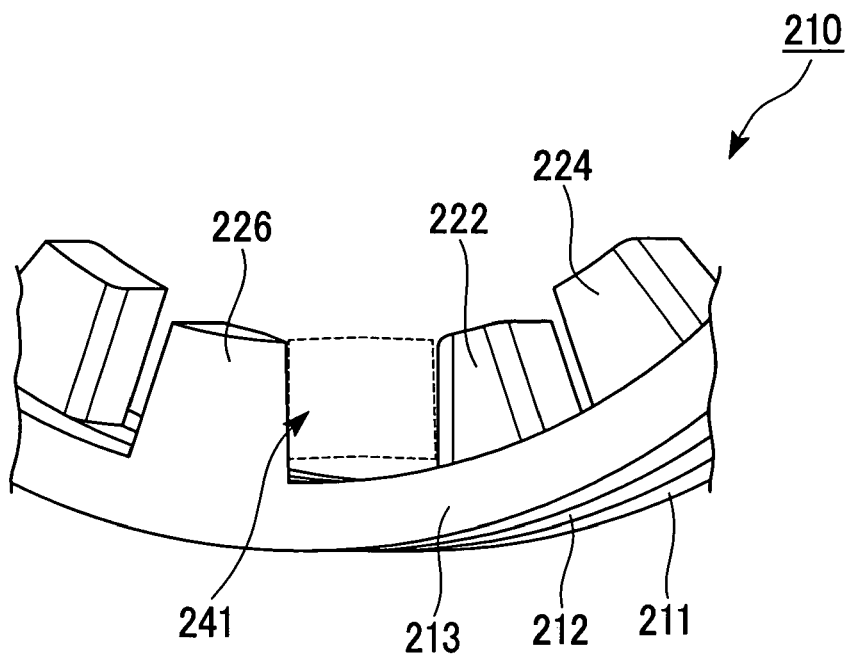
FIG. 34B is a perspective view showing slots between the U-phase teeth and the W-phase teeth viewed from an oblique direction PS shown in FIG. 33.
Figure 35:
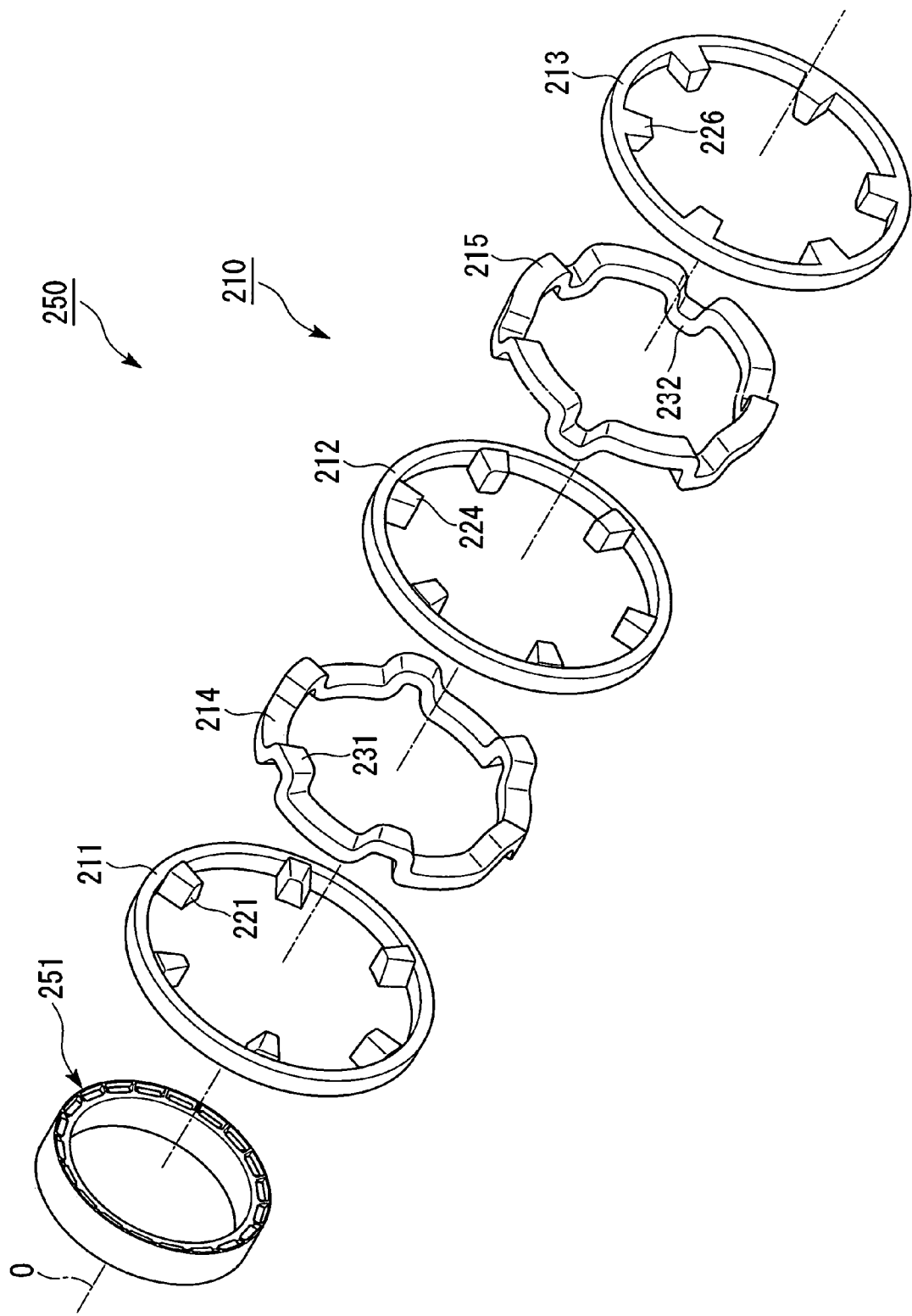
FIG. 35 is an exploded perspective view showing a claw pole motor according to the fourth embodiment of the present invention.
Figure 36:
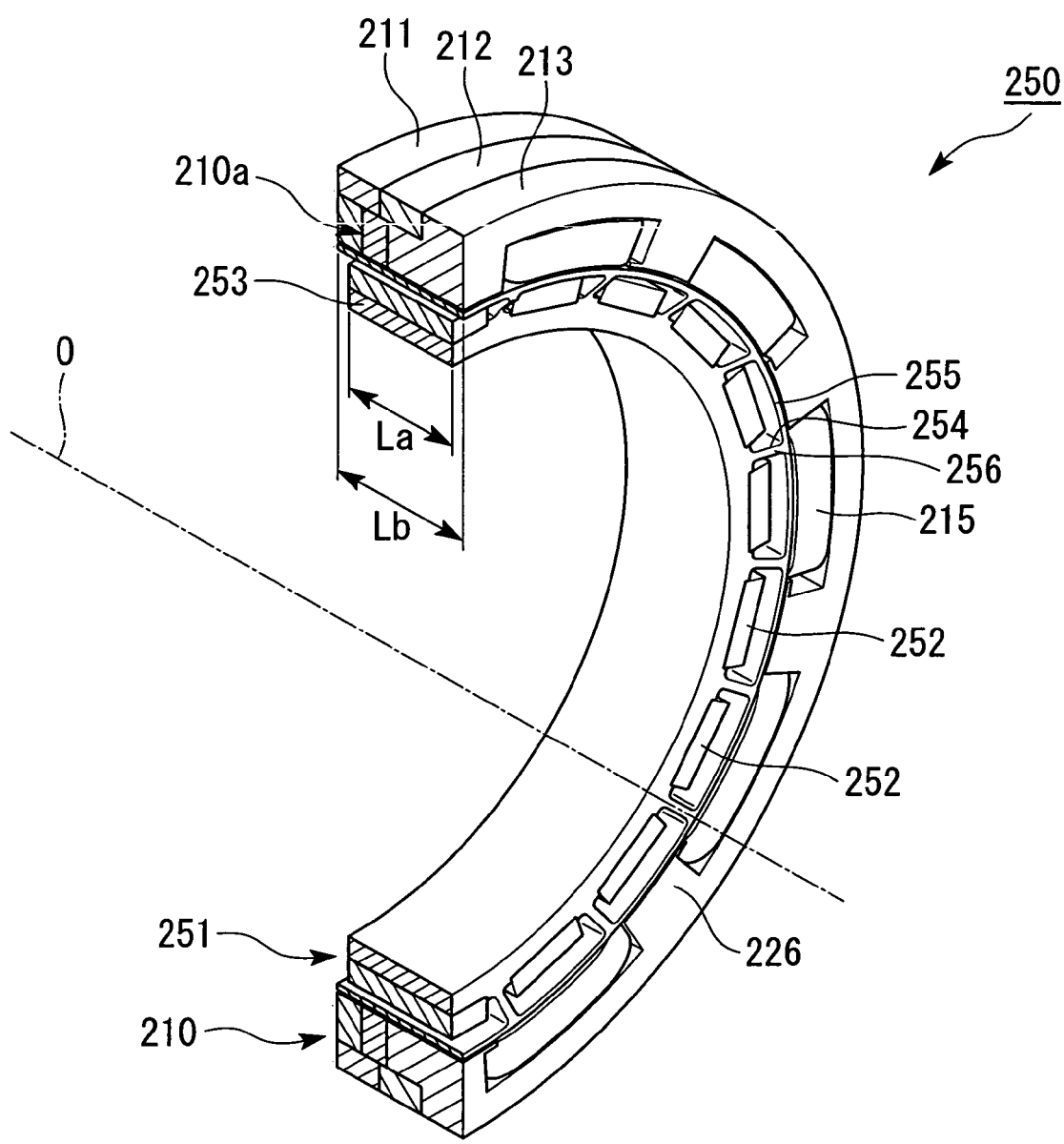
FIG. 36 is a perspective view showing a fracture of a portion of the claw pole motor according to the fourth embodiment of the present invention.
Figure 37A:
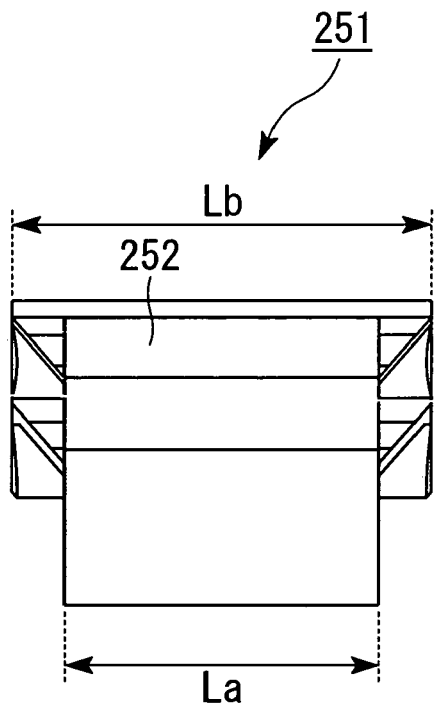
FIG. 37A is a sectional view showing a portion in a circumferential direction of the rotor according to the embodiment of the present invention.
Figure 37B:
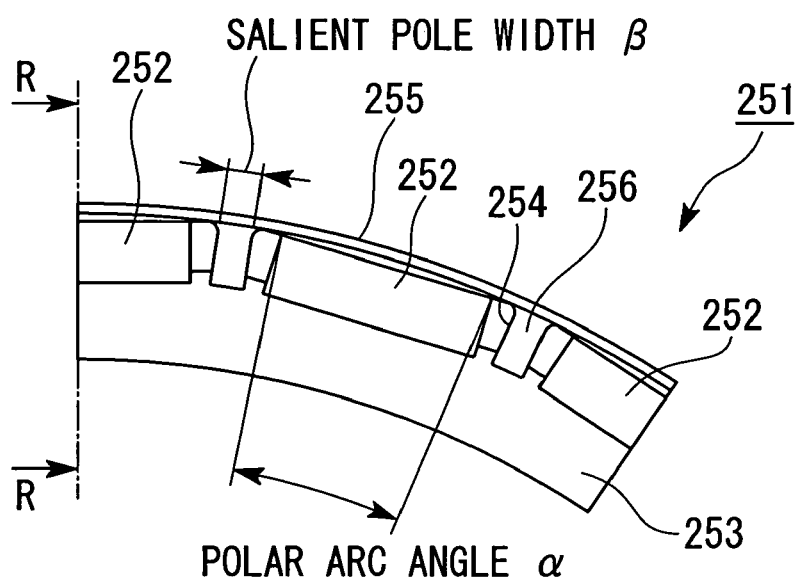
FIG. 37B is a plan view showing a portion viewed from a direction of rotation axis O of the rotor according to the embodiment of the present invention.

In slots 242 and 243 in which the U-phase annular coil 214 or the W-phase annular coil 215 of one phase are mounted as shown, for example, in FIG. 33, the cross-sectional shape of the slots 242 and 243 when viewed in the axial direction P is rectangular, as shown in FIG. 34A. In contrast, in the slot 241 in which the U-phase annular coil 214 and the W-phase annular coil 215 of two phases are both mounted as shown in FIG. 33, the cross-sectional shape of the slot when viewed in the oblique direction PS is rectangular, as shown, for example, in FIG. 34B. The ratio of the cross-sectional area of the slots 242 and 243 and the cross-sectional area of the slot 241 is set to be approximately 1:2.

Figure 32B:
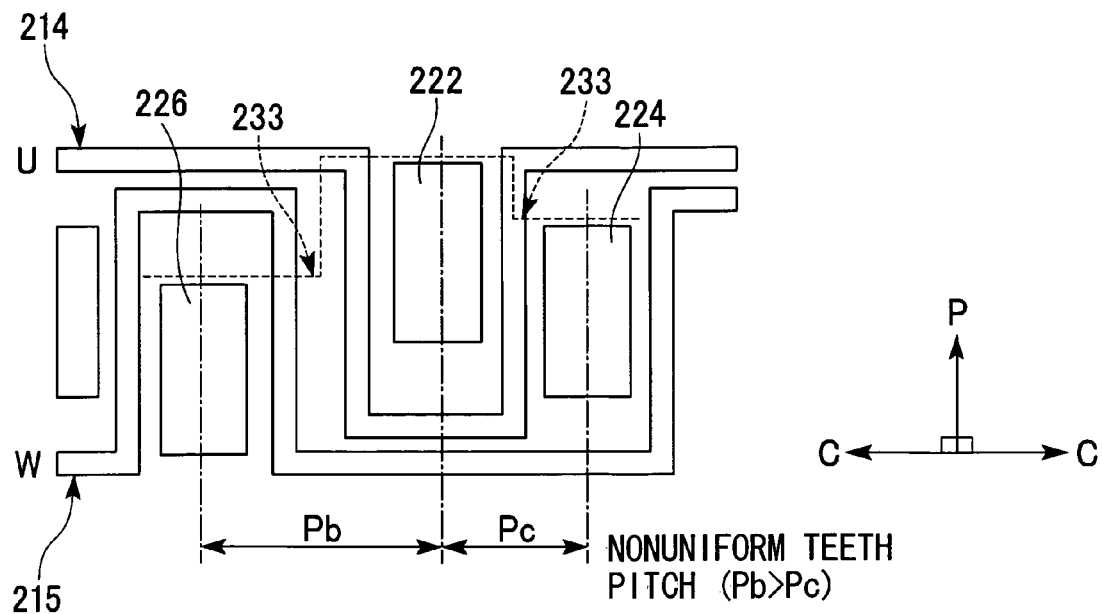
FIG. 32B is a schematic view showing a portion of the stator providing only slots parallel to an axial direction P, viewed from the base end portion side toward the distal end portion side of the teeth in the radial direction.

In the stator 210 according to the second modification example, in the case of providing only slots parallel to the axial direction P as shown, for example, in FIG. 32B, when ensuring the desired winding wire space factor with respect to each slot, in accordance with the number of phases of the annular coils 214 and 215 mounted in slots between the teeth 222, 224, and 226 that are adjacent in the circumferential direction C, the intervals between each centroid position of the teeth 222, 224, and 226 in the circumferential direction C, that is, the teeth pitch (for example, teeth pitch Pb, Pc shown in FIG. 32B) in effect become nonuniform (Pb>Pc). In contrast, even in the case of the number of phases of the annular coils 214 and 215 mounted in the slots 241, 242, and 243 between the teeth 222, 224, and 226, which are adjacent in the circumferential direction C, varying between one phase or two phases, it is not necessary to set the interval between each centroid position of the teeth 222, 224, and 226 to be nonuniform in accordance with the number of phases of the annular coils 214 and 215 to be mounted. Thereby, the desired winding space factor with respect to the annular coils 214 and 215 mounted in the slots 241, 242, and 243 can be ensured. Accordingly, reductions in the maximum torque that can be output due to, for example, the relative positions of teeth 222, 224, and 226 being nonuniform in the circumferential direction C and increases in the cogging torque and torque ripple can be prevented.

Moreover, in the slots 241 that slants with respect to the axial direction P, the cross-sectional shape of the slot 241 can be set to a rectangle identical to the slots 242 and 243 that are parallel in the axial direction P.

Therefore, the desired winding wire space factor can be ensured by annular coils 214 and 215 having a simple rectangular cross section, such as flat wire, with no need to use annular coils having a special cross-sectional shape.

A rotor 251 of a claw pole motor 250 equipped with the stator 210 according to the fourth embodiment and the first modification example and the second modification example of the fourth embodiment is a magnet-type rotor employing permanent magnets 252 as fields, as shown, for example, in FIGS. 35, 36, 37A and 37B. Inward near the outer periphery of the rotor body 253, a plurality of magnet mounting holes 254 extending along the direction of rotation axis O are installed at a specified interval in the circumferential direction.

The permanent magnets 252 to be mounted on the magnet mounting holes 254 are magnetized in, for example, the radial direction. The plurality of permanent magnets 252 disposed at a specified interval in the circumferential direction are disposed so that the magnetization directions of the permanent magnets 252 adjacent in the circumferential direction are reversed between adjacent magnets. To wit, a permanent magnet 252 whose outer circumferential side serves as an N-pole is adjacent to another permanent magnetic 252 whose outer circumferential side serves as an S-pole.

With respect to the stator body 210a in which the U-phase stator ring 211, the V-phase stator ring 212 and the W-phase stator ring 213 are connected so as to be superimposed in the direction of rotation axis O, the thickness La of the permanent magnets 252 in the direction of rotation axis O is set to be less than the effective length Lb in the axial direction of the teeth 222, 224, and 226 of three phases along the direction of rotation axis O (La<Lb). Opposing portions 255 that oppose the distal end portions of the inner circumferential side of the teeth 222, 224, and 226 are formed on the outer periphery of the rotor body 253. The thickness of the opposing portions 255 along the direction of rotation axis O is not less than the thickness La of the permanent magnets 252 in the direction of rotation axis O, and not longer than the effective length Lb in the axial direction of the teeth 222, 224, and 226 of three phases, being set, for example, to the same thickness as the effective length Lb in the axial direction of the teeth 222, 224, and 226 of three phases.

Salient pole portions 256 provided between the magnet mounting holes 254 adjacent in the circumferential direction and connected to the opposing portions 255 have a thickness in the direction of rotation axis O that changes to an increasing tendency from, for example, the thickness La to the thickness Lb while progressing from the inner circumferential side to the outer circumferential side in the radial direction.

Figure 38:
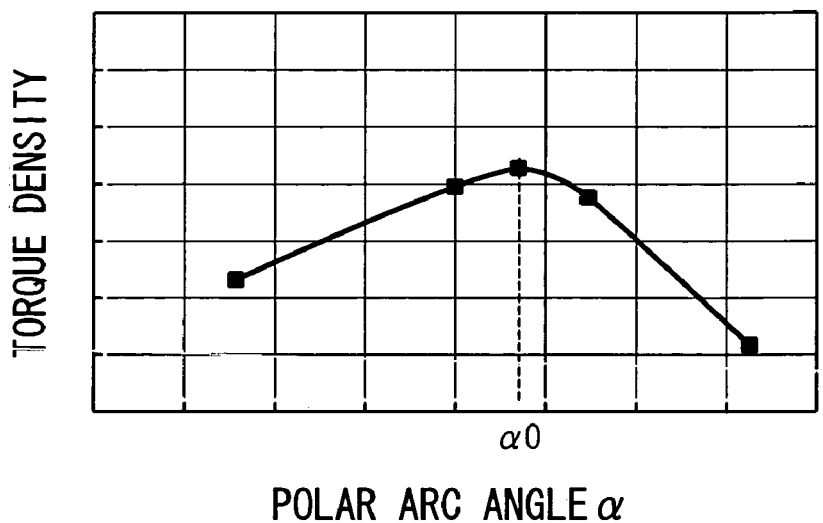
FIG. 38 is a graph showing an example of a polar arc angle and a torque density of the rotor according to the fourth embodiment of the present invention.
Figure 39:
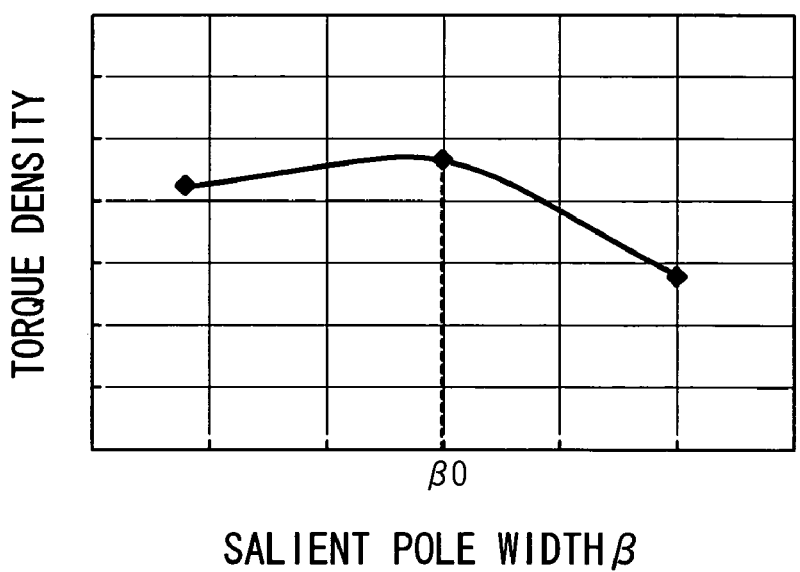
FIG. 39 is a graph showing an example of a salient pole width and a torque density of the rotor according to the fourth embodiment of the present invention.

The polar arc angle α corresponding to the length of the permanent magnets 252 in the circumferential direction C and a salient pole width β that is the length of the salient pole portions 256 in the circumferential direction C are set to suitable values α0, β0 at which the torque density is at a maximum, as shown, for example, in FIGS. 38 and 39.

In the claw pole motor 250, compared to the case of setting the thickness of the permanent magnets 252 in the direction of rotation axis O so as to be the same thickness as the stator body 210a in the direction of rotation axis O, with the thickness La of the permanent magnets 252 in the direction of rotation axis O shorter than the effective length Lb of the teeth 222, 224, and 226 of three phases in the axial direction, by increasing, for example, the length of the permanent magnets 252 in the circumferential direction C and the thickness of the permanent magnets 252 in the radial direction R, the weight of the rotor 251 can be decreased without changing the magnetic flux amount of the magnetic field flux between the permanent magnets 252 of the rotor 251 and the teeth 222, 224, and 226 of the stator 210.

Fifth Embodiment

A fifth embodiment of a stator of the present invention will be explained below with reference to the accompanying drawings.

With regard to a stator 310, a U-phase stator ring 311, a V-phase stator ring 312, a W-phase stator ring 313, a U-phase annular coil 314, and a W-phase annular coil 315 provided in the stator 310 of the present embodiment, descriptions of constitutions which are identical to the stator 110, the U-phase stator ring 111, the V-phase stator ring 112, the W-phase stator ring 113, the U-phase annular coil 114, and the W-phase annular coil 115 provided in the stator 110 of the second embodiment shall be omitted.

With regard to a U-phase yoke 321 and U-phase teeth 322 provided in the U-phase stator ring 311 of the present embodiment; a V-phase yoke 323 and V-phase teeth 324 provided in the V-phase stator ring 312 of the present embodiment; and a W-phase yoke 325 and W-phase teeth 326 provided in the W-phase stator ring 313 of the present embodiment, descriptions of constitutions which are identical to the U-phase yoke 121, U-phase teeth 122; V-phase yoke 123, V-phase teeth 124; and W-phase yoke 125, W-phase teeth 126 of the second embodiment shall be omitted.

In the present embodiment, the stator rings 311, 312, and 313 in the present embodiment are joined so that the yokes 321, 323, and 325 are superimposed in the axial direction P. As shown, for example, in FIG. 40, the plurality of teeth 322, 324, and 326 are arranged in the circumferential direction C in a specified order (for example, in the order of U-phase tooth 322, V-phase tooth 324, W-phase tooth 326, etc.). Slots where the U-phase annular coil 314 of one phase is to be disposed are formed between the teeth 322 and 324 that are adjacent in the circumferential direction C. Slots where the W-phase annular coil 315 of one phase is to be disposed are formed between the teeth 324 and 326 that are adjacent in the circumferential direction C. Slots where the both the U-phase annular coil 314 and the W-phase annular coil 315 of two phases are disposed are formed between the teeth 322 and 326 that are adjacent in the circumferential direction C.

The teeth 322, 324, and 326 of the stator rings 311, 312, and 313 have identical widths in the axial direction and the circumferential direction. The interval between the teeth 322, 324, and 326 adjacent in the circumferential direction C (that is, the width in the circumferential direction of the slots) is set to a value corresponding to the number of annular coils 314 and 315 disposed in the slots (for example, a value proportional to the number of coils). In other words, the interval C1 between the teeth 322 and 324 and between the teeth 324 and 326 in which the annular coils 314 and 315 are singly disposed is set to a value less than an interval C2 between the teeth 322 and 326 in which both annular coils 314 and 315 of two phases are disposed (for example, ½ of the interval C2 between the teeth 322 and 326).

The annular coils 314 and 315 surround the circumference around the axis while meandering in a crank shape within the circumferential surface, to be thereby provided with a plurality of U-phase meandering portions 331 and W-phase meandering portions 332, respectively.

Figure 40:
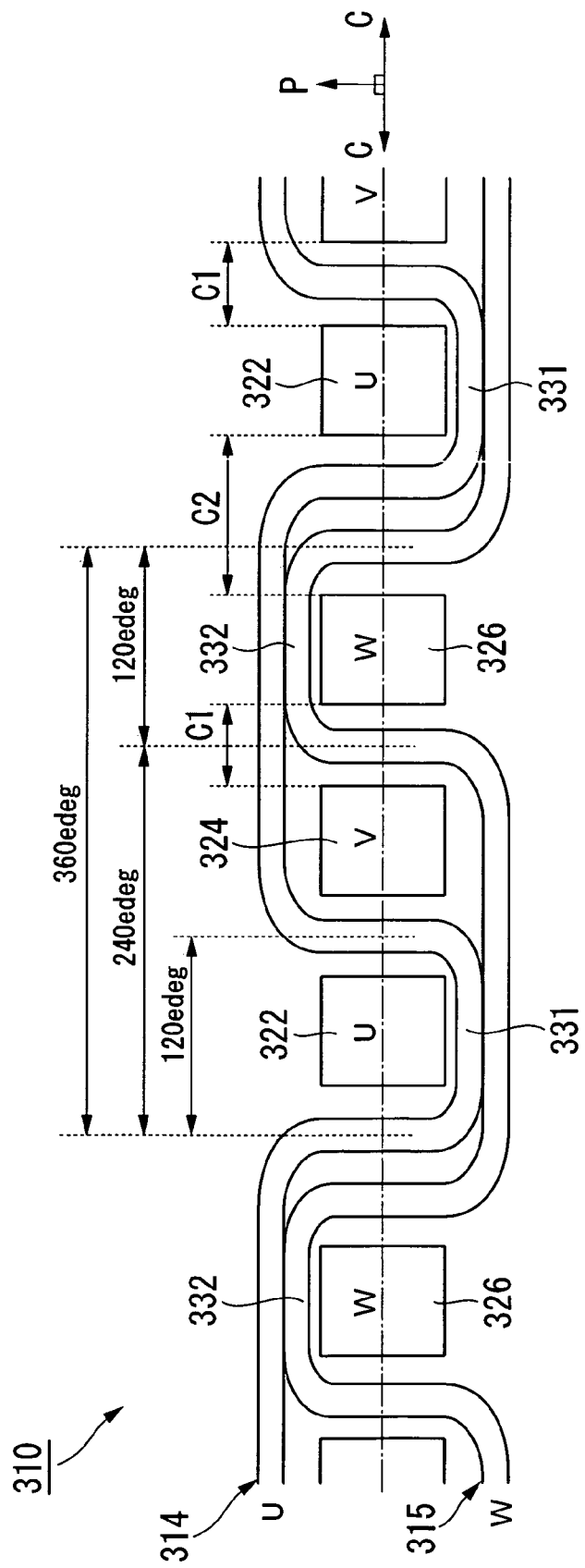
FIG. 40 is a sectional view in a radial direction showing a portion of a stator according to a fifth embodiment of the present invention.

The width of the meandering portions 331 and 332 in the circumferential direction C, that is, the coil pitch, is set to an electrical angle of 120°, as shown, for example, in FIG. 40. The meandering portions 331 and 332 are configured to project in mutually different directions (that is, the one side and the other side along the axis P, which are mutually opposing directions). The U-phase annular coil 314 and the W-phase annular coil 315 are disposed at relatively shifted positions along the circumferential direction C so as to have a phase difference of 240° in terms of electrical angle. Thereby, with respect to the U-phase meandering portion 331, the W-phase meandering portion 332 that is adjacent on the one side in the circumferential direction C has a phase difference of 240° in terms of electrical angle, and the W-phase meandering portion 332 that is adjacent on the other side in the circumferential direction C has a phase difference of 120°. The meandering portions 331 and 332, which project in mutually opposite directions, are alternately arranged along the circumferential direction C so that the annular coils 314 and 315 of the two phases are disposed so as not to mutually cross.

One U-phase tooth 322 of the U-phase stator ring 311 is disposed in each U-phase meandering portion 331 of the U-phase annular coil 314. One W-phase tooth 326 of the W-phase stator ring 313 is disposed in each W-phase meandering portion 332 of the W-phase annular coil 315. One V-phase tooth 324 of the V-phase stator ring 312 is disposed between each U-phase meandering portion 331 and each W-phase meandering portion 332 that are adjacent in the circumferential direction C.

Thereby, the annular coils 314 and 315 of two phases, which are disposed so as to weave between the teeth 322 and 324, between the teeth 324 and 326, or between the teeth 322 and 326 adjacent in the circumferential direction C, are formed so as to have so-called short-pitch wave windings of not more than 120° in terms of electrical angle.

The annular coils 314 and 315 of two phases having a phase difference (coil phase difference) of 240° in terms of electrical angle are as shown, for example, in FIG. 11A connected in a V-shape, and energized with sinusoidal waves having a mutual phase difference of 120°. Thereby, for example, when leakage flux can be disregarded, as shown in FIG. 11C, a rotating magnetic field is produced similar to that of a three-phase stator having three-phase coils of, U, V, and W phases are connected in a Y-shape and energized by sinusoidal waves with a mutual phase difference of 120°.

When connecting the annular coils 314 and 315 of two phases having a phase difference of 60° in terms of electrical angle in a V-shape with their meandering portions 331 and 332 projecting in the same direction (that is, the first direction or the second direction along the axis P) as shown, for example, in FIG. 11B, similarly to connecting the annular coils 314 and 315 of two phases having a phase difference of 240° in terms of electrical angle in a V-shape with their meandering portions 331 and 332 projecting in mutually different directions (that is, the first direction and the second direction along the axis P) as shown in FIG. 11A, in the case of being energized with sinusoidal waves having a mutual phase difference of 120°, for example, when leakage flux can be disregarded, as shown in FIG. 11C, a rotating magnetic field can be produced similarly to that of a three-phase stator in which its coils of U, V, and W phases are connected in a Y-shape and energized by sinusoidal waves with a mutual phase difference of 120°.

That is, similarly to the second embodiment, the voltage equation of a three-phase (U-phase, V-phase, W-phase) motor can be expressed as shown in the above-mentioned Eq. (1).

Similarly to the second embodiment, the line-to-line voltage from the phase voltage command values Vu, Vv, and Vw (for example, the line-to-line voltage Vuv between the U-phase and V-phase (=Vu−Vv), and the line-to-line voltage Vwv between the W phase and V-phase (=Vw−Vv)) is expressed as shown in the above-mentioned Eq. (2).

Similarly to the second embodiment, a model that eliminates, for example, the V-phase from the voltage equation of the three-phase (U-phase, V-phase, W-phase) motor shown in the above-mentioned Eq. (1) is described as shown in the above-mentioned Eq. (3).

Similarly to the second embodiment, by inverting the orientation of the W-phase coil (that is, inverting the direction of rotation of the rotor), the model shown in the above-mentioned Eq. (3) is expressed as shown in the above-mentioned Eq. (4).

Similarly to the second embodiment, by altering the number of turns "n" of the coils to a multiple of $\sqrt{3}$, the model shown in the above-mentioned Eq. (4) can be expressed as shown in the above-mentioned Eq. (5).

Similarly to the second embodiment, by moving the angle of origin of the phase of the induced voltages by 90° (=π/2) and performing substitution with the U-phase component and the W-phase component, the model shown in the above-mentioned Eq. (5) can be expressed as the above-mentioned Eq. (6), which is equivalent to the above-mentioned Eq. (2).

The stator 310 according to the fifth embodiment is provided with the aforementioned constitution. Next, a method of manufacturing the stator 310 will be explained below with reference to the accompanying drawings.

Figure 41:
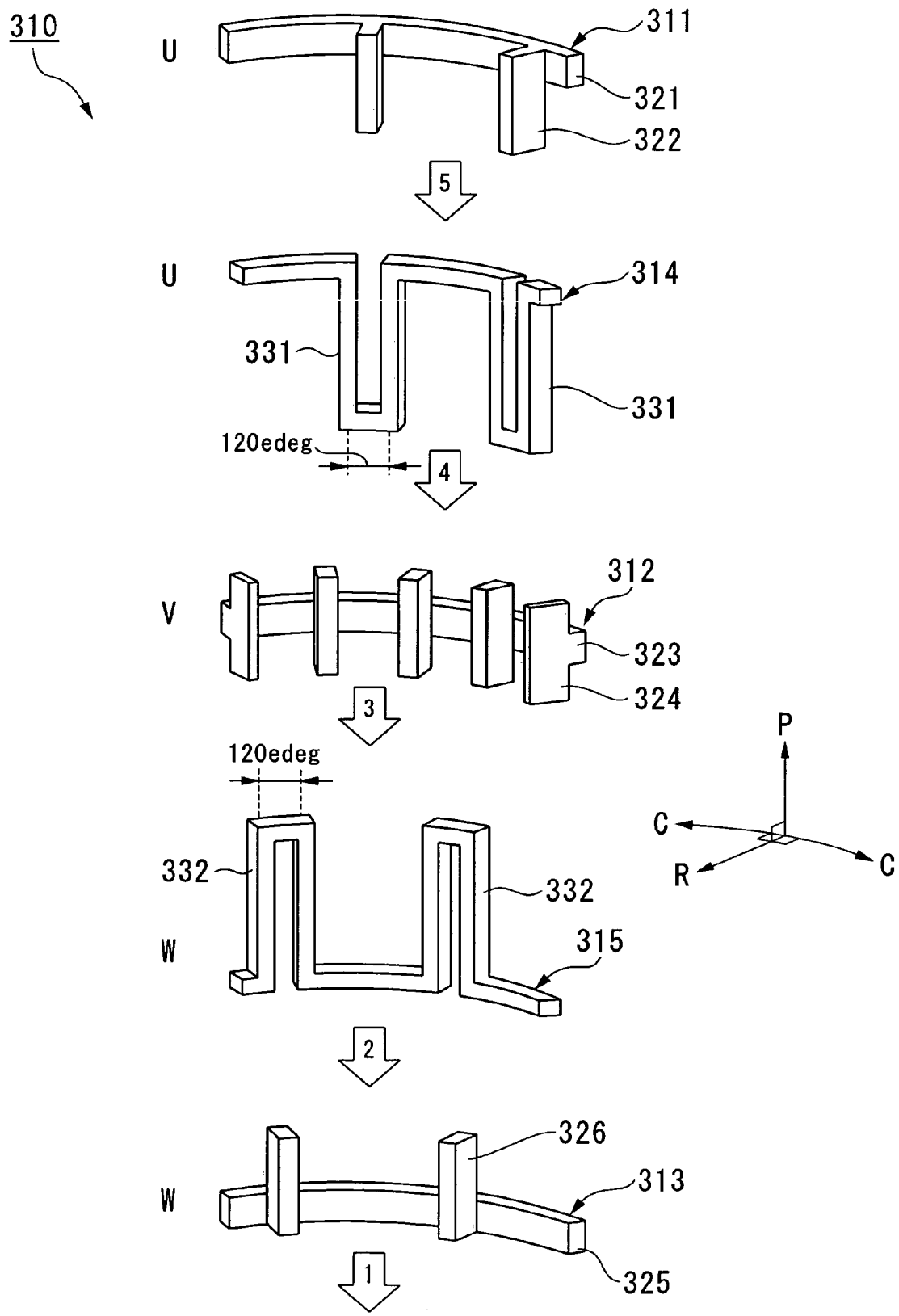
FIG. 41 is an exploded perspective view showing a portion of the stator according to the fifth embodiment of the present invention.

As shown, for example, in FIG. 41, by forming the U-phase annular coil 314 and the W-phase annular coil 315 of two phases into a crank shape so as to have a coil pitch of an electrical angle of 120°, a plurality of U-phase meandering portions 331 and W-phase meandering portions 332 are formed. The meandering portions 331 and 332 are configured to protrude in mutually opposing directions (that is, the one side (first direction) and the other side (second direction) along the axis P) of the U-phase annular coil 314 and the W-phase annular coil 315, with the annular coils 314 and 315 being disposed coaxially with respect to the axis.

The W-phase stator ring 313, which is provided with a plurality of W-phase teeth 326 that project in the first direction of the axis P, is disposed at a specified position that is coaxial with respect to the axis.

Next, the W-phase annular coil 315 is relatively moved from the first direction to the second direction along the axis P with respect to the W-phase stator ring 313, and the plurality of W-phase teeth 326 of the W-phase stator ring 313 are relatively inserted into the W-phase meandering portions 332 of the W-phase annular coil 315.

Next, the V-phase stator ring 312 is relatively moved from the first direction to the second direction along the axis P with respect to the W-phase stator ring 315 in the state of being disposed coaxially with respect to the axis, and one of the V-phase teeth 324 of the V-phase stator ring 312 is inserted between the W-phase meandering portions 332 that are adjacent in the circumferential direction C of the W-phase annular coil 315. The W-phase yoke 325 of the W-phase stator ring 313 and the V-phase yoke 323 of the V-phase stator ring 312 are thereby joined so as to be superimposed along the axis P.

Next, the U-phase annular coil 314 is relatively moved from the first direction to the second direction along the axis P with respect to the W-phase annular coil 315 in the state of the U-phase annular coil 314 being disposed at a position relatively shifted along the circumferential direction C with respect to the W-phase annular coil 315, so that the U-phase annular coil 314 and the W-phase annular coil 315 have a phase difference of 240° in terms of electrical angle. Then, the meandering portions 331 and 332 that project in mutually opposing directions are alternately arranged along the circumferential direction C, and the annular coils 314 and 315 of the two phases are disposed so as not to mutually cross.

Next, the U-phase stator ring 311 is relatively moved from the first direction to the second direction along the axis P with respect to the U-phase annular coil 314 in the state of the U-phase stator ring 311 being disposed coaxially with respect to the axis, so that the U-phase teeth 322 of the U-phase stator ring 311 are relatively inserted into the U-phase meandering portions 331 of the U-phase annular coil 314. The V-phase yoke 323 of the V-phase stator ring 312 and the U-phase yoke 321 of the U-phase stator ring 311 are thereby joined so as to be superimposed along the axis P.

Figure 42:
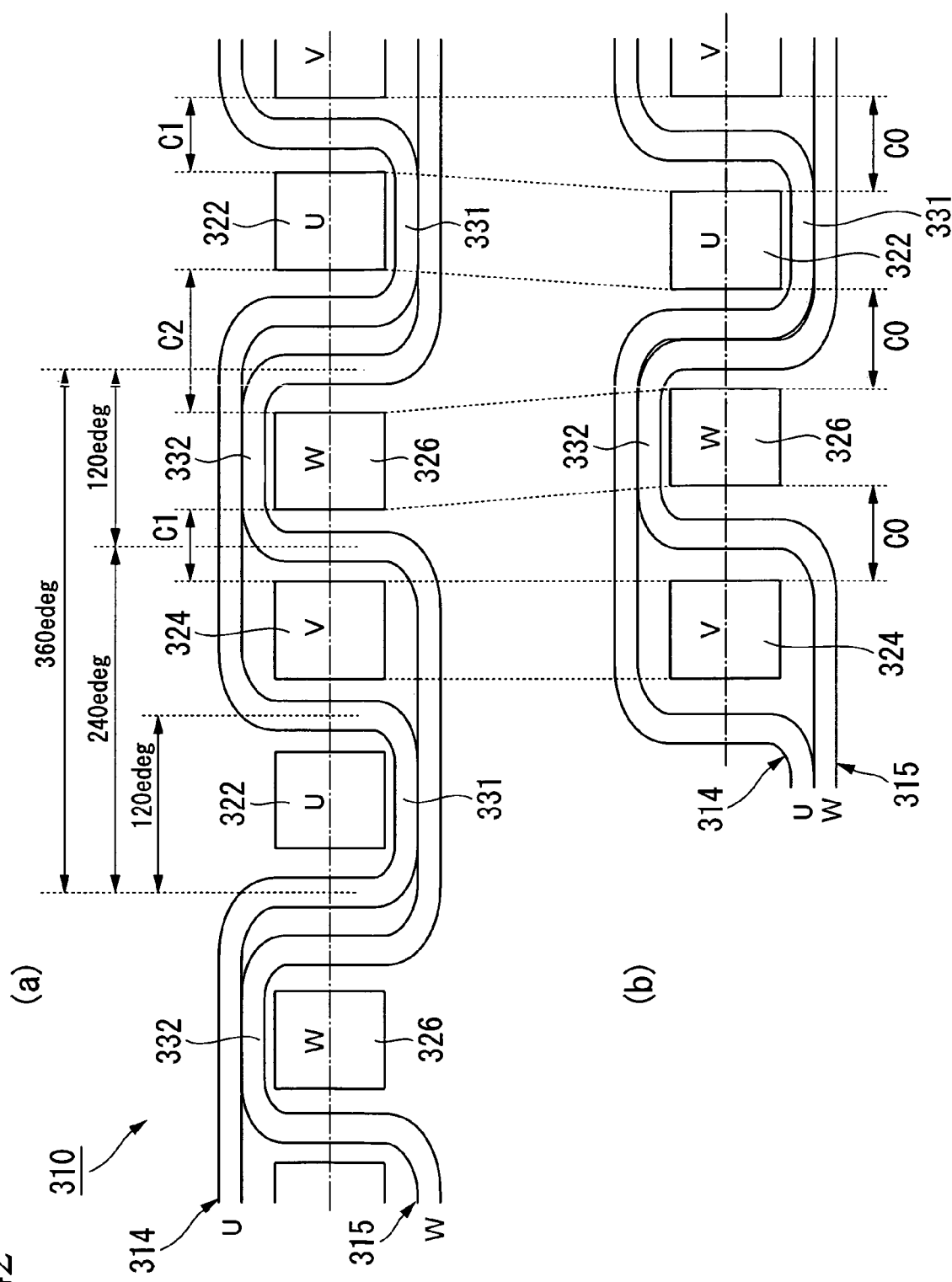
In FIG. 42, part (a) is a radial sectional view showing a portion of the stator according to the fifth embodiment of the present invention, while part (b) is a radial section view showing a portions of the stator in which intervals between the teeth adjacent in a circumferential direction C are set to a same value.

With the stator 310 of the fifth embodiment, as shown in part (a) of FIG. 42, by setting the intervals between the teeth 322, 324, and 326 adjacent in the circumferential direction C (that is, the widths in the circumferential direction of the slots) to a value corresponding to the number of annular coils 314 and 315 disposed in the slots (for example, a value proportional to the number of coils) so as to be nonuniform, compared to the case of setting the interval between the teeth 322, 324, and 326 adjacent in the circumferential direction C to the same value C0 regardless of the number of annular coils 314 and 315 disposed in the slots as shown, for example, in part (b) of FIG. 42, decreases in the winding space factor corresponding to the number of annular coils 314 and 315 mounted in the slots can be prevented.

First Modification Example of Fifth Embodiment

In the fifth embodiment, the intervals between the teeth 322, 324, and 326 adjacent in the circumferential direction C (that is, the widths in the circumferential direction of the slots) were set to a value corresponding to the number of annular coils 314 and 315 disposed in the slots, but it is not limited thereto. For example, the intervals between at least the base end portions of the teeth 322, 324, and 326 connected to the respective yokes 321, 323, and 325 may be set to a value corresponding to the number of annular coils 314 and 315 disposed in the slots, and the intervals between the distal end portions of the teeth 322, 324, and 326 constituting the rotor opposing portion that opposes the rotor (not illustrated) may be set to a value corresponding to the magnetic pole arrangement of the rotor.

Figure 43:
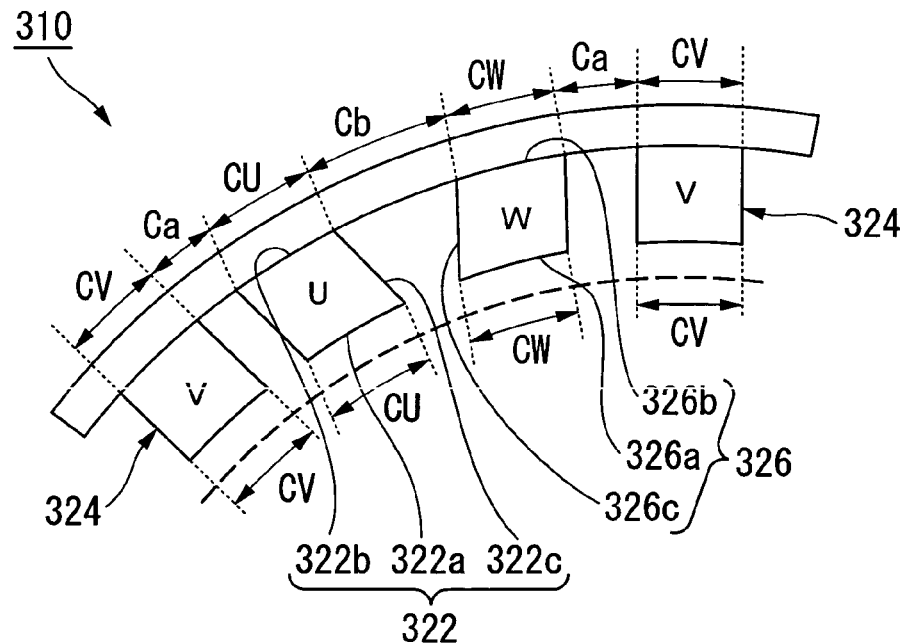
FIG. 43 is a sectional view in the axial direction showing a portion of a stator according to a first modification example of the fifth embodiment of the present invention.

In the first modification example shown in FIG. 43, for example, in the state of the distal end portions of the teeth 322, 324, and 326 successively disposed in positions spaced at a specified interval in the circumferential direction C, with respect to the U-phase teeth 322 and the W-phase teeth 326 that form the slots in which both the U-phase annular coil 314 and the W-phase annular coil 315 of two phases are mounted, a tilting portion 322c is formed in the U-phase teeth 322, so that while heading from a distal end portion 322a to a base end portion 322b in the radial direction R without altering the circumferential width CU of the U-phase teeth 322, the positions of the U-phase teeth 322 in the circumferential direction C move away from the adjacent W-phase teeth 326 and progressively shift in the direction approaching the adjacent V-phase teeth 324.

A tilting portion 326c is formed in the W-phase teeth 326, so that while heading from a distal end portion 326a to a base end portion 326b in the radial direction R without altering the circumferential width CW of the W-phase teeth 326, the positions of the W-phase teeth 326 in the circumferential direction C move away from the adjacent U-phase teeth 322 and progressively shift in the direction approaching the adjacent V-phase teeth 324.

The V-phase teeth 324 are formed so that their positions in the circumferential direction C are unchanged, with the circumferential width CV of the V-phase teeth 324 not changing in the radial direction R from the distal end to the base end portion.

Thereby, in the state of the intervals between the distal end portions of the teeth 322, 324, and 326 adjacent in the circumferential direction being set to the same value, the interval Cb between the base end portions 322b, 326b of the U-phase teeth 322 and the W-phase teeth 326, at which the U-phase annular coil 314 and the W-phase annular coil 315 of two phases are disposed, is set to a greater value than the interval Ca between the base end portions of the teeth 322 and 324 or the base end portions of the teeth 324 and 326, at which the U-phase annular coil 314 or the W-phase annular coil 315 of one phase is disposed. Accordingly, the cross-sectional shape of the U-phase teeth 322 and the W-phase teeth 326 in the axial direction P is a parallelogram, while the cross-sectional shape of the V-phase teeth 324 in the axial direction P is a rectangle.

In the first modification example, the intervals between the teeth 322, 324, and 326 near the base end portions can be suitably set with the relative positions of the rotor opposing portions of the teeth 322, 324, and 326 with regard to the rotor (not illustrated) being unchanged. Thereby, reductions in the maximum torque that can be output and increases in the cogging torque and torque ripple can be prevented while preventing reductions in the winding wire space factor.

Second Modification Example of Fifth Embodiment

Figure 44:
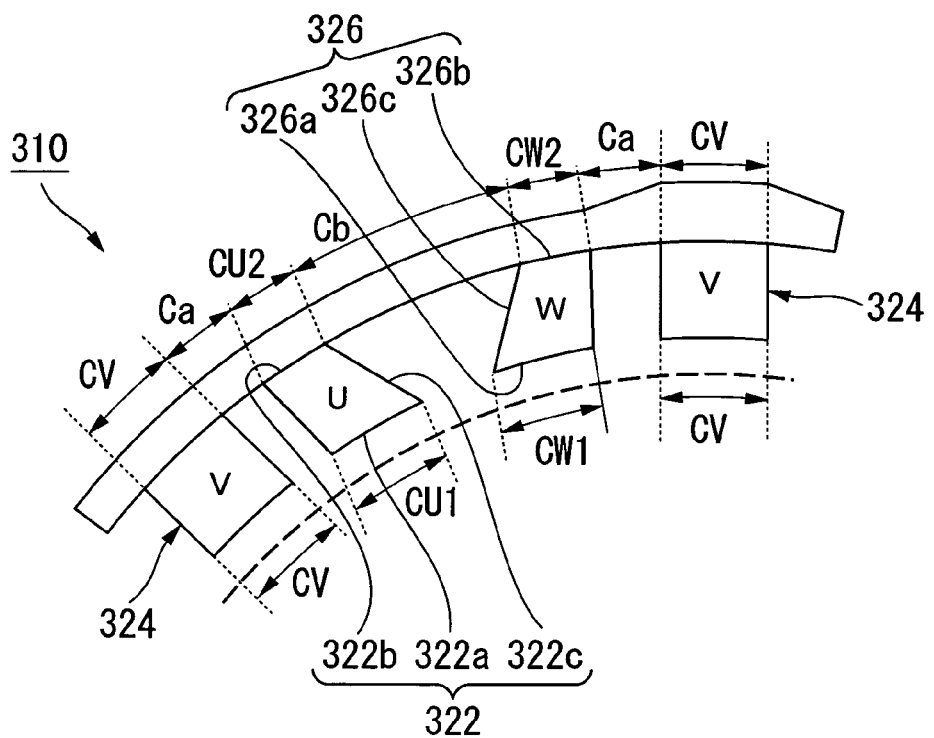
FIG. 44 is a sectional view in an axial direction showing a portion of a stator according to a second modification example of the fifth embodiment of the present invention.
Figure 45:
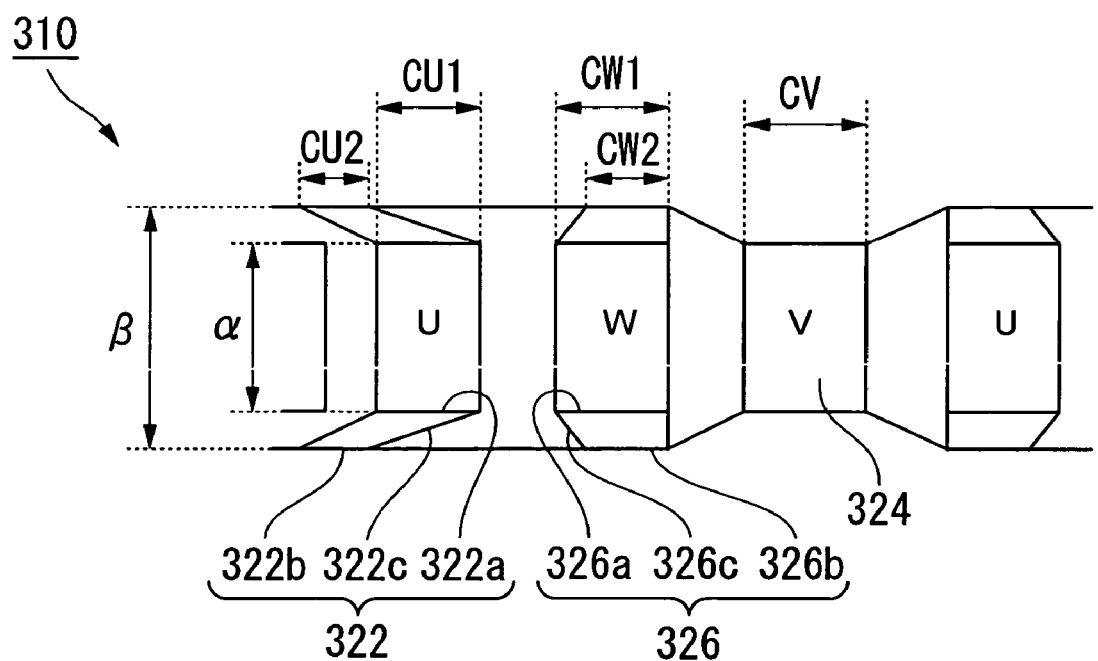
FIG. 45 is a schematic view showing a portion of a stator according to the second modification example of the fifth embodiment of the present invention viewed from a radial direction.

In the second modification example shown in FIGS. 44 and 45, for example, in the state of the distal end portions of the teeth 322, 324, and 326 successively disposed in positions spaced at a specified interval in the circumferential direction C, with respect to the U-phase teeth 322 and the W-phase teeth 326 that form the slots in which both the U-phase annular coil 314 and the W-phase annular coil 315 of two phases are mounted, a tilting portion 322c is formed in the U-phase teeth 322, so that while heading from the distal end portion 322a to the base end portion 322b in the radial direction R, the circumferential width of each U-phase tooth 322 changes to a decreasing tendency (for example, from circumferential width CU1 to circumferential width CU2) and the axial width of the U-phase teeth 322 changes to an increasing tendency (for example, from axial width α to axial width β). Thereby, without altering the area of the radial cross section of the U-phase teeth 322 defined by the product of the width in the circumferential direction and the width in the axial direction, the position of each of the U-phase teeth 322 in the circumferential direction C moves away from the adjacent W-phase teeth 326, and becomes invariable with respect to the V-phase tooth that is adjacent.

A tilting portion 326c is formed in the W-phase teeth 326, so that while heading from the distal end portion 326a to the base end portion 326b in the radial direction R, the circumferential width of each W-phase tooth 326 changes to a decreasing tendency (for example, from circumferential width CW1 to circumferential width CW2) and the axial width of the W-phase teeth 326 changes to an increasing tendency (for example, from axial width α to axial width β). Thereby, without altering the area of the radial cross section of the W-phase teeth 326 defined by the product of the width in the circumferential direction and the width in the axial direction, the position of each of the W-phase teeth 326 in the circumferential direction C moves away from the adjacent U-phase teeth 322, and becomes invariable with respect to the V-phase tooth 324 that is adjacent.

The V-phase teeth 324 are formed so that their positions in the circumferential direction C are unchanged, with the circumferential width CV and the axial width a of the V-phase teeth 324 not changing from the distal end to the base end portion in the radial direction R.

Thereby, in the state of the intervals between the distal end portions of the teeth 322, 324, and 326 adjacent in the circumferential direction being set to the same value, the interval Cb between the base end portions 322b of the U-phase teeth 322 and the base end portions 326b of the W-phase teeth 326, at which the U-phase annular coil 314 and the W-phase annular coil 315 of two phases are disposed, is set to a greater value than the interval Ca between the base end portions of the teeth 322 and 324 or between the base end portions of the teeth 324 and 326, at which the U-phase annular coil 314 or the W-phase annular coil 315 of one phase is disposed. The cross-sectional shapes of the U-phase teeth 322 and the W-phase teeth 326 in the axial direction P is trapezoidal, while the cross-sectional shape of the V-phase teeth 324 in the axial direction P is a rectangle.

In the second modification example, all the magnetic flux that passed the rotor opposing surface of the teeth 322, 324, and 326 can be set to pass the base end face of the teeth 322, 324, and 326, an increase in conduction loss per unit current when generating the desired torque can be prevented, the interval between the teeth 322, 324, and 326 near the base end portions can be suitably set, and reductions in the winding wire space factor can be prevented.

Third Modification Example of Fifth Embodiment

Figure 46A:
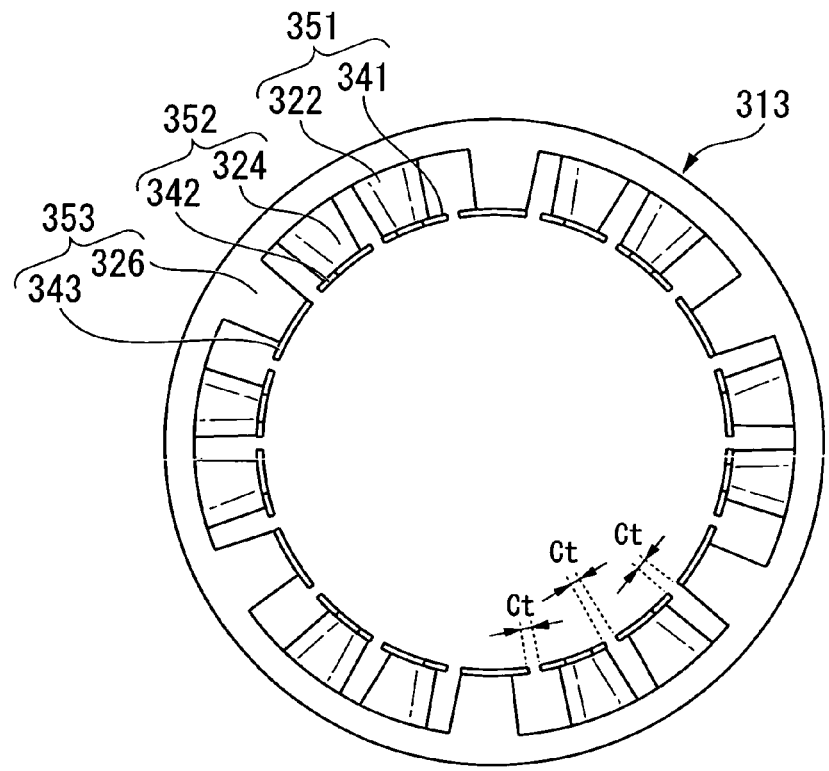
FIG. 46A is a plan view showing a stator according to a third modification example of the fifth embodiment of the present invention viewed from an axial direction P.
Figure 46B:
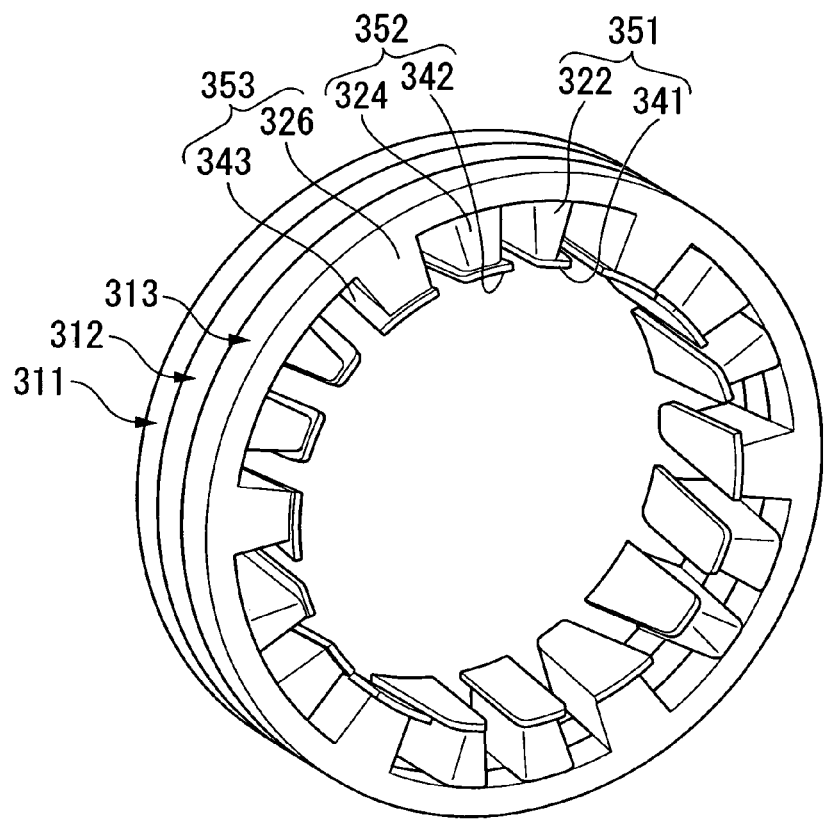
FIG. 46B is a perspective view showing the stator according to the third modification example of the embodiment of the present invention.

In the fifth embodiment, by setting the intervals between the teeth 322, 324, and 326 adjacent in the circumferential direction C (that is, the widths in the circumferential direction of the slots) to a value corresponding to the number of annular coils 314 and 315 disposed in the slots (for example, a value proportional to the number of coils) so as to be nonuniform, the intervals between the distal end portions of the teeth 322, 324, and 326 that form rotor opposing portions that oppose the rotor (not illustrated) were made nonuniform, but it is not limited thereto. In the third modification example shown, for example, in FIG. 46A, 46B, the intervals between the teeth 322, 324, and 326 that are adjacent in the circumferential direction C may be set to a value corresponding to the number of annular coils 314 and 315 disposed in the slots, being set to be nonuniform. Extension portions 341, 342, and 343 that project in the circumferential direction from the distal end portions of the teeth 322, 324, and 326 may be provided. With regard to opposing portions 351, 352, and 353 which are constituted by the distal end portions of the teeth 322, 324, and 326 and the extension portions 341, 342, and 343 that project from these distal end portions, an interval Ct between the opposing portions 351, 352, and 353 of the teeth 322, 324, and 326 adjacent in the circumferential C direction may be set so as to be uniform.

According to the third modification example, reductions in the maximum torque that can be output due to the interval between the opposing portions 351, 352, and 353 oppose the rotor being nonuniform and increases in the cogging torque and torque ripple can be prevented.

Moreover, in the slots formed between the teeth 322, 324, and 326 that are adjacent in the circumferential direction C, the cross-sectional shape in the direction that the slots extend can be rectangular. Therefore, the desired winding wire space factor can be easily ensured by annular coils 314 and 315 having a simple rectangular cross section, such as flat wire, with no need to use annular coils having a special cross-sectional shape.

Figure 47A:
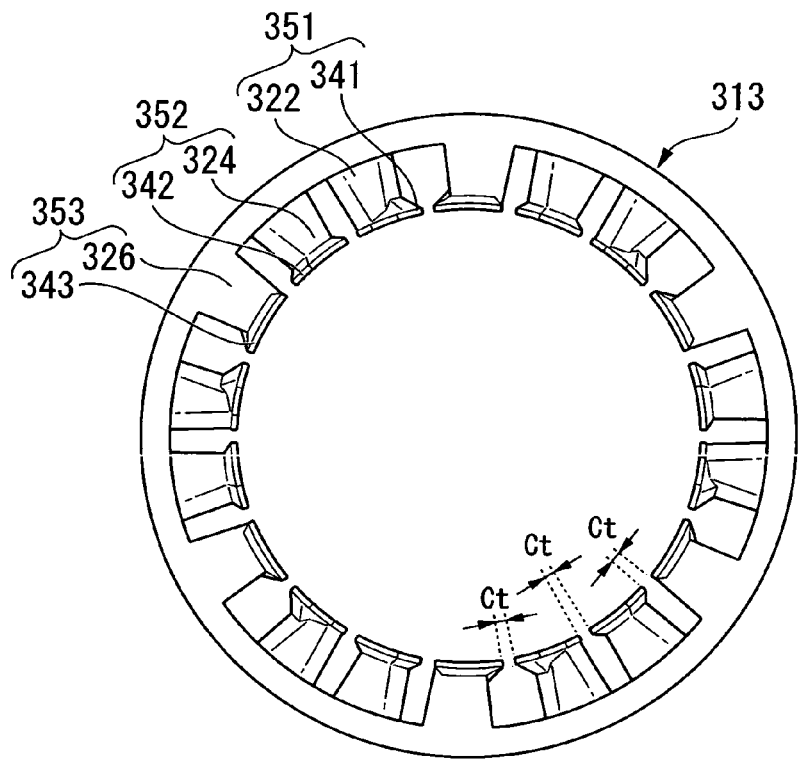
FIG. 47A is a plan view showing the stator according to the third modification example of the fifth embodiment of the present invention viewed from the axial direction P.
Figure 47B:
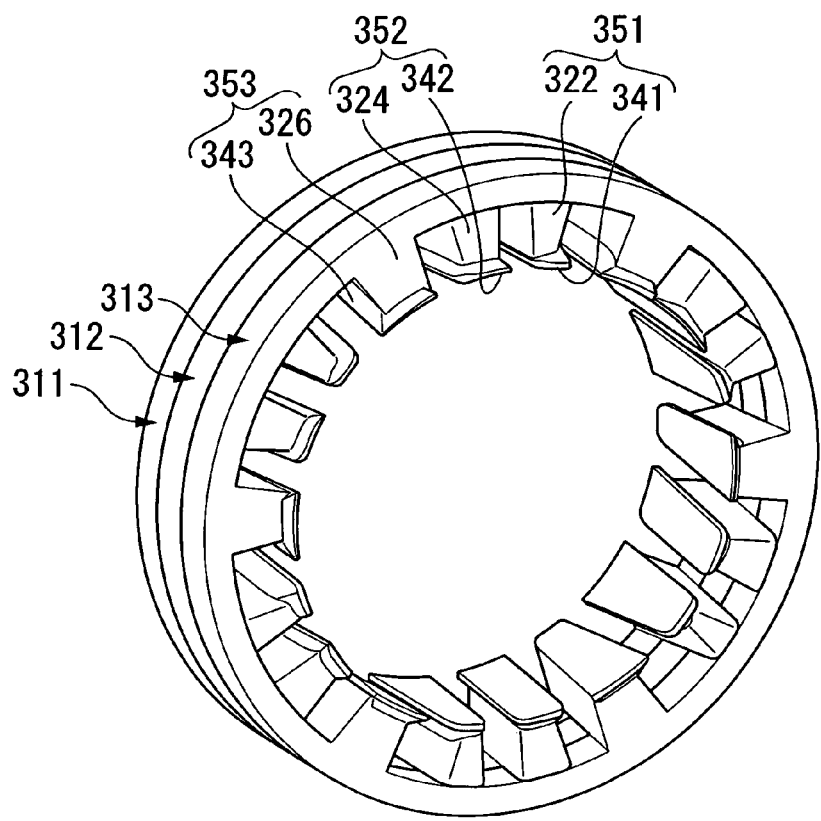
FIG. 47B is a perspective view showing the stator according to the third modification example of the embodiment of the present invention.

In the third modification example, as shown, for example, in FIGS. 47A and 47B, heading from the distal end portions to the base end portions of the extension portions 341, 342, and 343 in the circumferential direction C, the thickness of the extension portions 341, 342, and 343 along the radial direction R of the annular coils 314 and 315 may be set to change to an increasing tendency.

In this case, while the magnetic flux that passed the opposing surfaces of the extension portions 341, 342, and 343 opposing the rotor passes through the connection portions between the extension portions 341, 342, and 343 the distal end portions of the teeth 322, 324, and 326 and flows to the base end portions of the teeth 322, 324, and 326, reductions due to magnetic saturation can be prevented, and the field flux between the rotor and the teeth 322, 324, and 326 of the stator 310 can be effectively utilized.

The rotor 361 of the claw pole motor 360 equipped with the stator 310 according to the aforementioned embodiment is, as shown for example in FIG. 48, a permanent magnet-type rotor employing permanent magnets 362 as fields. The plurality of permanent magnets 362 are disposed at a specified interval in the circumferential direction on the outer circumferential surface of the rotor body 363.

The permanent magnets 362 are, for example, magnetized in the radial direction, with the magnetization directions of the permanent magnets 362 adjacent in the circumferential direction disposed so as to be reversed between adjacent magnets. To wit, a permanent magnet 362 whose outer circumferential side serves as an N-pole is adjacent to another permanent magnetic 362 whose outer circumferential side serves as an S-pole.

A surface yoke 364 that acts as an opposing face that opposes the distal end portions of the teeth 322, 324, and 326 of the stator 310 is provided on the outer periphery of each permanent magnet 362.

The direction in which the permanent magnets extend on the outer periphery of the rotor body 363 slopes by a specified angle in the direction of rotation axis O of the rotor 361.

In the claw motor 360, setting the intervals between the teeth 322, 324, and 326 adjacent in the circumferential direction C to values corresponding to the number of annular coils 314 and 315 disposed in the slots can suppress cogging torque and torque ripple due to setting the intervals to be nonuniform.

Sixth Embodiment

A sixth embodiment of a stator of the present invention will be explained below with reference to the accompanying drawings.

Figure 49:
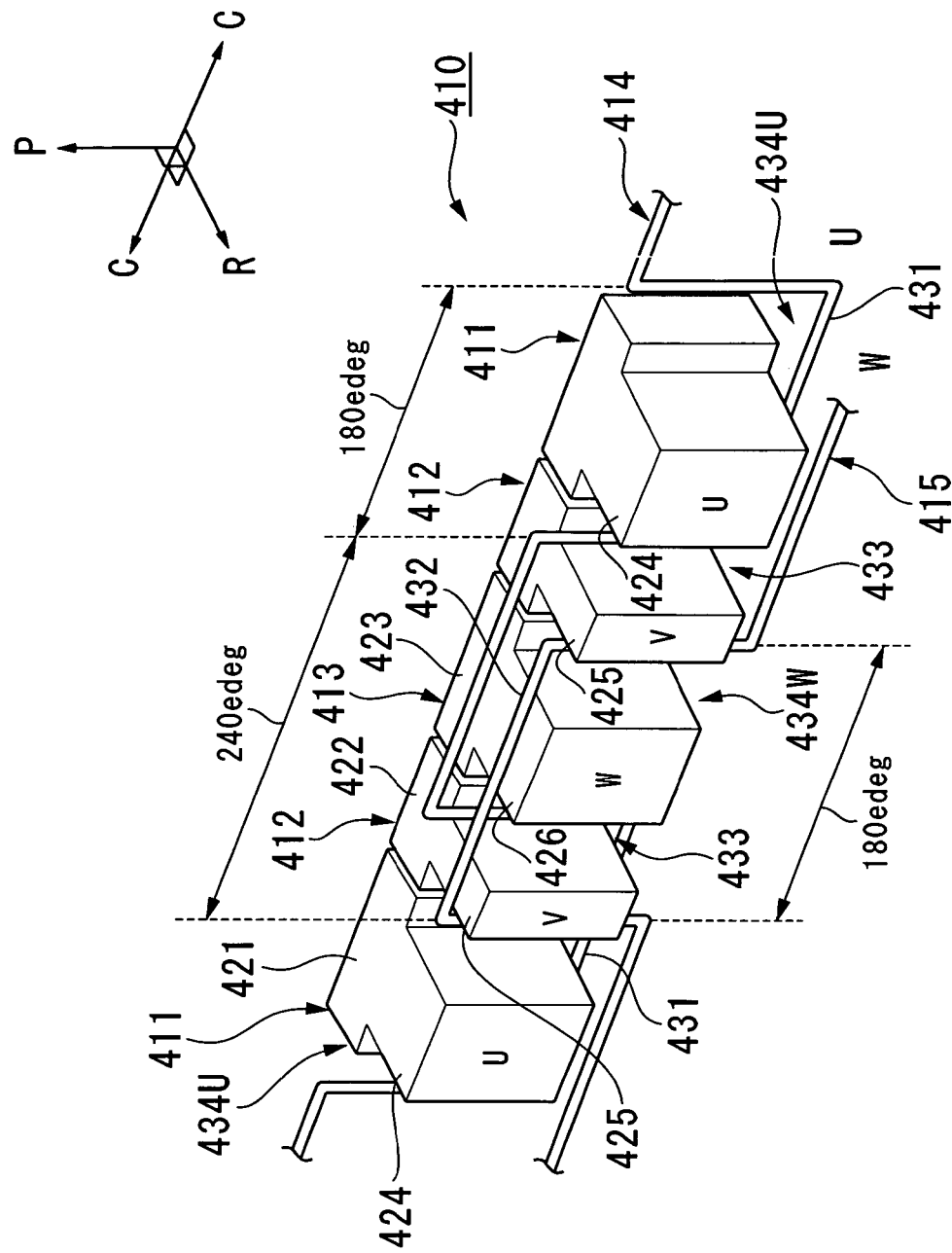
FIG. 49 is a perspective view showing a portion of a stator according to a sixth embodiment of the present invention.

As shown for example in FIG. 49, a stator 410, which generates a rotating magnetic field for rotating a rotor (not illustrated), is provided with a plurality of U-phase stator pieces 411, V-phase stator pieces 412, and W-phase stator pieces 413 for each of the three respective phases U, V, and W, and a U-phase annular coil 414 and a W-phase annular coil 415 for the respective U and W phases.

The stator pieces 411, 412, and 413 have a U-phase yoke 421, a V-phase yoke 422, and a W-phase yoke 423; and U-phase teeth 424, V-phase teeth 425, and W-phase teeth 426. The U-phase teeth 424, V-phase teeth 425, and W-phase teeth 426 have the same width in the axial direction as the yokes 421, 422, and 423 and a smaller circumferential width than the yokes 421, 422, and 423, and project from the yokes 421, 422, and 423, respectively, in the radial direction R. The cross-sectional shape of the U-phase teeth 424, V-phase teeth 425, and W-phase teeth 426 in the radial direction R is rectangular. The circumferential widths of the U-phase teeth 424 and the V-phase teeth 425 are twice the circumferential width of the V-phase teeth 425.

In the state of the stator pieces 411, 412, and 413 being arranged in a circular shape in a specified order, the end portions in the circumferential direction of the yokes 421 and 422 of the stator pieces 411 and 412 that are adjacent in the circumferential direction C or the end portions in the circumferential direction of the yokes 422 and 423 of the stator pieces 412 and 413 are connected. Slots in which the prescribed annular coils 414 and 415 are disposed are formed between the teeth 424 and 425 of the stator pieces 411 and 412, respectively, or between the teeth 425 and 426 of the stator pieces 412 and 413, respectively.

The annular coils 414 and 415 surround the circumference around the axis while meandering in a crank shape within the circumferential surface, to be thereby provided with a plurality of U-phase meandering portions 431 and W-phase meandering portions 432, respectively.

The width of the meandering portions 431 and 432 in the circumferential direction C, that is, the coil pitch, is set to an electrical angle of, for example, 180°. The U-phase annular coil 414 and the W-phase annular coil 415 are disposed at relatively shifted positions along the circumferential direction C so as to have a phase difference of 60° or 240° in terms of electrical angle. For example, in the state of the meandering portions 431 and 432 configured to project in the same direction (that is, to one side or the other side in the axial direction P), they are configured to have a phase difference of 60° in terms of electrical angle, and in the state of the meandering portions 431 and 432 configured to project in different directions (that is, to one side and the other side in the axial direction P), they are configured to have a phase difference of 240° in terms of electrical angle.

For the meandering portions 431 and 432 each corresponding to a half cycle of the annular coils 414 and 415 (that is, an electrical angle of 180°), one U-phase tooth 424 and one V-phase tooth 425 are disposed in the U-phase meandering portion 431, and one V-phase tooth 425 and one W-phase tooth 426 are disposed in the W-phase meandering portion 432. One V-phase tooth 425 and one W-phase tooth 426 are disposed in the U-phase meandering portions 431 adjacent in the circumferential direction C. U-phase teeth 424 and V-phase teeth 425 are disposed in the W-phase meandering portions 432 adjacent in the circumferential direction C.

By disposing the annular coils 414 and 415 at positions relatively shifted along the circumferential direction C, the U-phase annular coil 414 and the W-phase annular coil 415 overlap, and crossover portions 433 are formed with their peripheries surrounded by the U-phase annular coil 414 and the W-phase annular coils 415. One V-phase tooth 425 is disposed in each crossover portion 433.

By disposing the annular coils 414 and 415 at positions relatively shifted along the circumferential direction C, one U-phase tooth 434 or one W-phase tooth are disposed in each of the U-phase openings 434U and W-phase openings 434W, respectively, formed by the meandering portions 431 and 432 so as to open to one side or the other side in the axial direction P.

Thereby, the annular coils 414 and 415 of two phases, which are disposed so as to weave between the teeth 424 and 425 of the stator pieces 411 and 412 adjacent in the circumferential direction C, or between the teeth 425 and 426 of the stator pieces 412 and 413 adjacent in the circumferential direction C, are formed so as to have so-called full-pitch wave windings 180° in terms of electrical angle.

The annular coils 414 and 415 of two phases having a phase difference (coil phase difference) of 240° or 60° in terms of electrical angle are, similarly to the second embodiment shown in FIG. 11A or 11B, constituted to be connected in a V-shape, and energized with sinusoidal waves having a mutual phase difference of 120°. Thereby, when leakage flux can be disregarded, as shown in FIG. 11C, a rotating magnetic field is produced similar to that of a three-phase stator in which its coils of the U, V, and W phases are connected in a Y-shape and energized with sinusoidal waves having a mutual phase difference of 120°.

Similarly to the second embodiment, when phase resistance is ignored, the voltage equation of a three-phase (U-phase, V-phase, W-phase) motor can be expressed as shown in the above-mentioned Eq. (1), with Vu, Vv, and Vw being each phase voltage command values; Iu, Iv, and Iw being each phase currents; L being the self-inductance; M being the mutual inductance; ω being the angular velocity of the rotor; and Ke being the induced voltage constant.

In the above-mentioned Eq. (1), since the phase currents Iu, Iv, and Iw can be expressed by any two phase currents, by canceling out the V-phase current Iv with the U-phase current Iu and the W-phase current Iw, the line-to-line voltage from the phase voltage command values Vu, Vv, Vw (for example, the line-to-line voltage Vuv between the U-phase and V-phase (=Vu−Vv), and the line-to-line voltage Vwv between the W-phase and V-phase (=Vw−Vv)) is expressed as shown in the above-mentioned Eq. (2).

Similarly to the second embodiment, a model that eliminates, for example, the V-phase from the voltage equation of the three-phase (U-phase, V-phase, W-phase) motor shown in the above-mentioned Eq. (1) is described as shown in the above-mentioned Eq. (3).

Similarly to the second embodiment, by inverting the orientation of the W-phase coil (that is, inverting the direction of rotation of the rotor), the model shown in the above-mentioned Eq. (3) is expressed as shown in the above-mentioned Eq. (4).

Similarly to the second embodiment, by altering the number of turns "n" of the coils to a multiple of √3, the model shown in the above-mentioned Eq. (4) can be expressed as shown in the above-mentioned Eq. (5).

By moving the angle of origin of the phase of the induced voltages by 90° (=π/2) and performing substitution with the U-phase component and the W-phase component, the model shown in the above-mentioned Eq. (5) can be expressed as the above-mentioned Eq. (6), which is equivalent to the above-mentioned Eq. (2).

Method of Manufacture

The stator 410 according to the present embodiment is provided with the aforementioned constitution. Next, a method of manufacturing the stator 410 will be explained below with reference to the accompanying drawings.

Winding Arrangement Step

Figure 50A:
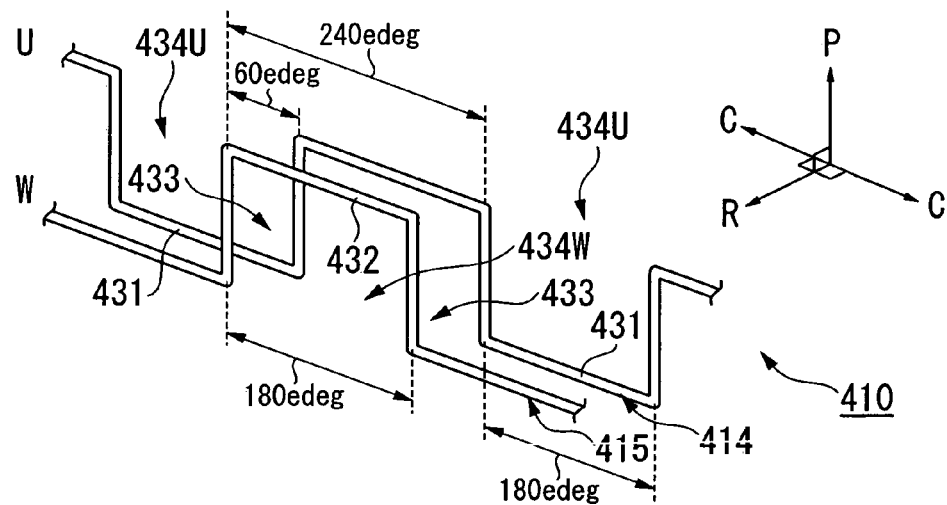
FIG. 50A is a perspective view showing a state of annular coils being arranged by a winding arrangement step.

First, in the winding arrangement step, as shown in FIG. 50A, by forming the U-phase annular coil 414 and the W-phase annular coil 415 of two phases into a crank shape so as to have a coil pitch of an electrical angle of 180°, a plurality of U-phase meandering portions 431 and W-phase meandering portions 432 are formed. Then, in the state of their meandering portions 431 and 432 projecting in mutually different directions (that is, to the one side and the other side in the axial direction P), the U-phase annular coil 414 and the W-phase annular coil 415 are disposed in positions mutually shifted along the circumferential direction C so as to have a mutual phase difference of at least 240° in terms of electrical angle. Thereby, the crossover portions 433 with their peripheries surrounded by the U-phase annular coil 414 and the W-phase annular coils 415 and the U-phase openings 434U and the W-phase openings 434W constituted by the meandering portions 431 and 432 and open to the one side or the other side in the axial direction P, are formed.

Teeth Insertion Step

Figure 50B:
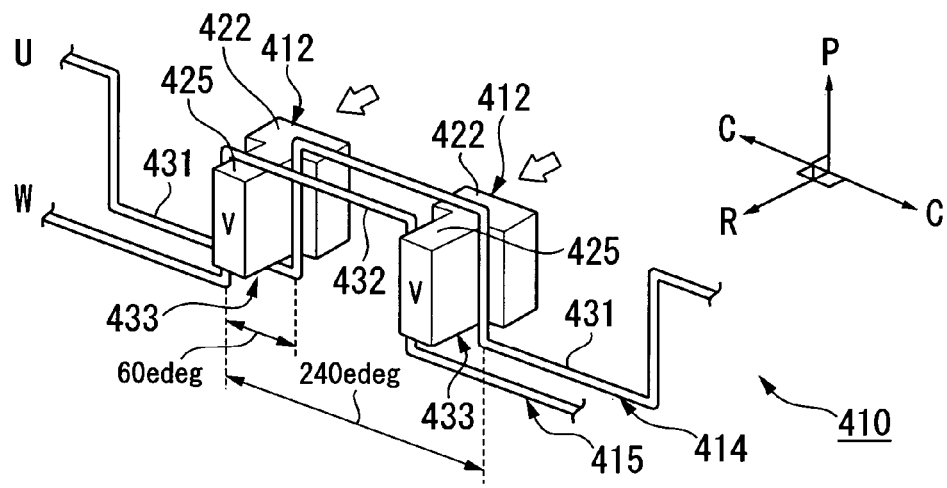
FIG. 50B is a perspective view showing a state of V-phase teeth being inserted in the crossover portion by a teeth insertion step.

Next, in the teeth insertion step, as shown for example in FIG. 50B, the V-phase teeth 425 of the V-phase stator pieces 412 are inserted into the crossover portions 433 in the radial direction R. The relative positions of the U-phase-annular coil 414 and the W-phase annular coil 415 are then adjusted in the circumferential direction C so that the U-phase annular coil 414 and the W-phase annular coil 415 have a mutual phase difference of 240° in terms of electrical angle.

Teeth Mounting Step

Figure 50C:
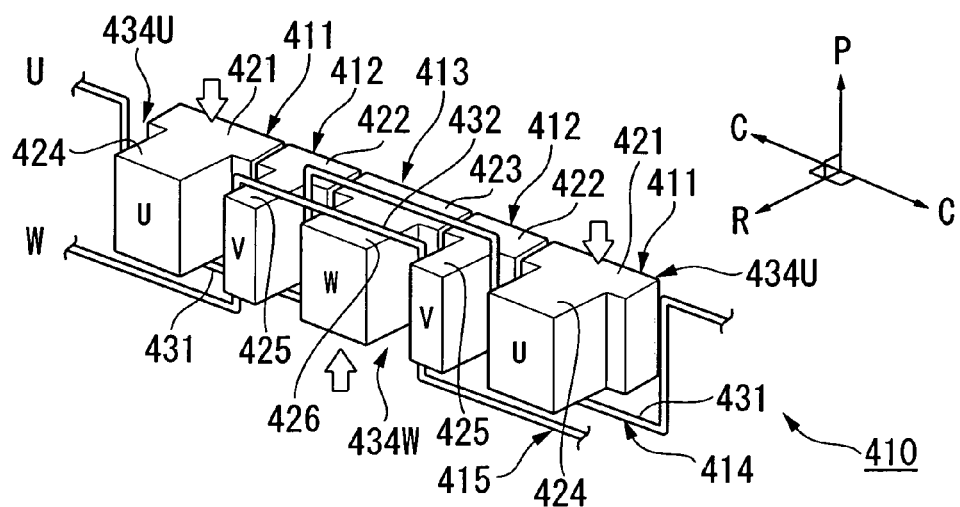
FIG. 50C is a perspective view showing a state of U-phase teeth and W-phase teeth being mounted in U-phase openings and W-phase openings by a teeth mounting step.

Next, in the teeth mounting step, as shown, for example, in FIG. 50C, the U-phase stator pieces 411 are moved from the one side to the other side along the axial direction P, and the U-phase teeth 424 are mounted in the U-phase openings 434U that open to the one side in the axial direction P. The W-phase stator pieces 413 are moved from the other side to the one side along the axial direction P, and the W-phase teeth 426 are mounted in the W-phase openings 434W that open to the other side in the axial direction P. Then end portions in the circumferential direction of the yokes 421 and the yokes 422 of the respective stator pieces 411 and 412 adjacent in the circumferential direction C are abutted, or the end portions in the circumferential direction of the yokes 422 and the yokes 423 of the respective stator pieces 412 and 413 are abutted.

As stated above, with the stator 410 of the sixth embodiment, annular coils 414 and 415 of two phases connected in a V-shape, having a phase difference (coil phase difference) of 60° or 240° in terms of electrical angle, can generate a rotating magnetic field is produced similar to that of a three-phase stator in which coils of three phases, for example, U, V, and W-phases are connected in a Y-shape. Accordingly, by reducing the number of phases of coils required, the number of parts needed for constructing the stator 410 is reduced, the structure of the stator 410 is simplified. Moreover, excessive increases in the height of the coil end and the dimension of the motor in the axial direction due to crossover of the coils from positional interference of the lateral portions of the coils can be prevented.

According to the manufacturing method for the stator 410 of the sixth embodiment, since the teeth 424, 425, and 426 are disposed after arranging the annular coils 414 and 415 of two phases, which meander in a crank shape, in positions relatively shifted along the circumferential direction C so as to have a phase difference of 240° in terms of electrical angle, the desired winding wire space factor can be easily ensured with regard to the annular coils 414 and 415 disposed between the teeth 424 and 425 or between the teeth 425 and 426 adjacent in the circumferential direction C. Also, excessive increases in the height dimension of the coil end can be easily prevented.

First Modification Example if Sixth Embodiment

Figure 51A:
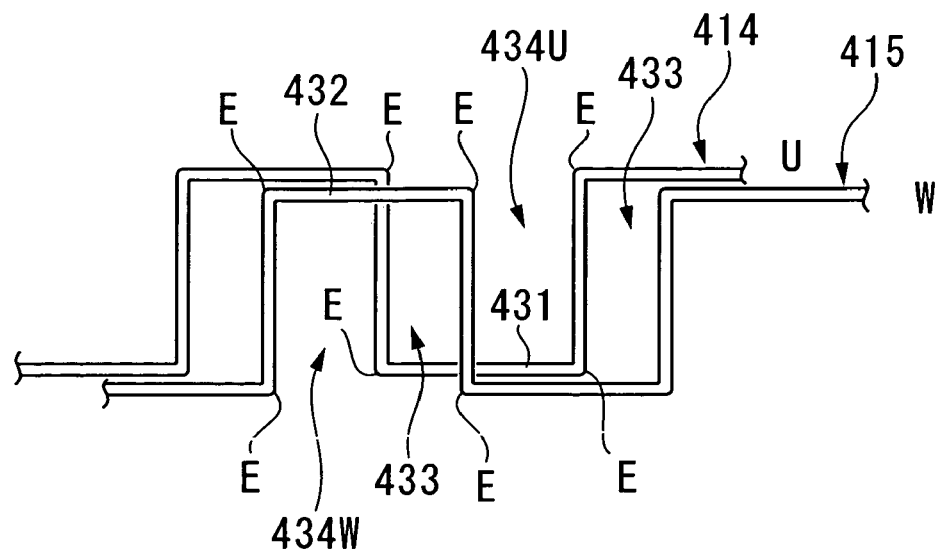
FIG. 51A is a schematic view showing an arrangement of annular coils that meander in a crank shape.
Figure 51B:
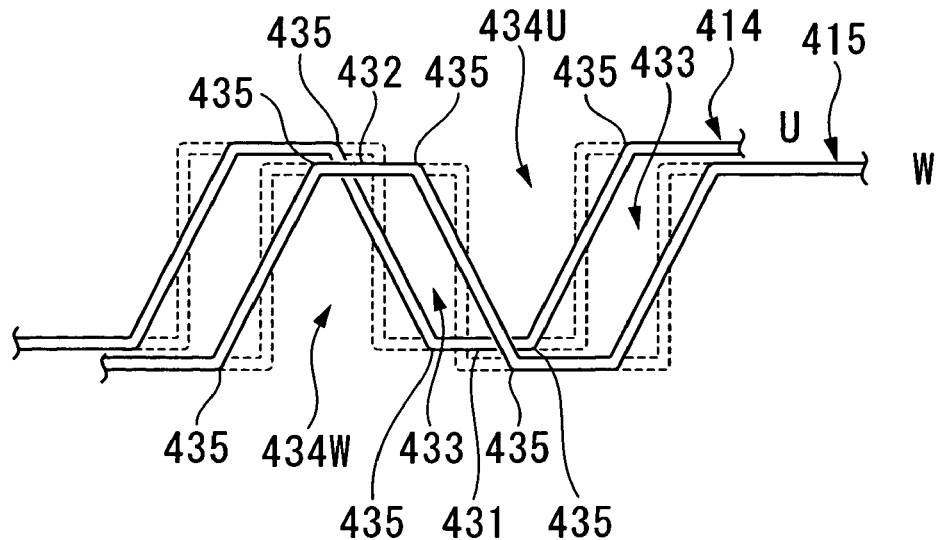
FIG. 51B is a schematic view showing an arrangement of annular coils that meander in a trapezoidal shape.

In the sixth embodiment, as shown, for example, in FIG. 51A, meandering portions 431 and 432 that meander in a crank shape are provided in the U-phase annular coil 414 and the W-phase annular coil 415, but it is not limited thereto. As shown, for example, in FIG. 51B, meandering portions 431 and 432 that meander in a trapezoidal shape may be provided in the U-phase annular coil 414 and the W-phase annular coil 415.

In the aforementioned sixth embodiment, the meandering portions 431 and 432 are constituted of four bent portions E that bend perpendicularly. In contrast, in the first modification example, as shown, for example, in FIG. 51B, the meandering portions 431 and 432 are constituted of four bent portions 435 that bend at specified obtuse angles, forming a trapezoidal shape having two symmetrical oblique sides.

Figure 52:
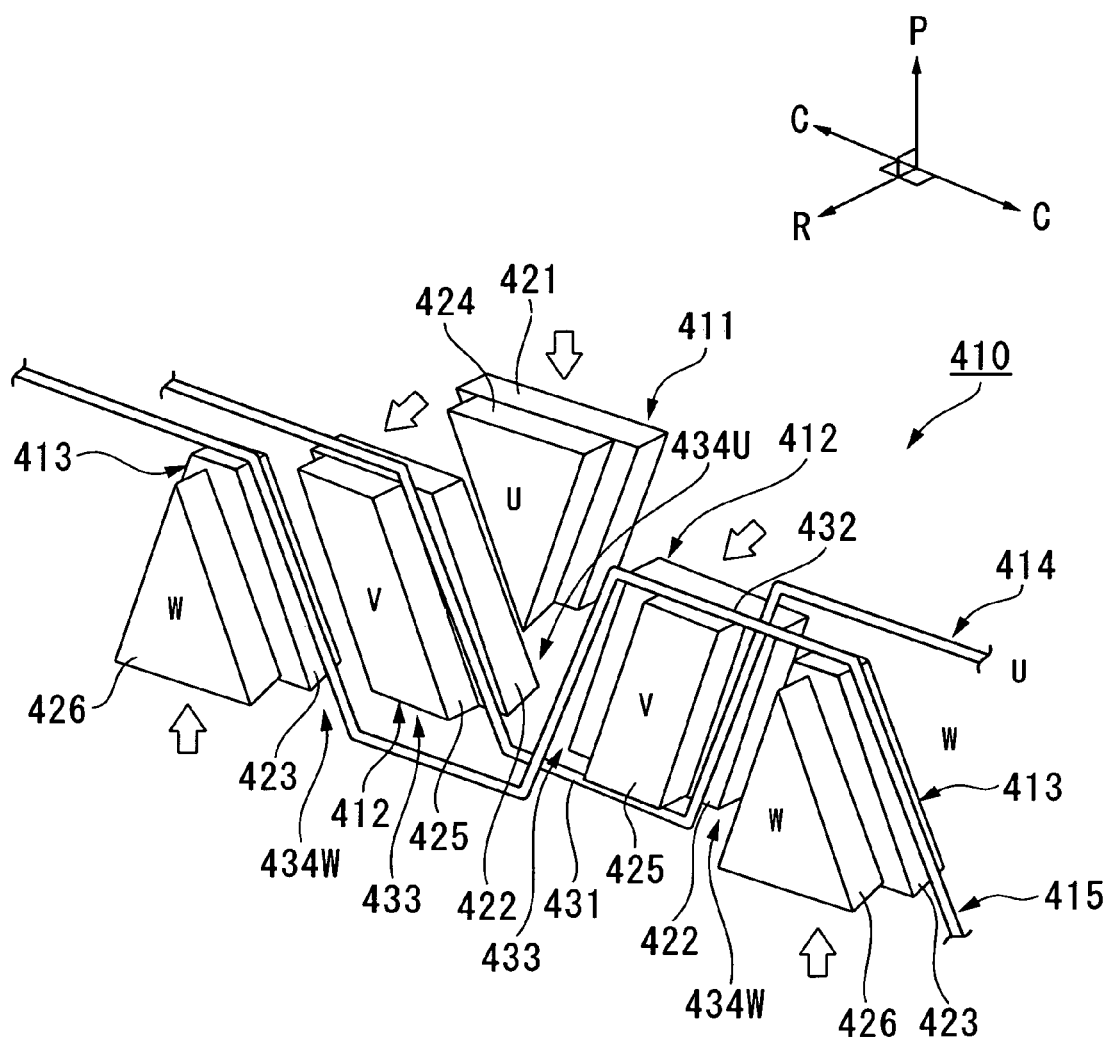
FIG. 52 is an exploded perspective view showing a stator according to a first modification example of the sixth embodiment of the present invention.

In FIG. 52, crossover portions 433 are formed with their peripheries surrounded by the U-phase annular coil 414 and the W-phase annular coils 415, and the V-phase teeth 425 whose cross-section shape is a parallelogram in the radial direction R in accordance with the shape of the crossover portions 433 are inserted in the crossover portions 433 along the radial direction R.

The U-phase opening portions 434U are formed by the meandering portions 431 and 432 so as to open to the one side in the axial direction P, and the U-phase teeth 424 are formed to have a cross-sectional shape that is triangular in the radial direction R in accordance with the shape of the U-phase opening portions 434U. The U-phase teeth 424 are mounted in the U-phase opening portions 434U from the one side to the other side in the axial direction P. The W-phase opening portions 434W are formed by the meandering portions 431 and 432 so as to open to the other side in the axial direction P, and the W-phase teeth 426 are formed to have a cross-sectional shape that is triangular in the radial direction R in accordance with the shape of the W-phase opening portions 434W. The W-phase teeth 426 are mounted in the W-phase opening portions 434W from the other side to the one side in the axial direction P.

In the first modification example, the annular coils 414 and 415 that meander in a trapezoidal shape, compared to the annular coils 414 and 415 that meander in, for example, a crank shape, can shorten the winding length without hardly changing the winding factor according to the inductance of the annular coils 414 and 415, and can lower copper loss.

Second Modification Example of Sixth Embodiment

In the sixth embodiment, the meandering portions 431 and 432 are provided in the shape similarly to the U-phase annular coil 414 and the W-phase annular coil 415, but it is not limited thereto. As shown, for example, in FIGS. 53A to 53C, bent portions 441 that bend so as to project in the radial direction R may be provided in the U-phase meandering portions 431 or the W-phase meandering portions 432, and the meandering portions 431 and 432 may be formed in mutually different shapes.

Figure 53A:
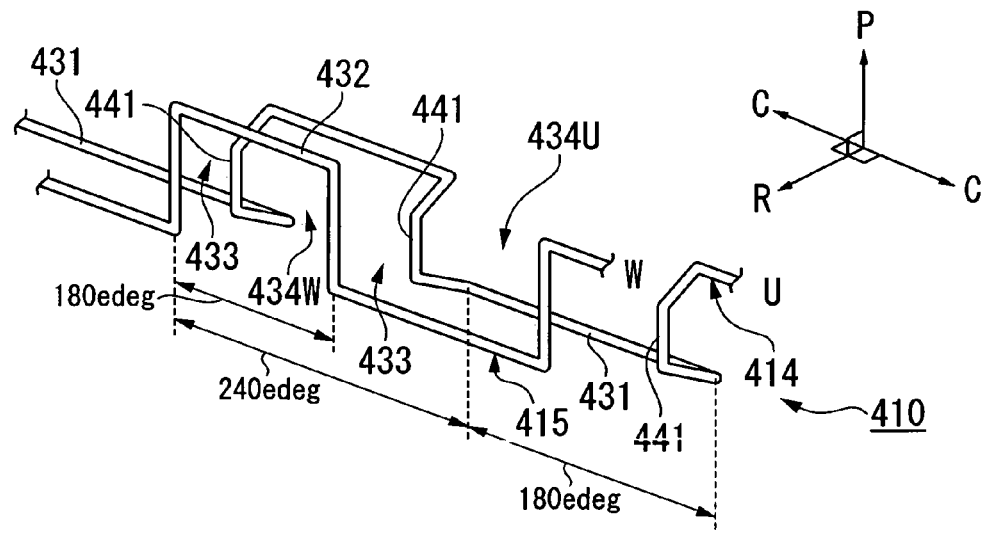
FIG. 53A is a perspective view showing a state of annular coils being arranged by a winding arrangement step.
Figure 53B:
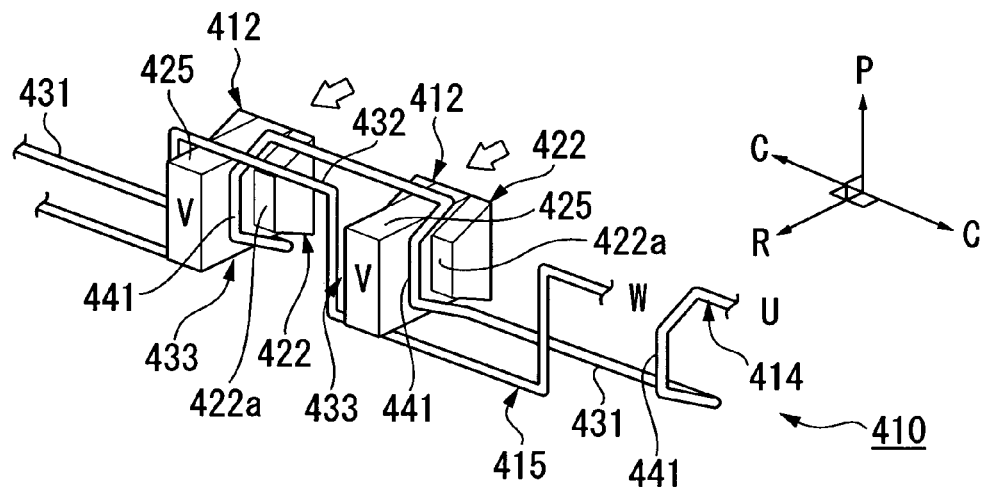
FIG. 53B is a perspective view showing a state of V-phase teeth being inserted in a crossover portion by a teeth insertion step.
Figure 53C:
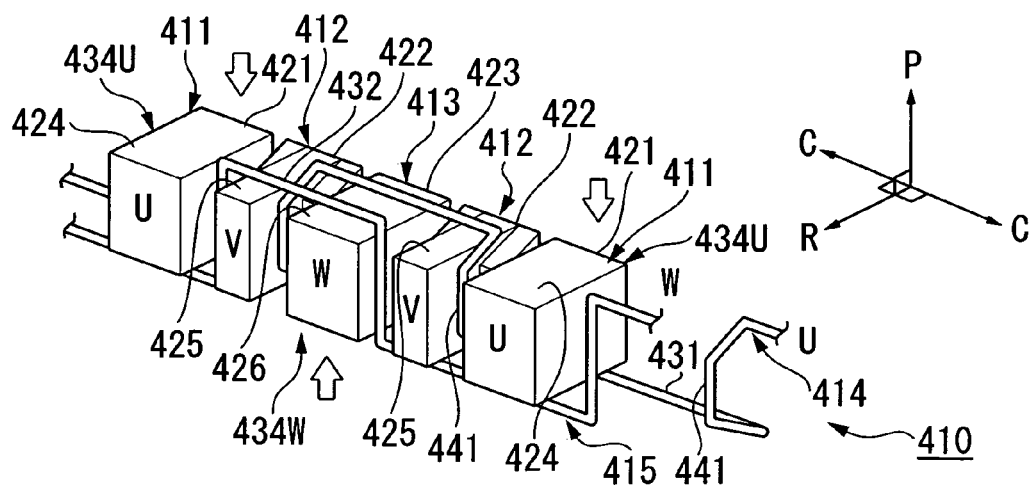
FIG. 53C is a perspective view showing a state of U-phase teeth and W-phase teeth being mounted in U-phase openings and W-phase openings by a teeth mounting step.

In the second modification example, as shown, for example, in FIGS. 53A to 53C, bent portions 441 are provided in the U-phase meandering portions 431 of the U-phase annular coil 414 at the regions disposed between the teeth 424 and 425 or between the teeth 425 and 426. In the U-phase annular coil 414, the regions disposed between the teeth 424 and 425 or between the teeth 425 and 426, and the lateral portions that serve as regions other than those regions are mutually shifted in the radial direction.

Thereby, when disposing the annular coils 414 and 415 so as to weave between the teeth 424 and 425 or between the teeth 425 and 426, even if the radial positions of the regions of the annular coils 414 and 415 disposed between the teeth 424 and 425 or between the teeth 425 and 426 are set to the same position, the radial positions of the lateral portions of the annular coils 414 and 415 are mutually shifted. Thereby, increases in the height of the coil end and the dimension of the motor in the axial direction P due to crossover of the lateral portions can be prevented.

In the second modification example, in the yokes 421, 422 and 423 in which are connected the teeth 424, 425, and 426 that form slots in which the bent portions 441 of the U-phase annular coil 414 are disposed, projection portions 422a that project in the radial direction R in accordance with the shape of the bent portions 441 are provided in the V-phase yokes 422 that are mounted in the radial direction R on the annular coils 414 and 415.

Method of Manufacture

Winding Arrangement Step

In the method of manufacturing the stator 410 according to the second modification example, first, in the winding arrangement step, as shown in FIG. 53A, by forming the U-phase annular coil 414 and the W-phase annular coil 415 of two phases into a crank shape so as to have a coil pitch of an electrical angle of 180°, a plurality of U-phase meandering portions 431 and W-phase meandering portions 432 are formed. Bend portions 441 that bend so as to project in the radial direction R are formed in the U-phase meandering portions 431 at the regions disposed between the teeth 424 and 425 or between the teeth 425 and 426.

In the state of their meandering portions 431 and 432 projecting in mutually different directions (that is, the first direction and the second direction of the axial direction P), the U-phase annular coil 414 and the W-phase annular coil 415 are disposed in positions mutually shifted along the circumferential direction C so as to have a mutual phase difference of at least 240° in terms of electrical angle. Thereby, the crossover portions 433 with their peripheries surrounded by the U-phase annular coil 414 and the W-phase annular coil 415 and the U-phase openings 434U and the W-phase openings 434W constituted by the meandering portions 431 and 432 open to the first direction or the section direction of the axial direction P are formed.

The regions of the annular coils 414 and 415 disposed between the teeth 424 and 425 or between the teeth 425 and 426 are set to the same position in the radial direction, and the positions of the lateral portions of the annular coils 414 and 415 are mutually shifted in the radial direction.

Teeth Insertion Step

In the teeth insertion step, as shown for example in FIG. 53B, the V-phase teeth 425 of the V-phase stator pieces 412 are inserted into the crossover portions 433 in the radial direction R. The relative positions of the U-phase annular coil 414 and the W-phase annular coil 415 are then adjusted in the circumferential direction C so that the U-phase annular coil 414 and the W-phase annular coil 415 have a mutual phase difference of 240° in terms of electrical angle.

Teeth Mounting Step

In the teeth mounting step, as shown, for example, in FIG. 53C, the U-phase stator pieces 411 are moved from the first direction to the second direction along the axial direction P, and the U-phase teeth 424 are mounted in the U-phase openings 434U that open to the first direction in the axial direction P. The W-phase stator pieces 413 are moved from the second direction to the first direction along the axial direction P, and the W-phase teeth 426 are mounted in the W-phase openings 434W that open to the second direction in the axial direction P. The respective end portions in the circumferential direction of the yoke 421 of the stator pieces 411 and the yoke 422 of the stator pieces 412 adjacent in the circumferential direction C are abutted, or the respective end portions in the circumferential direction of the yoke 422 of the stator pieces 412 and the yoke 423 of the stator pieces 412 and 413 are abutted.

Third Modification Example of Sixth Embodiment

In the manufacturing method of the stator 410 according to the aforementioned second modification example, the bent portions 441 that bend so as to project in the radial direction R were formed in the U-phase meandering portions 431 at the regions disposed between the teeth 424 and 425 or between the teeth 425 and 426 before mounting the teeth 424, 425, and 426 in the annular coils 414 and 415, but it is not limited thereto. As shown, for example, in FIGS. 54A to 54C, the bent portions 441 may be configured to be formed in the U-phase meandering portions 431 when mounting the teeth 424, 425, and 426 in the annular coils 414 and 415.

Manufacturing Method

Winding Arrangement Step

Figure 54A:
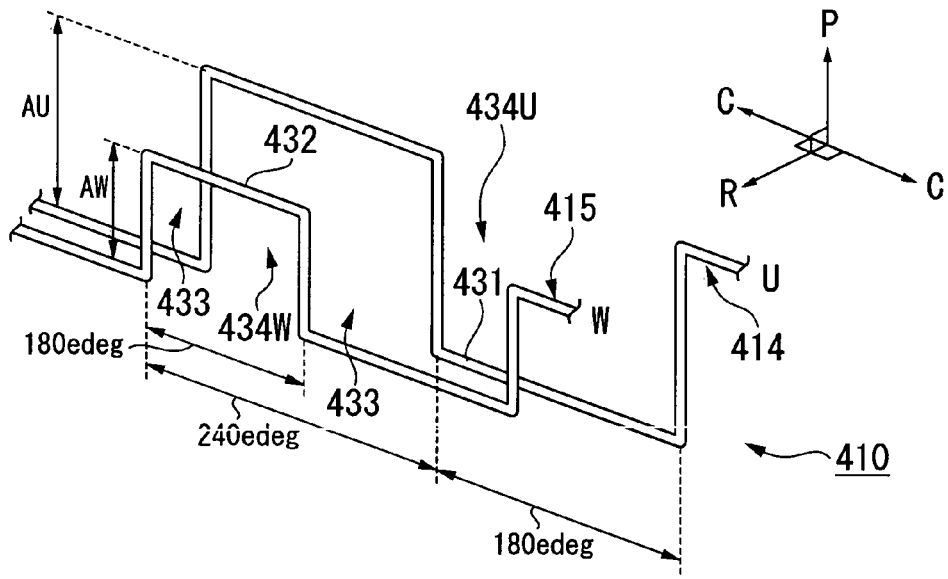
FIG. 54A is a perspective view showing a state of annular coils being arranged by a winding arrangement step.

In the method of manufacturing the stator 410 according to the third modification example, first, in the winding arrangement step, as shown in FIG. 54A, by forming the U-phase annular coil 414 and the W-phase annular coil 415 of two phases into a crank shape so as to have a coil pitch of an electrical angle of 180°, a plurality of U-phase meandering portions 431 and W-phase meandering portions 432 are formed. At this time, in order for the axial width of the U-phase meandering portions 431 in which the bent portions 441 are formed to be the same as the axial width AW of the W-phase meandering portions 432, the axial width AU of the U-phase meandering portions 431 is set to a greater value than the axial width AW of the W-phase meandering portions 432 (AU>AW).

In the state of their meandering portions 431 and 432 projecting in mutually different directions (that is, the first direction and the second direction of the axial direction P), the U-phase annular coil 414 and the W-phase annular coil 415 are disposed in positions mutually shifted along the circumferential direction C so as to have a mutual phase difference of at least 240° in terms of electrical angle. Thereby, the crossover portions 433 with their peripheries surrounded by the U-phase annular coil 414 and the W-phase annular coils 415 and the U-phase openings 434U and the W-phase openings 434W constituted by the meandering portions 431 and 432 open to the first direction or the section direction of the axial direction P are formed.

Teeth Insertion Step

Figure 54B:
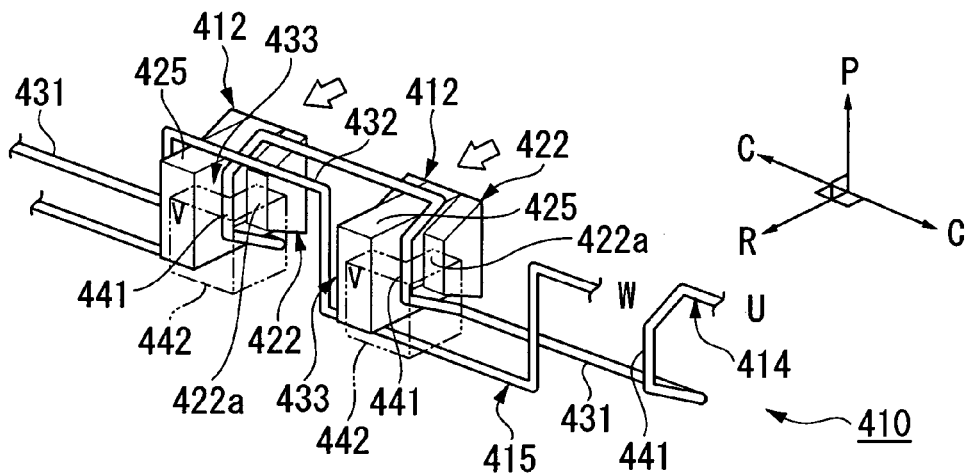
FIG. 54B is a perspective view showing a state of V-phase teeth being inserted in a crossover portion by a teeth insertion step.

In the teeth insertion step, as shown for example in FIG. 54B, the V-phase teeth 425 of the V-phase stator pieces 412 are inserted into the crossover portions 433 in the radial direction R. At this time, the regions of the U-phase meandering portions 431 in the U-phase annular coil 414 disposed between the teeth 424 and 425 or between the teeth 425 and 426 are sandwiched on both sides in the radial direction R by the projection portions 422*a* projecting in radial direction R that are formed on the V-phase yoke 422 of the V-phase stator pieces 412 and the suitable guide members (coil guides) 422 to be made to conform to the shape of the outer periphery of the projection portions 422*a*, thereby forming bent portions 441 that project in the radial direction R.

The relative positions of the U-phase annular coil 414 and the W-phase annular coil 415 are then adjusted in the circumferential direction C so that the U-phase annular coil 414 and the W-phase annular coil 415 have a mutual phase difference of 240° in terms of electrical angle.

The regions of the annular coils 414 and 415 disposed between the teeth 424 and 425 or between the teeth 425 and 426 are set to the same position in the radial direction, and the positions of the lateral portions of the annular coils 414 and 415 are mutually shifted in the radial direction.

Teeth Mounting Step

Figure 54C:
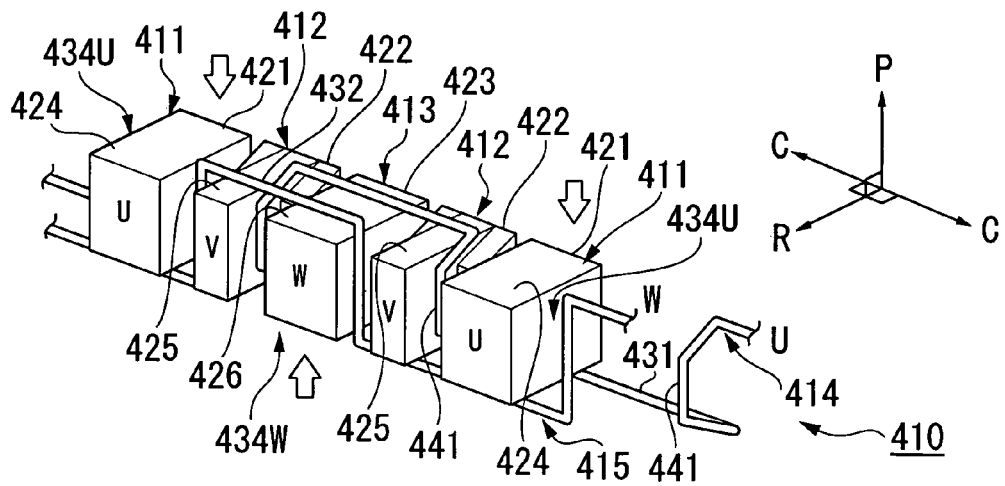
FIG. 54C is a perspective view showing a state of U-phase teeth and W-phase teeth being mounted in U-phase openings and W-phase openings by a teeth mounting step.

Next, in the teeth mounting step, as shown, for example, in FIG. 54C, the U-phase stator pieces 411 are moved from the first direction to the second direction along the axial direction P, and the U-phase teeth 424 are mounted in the U-phase openings 434U that open to the one side in the axial direction P. The W-phase stator pieces 413 are moved from the second direction to the first direction along the axial direction P, and the W-phase teeth 426 are mounted in the W-phase openings 434W that open to the second side in the axial direction P. The respective end portions in the circumferential direction of the yoke 421 of the stator pieces 411 and the yoke 422 of the stator pieces 412 adjacent in the circumferential direction C are abutted, or the respective end portions in the circumferential direction of the yoke 422 of the stator pieces 412 and the yoke 423 of the stator pieces 413 are abutted.

In the third modification example, when inserting the V-phase teeth 425 in the annular coils 414 and 415, the bent portions 441 are formed in the U-phase meandering portions 431. Specifically, the annular coil is formed in the specified shape by inserting a portion of the teeth in the teeth mounting portions. Accordingly, the U-phase annular coil 414 can be easily formed into a suitable shape conforming to the shape of the V-phase teeth 425, the manufacturing process of the stator can be simplified, and the manufacturing efficiency can be enhanced.

Fourth Modification Example of Sixth Embodiment

Figure 55:
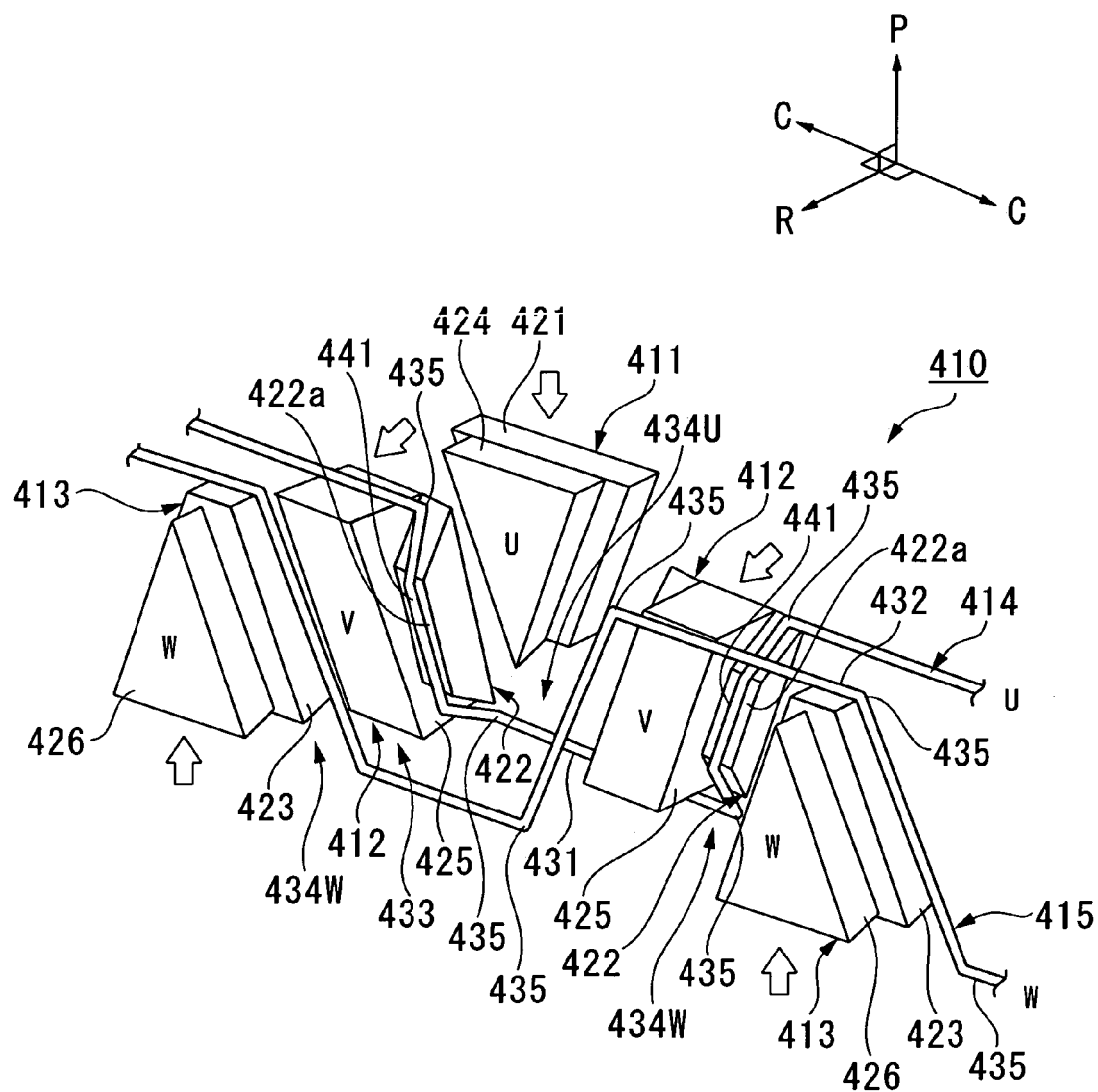
FIG. 55 is an exploded perspective view showing a portion of a stator according to a fourth modification example of the sixth embodiment of the present invention.

In the second and third modification examples, meandering portions 431 and 432 that meander in a crank shape are provided in the U-phase annular coil 414 and the W-phase annular coil 415 of two phases, but it is not limited thereto. As shown, for example, in FIG. 55, the meandering portions 431 and 432 may be formed in a trapezoidal shape having two symmetrical oblique sides, provided with four bent portions 435 that bend at specified obtuse angles.

In the fourth modification example, provided in the two symmetrical oblique sides of the trapezoidal U-phase meandering portions 431 are bent portions 441 that bend so as to project in the radial direction R. Thereby, the crossover portions 433 with their peripheries surrounded by the U-phase annular coil 414 and the W-phase annular coils 415 are formed. The V-phase teeth 425 whose cross-sectional shape is a parallelogram in the radial direction R in accordance with the shape of crossover portions 433 are inserted in the crossover portions 433 along the radial direction R.

The U-phase opening portions 434U are formed by the meandering portions 431 and 432 so as to open to the one side in the axial direction P, and the U-phase teeth 424 are formed to have a cross-sectional shape that is triangular in the radial direction R in accordance with the shape of the U-phase opening portions 434U. The U-phase teeth 424 are mounted in the U-phase opening portions 434U from the one side to the other side in the axial direction P. The W-phase opening portions 434W are formed by the meandering portions 431 and 432 so as to open to the other side in the axial direction P, and the W-phase teeth 426 are formed to have a cross-sectional shape that is triangular in the radial direction R in accordance with the shape of the W-phase opening portions 434W. The W-phase teeth 426 are mounted in the W-phase opening portions 434W from the other side to the one side in the axial direction P.

In the fourth modification example, compared to the annular coils 414 and 415 that meander in, for example, a crank shape, in the annular coils 414 and 415 that meander in a trapezoidal shape, the winding length can be shortened without hardly changing the winding factor according to the inductance of the annular coils 414 and 415, and copper loss can be lowered.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A stator comprising:
mutually independent annular coils of only two phases; and
teeth of three phases,
   wherein said annular coils of two phases have meandering portions, and
   wherein said meandering portions project in mutually opposite directions, are alternately arranged along a circumferential direction, and are disposed so as not to mutually cross over.

2. A stator comprising:
mutually independent annular coils of only two phases; and
teeth of three phases,
   wherein said annular coils of two phases have meandering portions, and
   wherein said meandering portions have a coil pitch of 120° in terms of electrical angle and a mutual phase difference of 120° in terms of electrical angle, project in mutually opposite directions, are alternately arranged along a circumferential direction, and disposed so as not to mutually cross over.

3. A stator comprising:
mutually independent annular coils of only two phases; and
teeth of three phases, wherein:
   said annular coils have meandering portions;
   said teeth are mounted in said meandering portions;
   at least base end portions of said teeth in a radial direction are disposed at positions shifted in a axial direction substantially parallel to the axial direction of said annular coils; and
   stepped portions are formed by said teeth adjacent in a circumferential direction of said annular coils.

4. A stator comprising:
mutually independent annular coils of only two phases; and
teeth of three phases, wherein:
   said annular coils have meandering portions;
   said teeth are mounted in said meandering portions;
   at least a base end portions of said teeth in a radial direction are disposed at positions shifted in an axial direction substantially parallel to the axial direction of said annular coils; and
   stepped portions are formed by said teeth adjacent in a circumferential direction of said annular coils, with said meandering portions of said annular coils disposed at said stepped portions.

5. A stator comprising:
mutually independent annular coils of only two phases;
teeth of three phases; and
stepped portions formed by said teeth adjacent in the circumferential direction of said annular coils, wherein:
   said annular coils have meandering portions disposed at said stepped portions;
   said teeth are mounted in said meandering portions; and
   at least base end portions of said teeth in a radial direction are disposed at positions shifted in an axial direction substantially parallel to the axial direction of said annular coils.

6. A stator comprising:
mutually independent annular coils of only two phases;
teeth of three phases; and
stepped portions formed by said teeth adjacent in a circumferential direction of said annular coils, wherein:
   said annular coils have meandering portions;
   said teeth are mounted in said meandering portions;
   at least base end portions of said teeth in a radial direction are disposed at positions shifted in an axial direction substantially parallel to the axial direction of said annular coils; and
   an amount of shifting in said axial direction of said teeth adjacent in the circumferential direction is equivalent to a thickness of said annular coils.

7. A stator comprising:
mutually independent annular coils of only two phases;
teeth of three phases; and
stepped portions formed by said teeth adjacent in a circumferential direction of said annular coils, wherein:
   said annular coils have meandering portions;
   said teeth are mounted in said meandering portions;
   at least base end portions of said teeth in a radial direction are disposed at positions shifted in an axial direction substantially parallel to the axial direction of said annular coils; and
   a slot between the teeth where the step of the stepped portion is a maximum slopes with respect to said axial direction.

8. A stator comprising:

mutually independent annular coils of only two phases; and teeth of three phases, wherein:
- said annular coils have meandering portions;
- said teeth are mounted in said meandering portions; and
- intervals between said teeth adjacent in a circumferential direction of said annular coils are set so as to be nonuniform.

9. A stator comprising:

mutually independent annular coils of only two phases;

teeth of three phases; and stator members having said teeth, wherein:
- said annular coils have meandering portions;
- for specified teeth of said teeth mounted in said meandering portions, a width of said teeth in a circumferential direction of said annular coils are set to change to a decreasing tendency; and
- a length of said teeth in an axial direction substantially parallel to an axis of said annular coils are set to change to an increasing tendency from rotor opposing portions that oppose the rotor to connection portions connected to said stator members.

10. A stator comprising:

mutually independent annular coils of only two phases;

teeth of three phases; and extension portions that project in a circumferential direction of said annular coils from a distal end portions of said teeth, wherein:
- said annular coils have meandering portions; and
- a thickness of said extension portions along a radial direction of said annular coils are set to change to an increasing tendency from the distal end portions to a base end portions of the extension portions in the circumferential direction of said annular coils.

* * * * *